United States Patent
Ishida et al.

[11] Patent Number: 5,915,368
[45] Date of Patent: *Jun. 29, 1999

[54] AIR/FUEL RATIO CONTROL APPARATUS THAT USES A NEURAL NETWORK

[75] Inventors: Akira Ishida, Sakai; Masuo Takigawa, Nara; Tatsuya Nakamura, Yokohama; Norihiro Fujioka, Fujisawa, all of Japan

[73] Assignee: Matsushita Electric Industrial Co, Ltd, Osaka, Japan

[*] Notice: This patent is subject to a terminal disclaimer.

[21] Appl. No.: 08/864,319

[22] Filed: May 28, 1997

[30] Foreign Application Priority Data

May 28, 1996 [JP] Japan .................................. 8-133190
Oct. 15, 1996 [JP] Japan .................................. 8-272504

[51] Int. Cl.⁶ .................................................. F02D 41/14
[52] U.S. Cl. .......................... 123/675; 123/682; 123/689; 701/106; 701/109
[58] Field of Search .................................. 123/673, 674, 123/675, 682, 688, 689; 701/104, 106, 109

[56] References Cited

U.S. PATENT DOCUMENTS

| | | | |
|---|---|---|---|
| 4,887,575 | 12/1989 | Takahashi | 123/674 X |
| 5,657,737 | 8/1997 | Ishida et al. | 123/674 |
| 5,755,212 | 5/1998 | Ajima | 123/674 |

FOREIGN PATENT DOCUMENTS 8-28358  1/1996  Japan .

Primary Examiner—Tony M. Argenbright
Attorney, Agent, or Firm—Price Gess & Ubell

[57] ABSTRACT

An air/fuel ratio control apparatus for executing auxiliary control of an air/fuel ratio by compensating an injected fuel amount set by a control system for maintaining the air/fuel ratio at a preset value. The air/fuel ratio control apparatus includes a state detecting unit for detecting a plurality of physical values which can be measured at low temperature and which show a state of an engine, an air/fuel ratio estimating unit for receiving a plurality of physical values detected by the state detecting means as input parameters and for estimating the air/fuel ratio using a neural network, and a compensatory fuel amount calculating unit for calculating a compensatory fuel amount for the injected fuel amount from the estimated air/fuel ratio. Here, low temperature refers to a temperature at which an air/fuel sensor cannot operate.

13 Claims, 53 Drawing Sheets

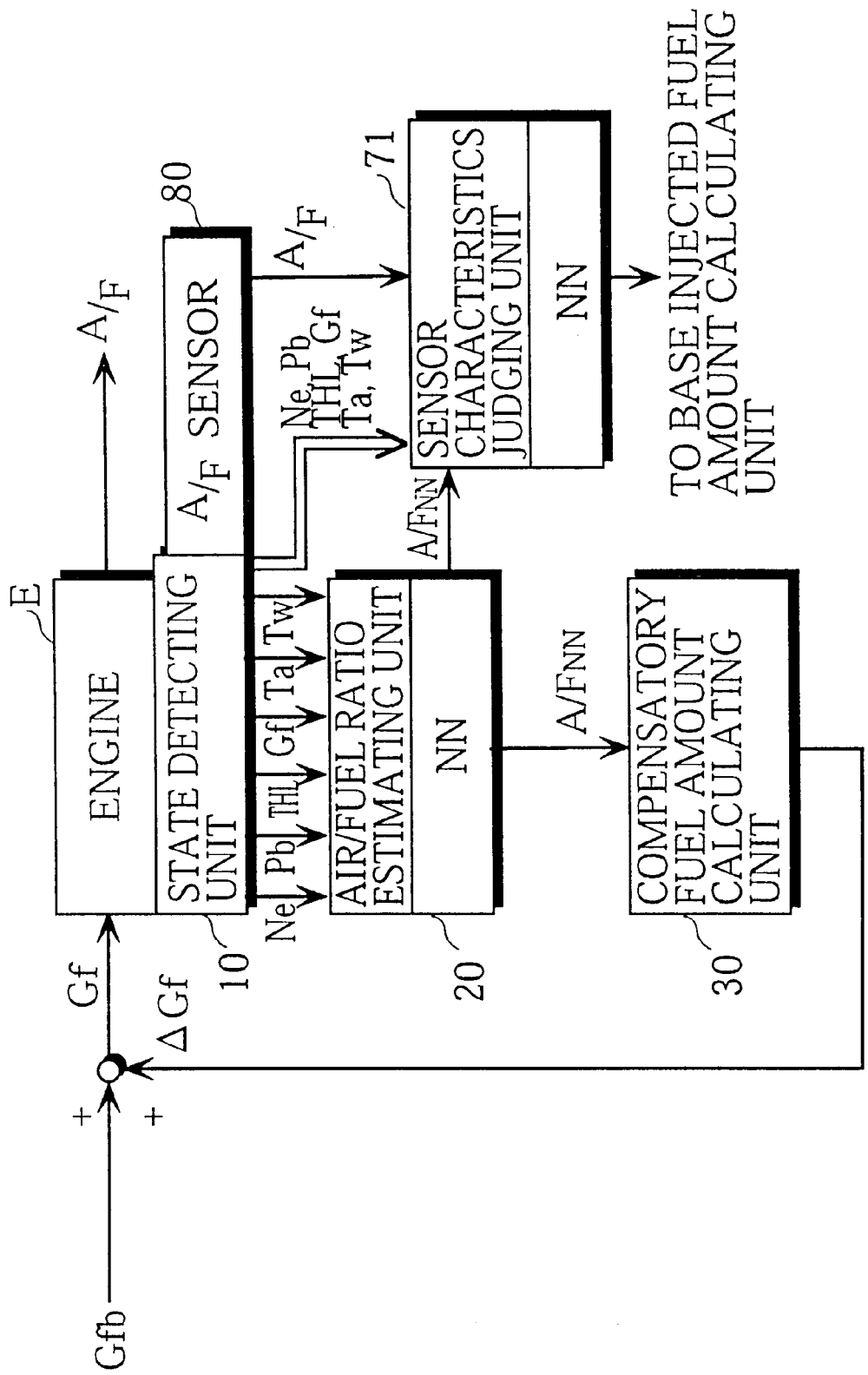

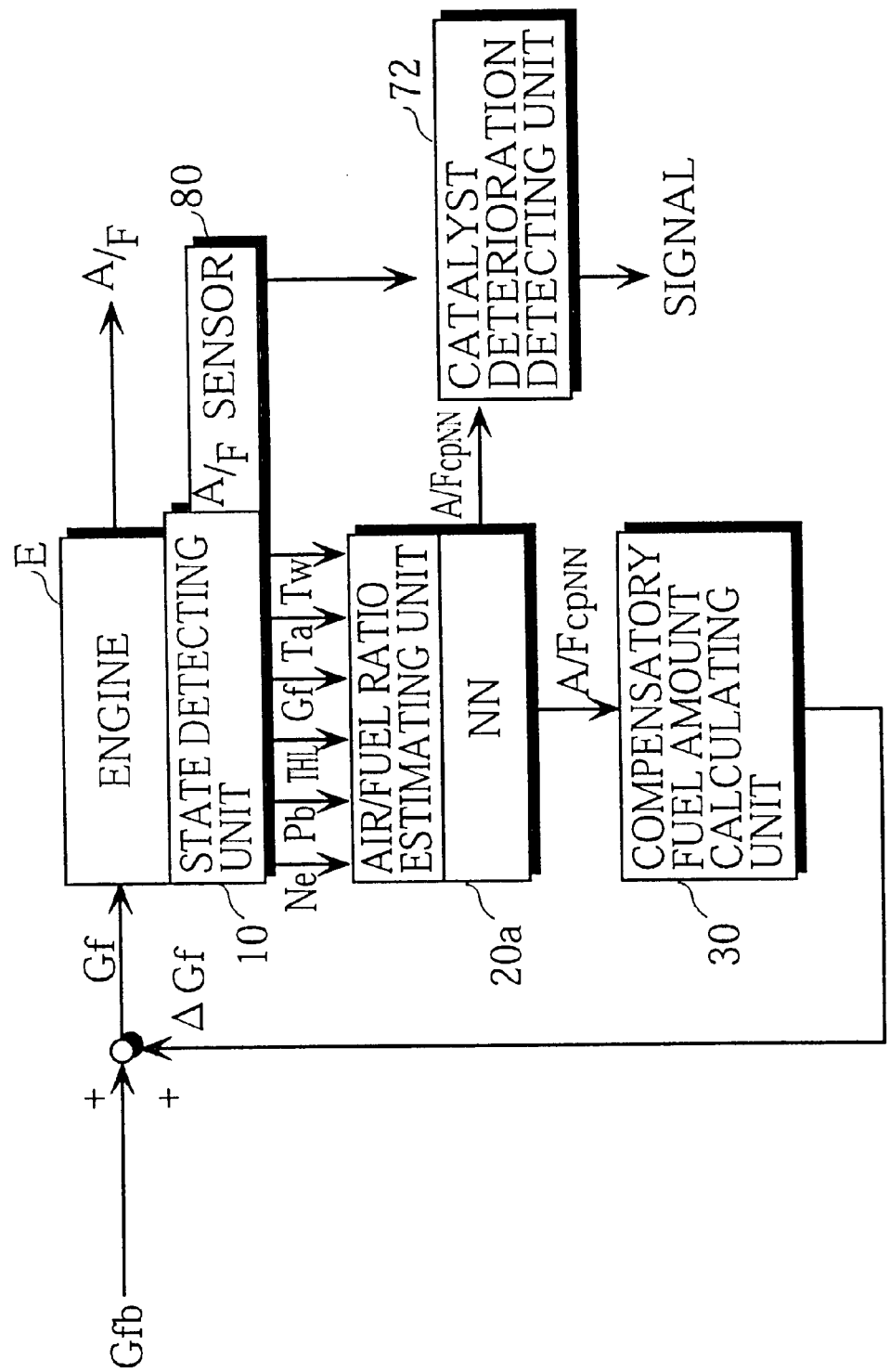

| FUEL TYPE | A | B | C | D | E |
|---|---|---|---|---|---|
| COMPENSATION COEFFICIENT (Cgf) | 0.8 | 0.9 | 1.0 | 1.1 | 1.2 |

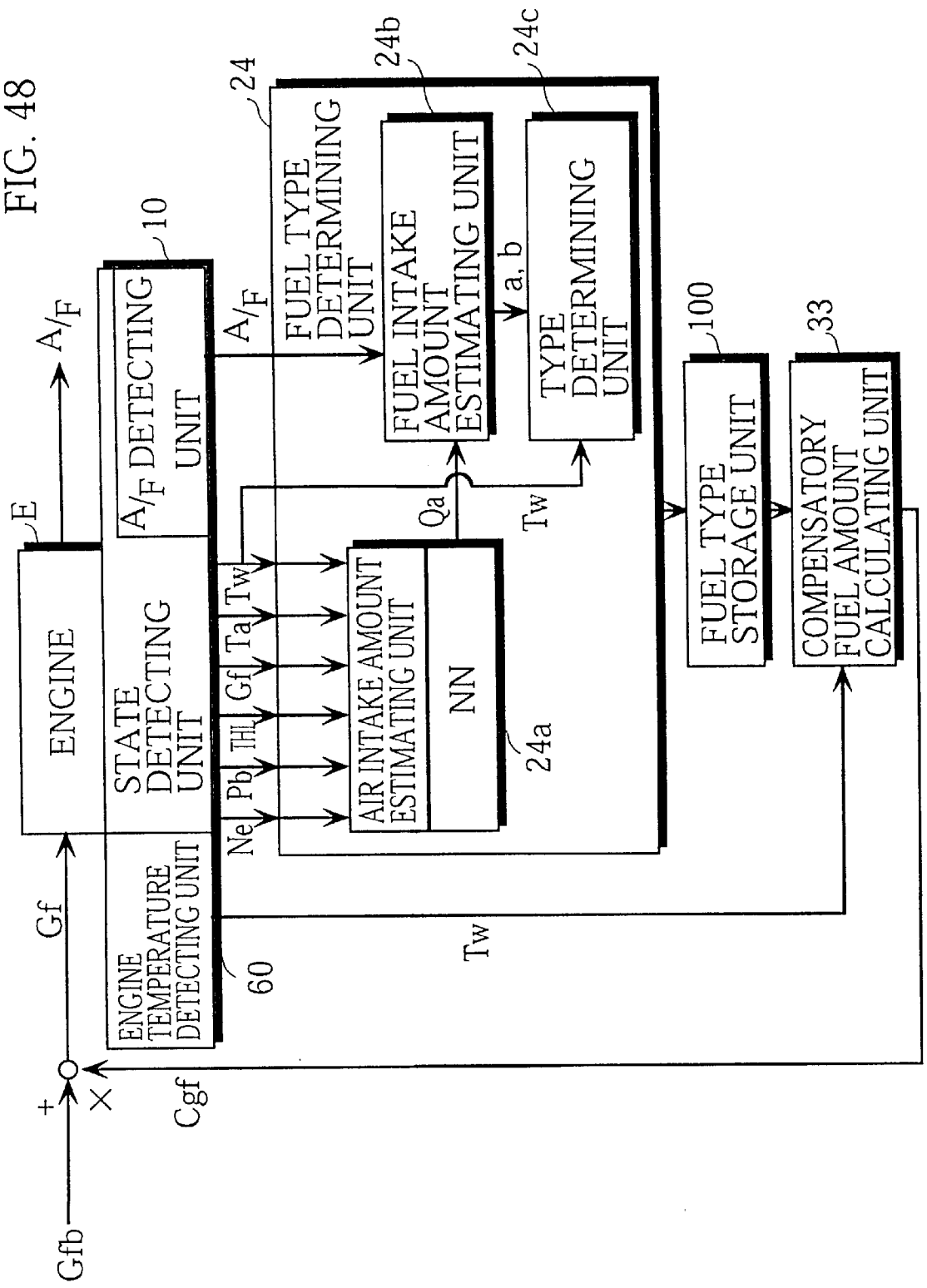

FIG. 49A

| COOLING WATER TEMPERATURE(Tw) | −30〜−10 | −10〜−10 | 10〜30 | 30〜50 | 50〜80 |
|---|---|---|---|---|---|
| | ① | ② | ③ | ④ | ⑤ |

| a \ b | 0〜0.3 | 0.3〜0.6 | 0.6〜1.0 |
|---|---|---|---|
| 0〜0.3 | A | B | C |
| 0.3〜0.6 | B | B | C |
| 0.6〜1.0 | D | D | E |

②

| a \ b | 0〜0.3 | 0.3〜0.6 | 0.6〜1.0 |
|---|---|---|---|
| 0〜0.3 | A | C | C |
| 0.3〜0.6 | D | B | C |
| 0.6〜1.0 | D | D | E |

. . .

AIR/FUEL RATIO CONTROL APPARATUS THAT USES A NEURAL NETWORK

BACKGROUND OF THE INVENTION

1. Field of the Invention

The present invention relates to a control apparatus for an internal combustion gasoline engine with fuel injection control, and more specifically relates to a control apparatus that performs auxiliary control for the air/fuel ratio of the engine using a neural network.

2. Description of the Prior Art

As the number of automobiles has increased in recent years, so has the significance of the problems relating to is exhaust pollution. Many conventional cars have been fitted with catalytic converters to reduce the amount of poisonous gases, ouch as $No_x$, CO, and HC, present in exhaust fumes, with three-way catalytic converters being a representative example of such. A problem, however, for such three-way converters is that the amounts of these gases produced in the engine's cylinders each depends on the air/fuel ratio (the ratio of the flow of air to fuel) in the cylinders of the engine. Here, when a lean (oxygen-rich) air/fuel ratio is used, the catalysts' conversion efficiency for $No_x$ falls off, while when a rich (oxygen-poor) air/fuel ratio is used, the catalysts' conversion efficiencies for HC and CO fall off. As a result, it is essential to keep the air/fuel ratio at a fixed value that enables the most effective conversion of the polluting gases by the three-way catalyst.

Here, the air/fuel ratio must be controlled to keep it at the fixed value regardless of the operational state of the engine. Such air/fuel ratio control performs feed-forward control when the driver adjusts the throttle to make compensated increases and decreases in the amount of injected fuel. It is also common for air/fuel ratio control to perform feedback control of a compensatory amount of injected fuel using readings given by an $O_2$ sensor (which is an air/fuel ratio sensor) and a linear air/fuel ratio sensor (hereinafter referred to as an LAF sensor). These control operations are especially effective under normal driving conditions, such as when the engine is idling or being driven at a constant speed.

In reality, however, even if the fuel is injected into the air intake by an injector, not all of the fuel will flow into the cylinders, with there being complications such as some of the fuel sticking to the walls of the air intake pipe. The amount of gasoline coating the pipes exhibits a complex relation with the driving conditions (such as engine RPM (revolutions per minute) and load (air pressure of the air intake)) and the external environment (such as air intake temperature, cooling water temperature, and atmospheric pressure), with the amount of this coating fuel that evaporates and flows into the cylinders also depending on various factors such as the driving conditions and external environment. As a result, it has been very difficult to accurately control the air/fuel ratio when the engine condition is in a transitional state, which here refers to acceleration or deceleration, using only simple feed-forward and feedback control.

In order to improve the precision of such control, Japanese Laid-Open Patent Application 3-235723 discloses the use or a neural network to study the nonlinear aspects, such as the fuel coating, and to calculate a compensatory amount of injected fuel to increase the responsiveness of the control apparatus to changes in the operational state of the engine. FIG. 1 shows a common example of the construction of a fuel-air ratio control apparatus that uses a neural network. This will be described in outline below. The air/fuel ratio is kept at a fixed level by feed-forward and feedback control which are performed by a control apparatus which has not been shown in the drawing. However, the construction shown in FIG. 1 is also provided and is used to keep the air/fuel ratio at an appropriate value when the engine is in a transitional state.

Conventional air/fuel ratio control apparatuses which use neural networks are equipped with a state detection unit 210 which detects various parameters which show the state of the engine, such as the engine RPM (Ne), the intake air pressure (Pe), the present throttle amount (THL), the injected fuel amount (Cf), the intake air temperature (Ta), the cooling water temperature (Tw), and the air/fuel ratio (A/F) itself. These detected parameters are inputted into a neural network which is designed to study the compensatory amount for the injected fuel amount as its output. This compensatory amount ($\Delta$Gf) for the injected fuel amount calculated by the neural network is estimated by the compensatory fuel amount estimating unit 220. This estimated compensatory fuel amount ($\Delta$Gf) is added to an injected fuel amount (Gf) which is calculated by the control apparatus (not illustrated) to amend the injected fuel amount, and in doing so supplement the control of the air/fuel ratio (A/F). By doing so, more precise control of the air/fuel ratio becomes possible for more complex transitional engine conditions.

However, conventional air/fuel control systems which use neural networks have the output of the air/fuel ratio (A/F) sensor as an input parameter of the neural network, although there are conditions, such as in extreme low temperatures or when the engine has just been started, where this sensor is inactive and so cannot be used. This results in the problem that supplementary control cannot be performed using the neural network until the engine warms up. Even after the engine has warmed up, there is still the problem that the use of the air/fuel ratio sensor for several years will result in a sharp fall in its performance, which will result in discrepancies in the output value of the neural network and reduce the performance of the whole air/fuel ratio control system. This can also lead to irregularities and deterioration of the various components in the air/fuel ratio control system.

There are also cases when too great or too little an amount of fuel is injected into the engine during starting, both of which result in the air/fuel mixture failing to ignite. Here, both cases result in the same result, but the output value of the air/fuel ratio sensor will show that the air/fuel ratio is too lean. Since conventional air/fuel ratio control system: are not able to take into account the various possible causes for the ignition failure of the air/fuel mixture, they will use the detected air/fuel ratio as it is, leading to inaccurate control and the risk that the system will be unable to prevent ignition failures which in turn leads to danger that potentially harmful unburnt fuel will be expelled from the exhaust.

Here, if the circumstances for ignition failures were known, it would be possible to adjust the injected amount of fuel to prevent ignition failures and so keep the operation of the engine smooth. In reality, the detection of the circumstances for an ignition failure during starting would require a pressure sensor to be fitted in each cylinder of the engine. This would raise the cost of the engine and so is not an economically viable option.

When driving their cars, car owners fill the tank with one out of a variety of commercially available brands of gasoline, each of which has different characteristics, such as its evaporation rate. Here, it is possible to conceive an air/fuel ratio control method which takes these differences in evaporation rates, and in particular the great differences in evaporation rates at low temperatures. However, car manufactures are unable to know what gasoline is used by car owners, and, to prevent ignition failures when the engine is cold, adjust the injected fuel amount during starting in accordance with the characteristics of the gasoline which has the worst evaporation rate. As a result, since most drivers will usually use a gasoline with a higher evaporation rate, the injected fuel amount will be higher than necessary, leading to the danger that potentially harmful unburnt fuel will be expelled from the exhaust.

Also, during operation the injected fuel amount in the engine is calculated by feed forward control that is fixed for a classification of gasoline based on the evaporation rate, so that if a different classification of gasoline is used, precise air/fuel ratio control cannot be performed. In particular, the air/fuel ratio sensor will not work at low temperatures, so that compensation using feedback Control and air/fuel ratio control using a conventional neural network will not be possible.

SUMMARY OF THE INVENTION

The first object of the present invention is to provide a control apparatus Which Can appropriately compensate control of air/fuel ratio without needing to consider whether an air/fuel ratio sensor has deteriorated.

The second object of the present invention is to provide a control apparatus which can easily detect any errors or deterioration in an air/fuel ratio control system and appropriately compensate control of air/fuel ratio with regard to such errors or deterioration.

The third object of the present invention is to estimate fuel type using a neural network and to appropriately set the injected fuel amount at low engine temperatures, especially during starting, to prevent ignition failures and the expulsion of unburnt fuel.

The fourth object of the present invention is to perform appropriate control of the air/fuel ratio using a neural network which takes ignition failures into consideration and to have the neural network control the injected fuel amount so that ignition failures do not occur.

The first object or the present invention can be achieved by an air/fuel ratio control apparatus for executing auxiliary control of an air/fuel ratio by compensating an injected fuel amount set by a control system for maintaining the air/fuel ratio at a preset value, the air/fuel ratio control apparatus including; a state detecting unit for detecting a plurality of physical values which can be measured at low temperature and which show a state of an engine, the low temperature being a temperature being a temperature at which an air/fuel ratio sensor cannot operate; an air/fuel ratio estimating unit for receiving the plurality of physical values detected by the state detecting unit as input parameters and for estimating the air/fuel ratio using a neural network; and a compensatory fuel amount calculating unit for calculating a compensatory fuel amount for the injected fuel amount from the estimated air/fuel ratio.

Here, low temperature refers to a temperature at which an air/fuel ratio sensor cannot operate, with for conventional air/fuel ratio sensors such temperatures being 50° C. or below. For the present invention, the detection of a temperature of 0° C. or higher is sufficient. The calculation of the compensatory amount for the injected fuel amount also includes the calculation of a compensatory coefficient which is multiplied with the injected fuel amount to calculate an injected fuel amount which includes a compensatory amount. By doing so, at low temperatures where air/fuel ratio sensors cannot operate, an appropriate compensatory amount for the injected fuel amount can be calculated by having the air/fuel ratio estimated by the neural network, so that air/fuel ratio control can be performed using the neural network at low temperatures or when an air/fuel ratio sensor has deteriorated.

Here, the air/fuel ratio control apparatus may further include: a parameter range judging unit for judging whether at least one of the Input parameters of the air/fuel ratio estimating unit is outside a predetermined range corresponding to the input parameter; and a parameter converting unit for converting an input parameter judged to be outside the corresponding range to a predetermined value.

Here, it is also preferable for the range corresponding to an input parameter to be inputted into the neural network during a learning process and for the range to set a maximum value and a minimum value for a value of the input parameter.

With the above construction, when parameters with are outside a permitted range are to be inputted into the neural network, and especially when parameters which are beyond the learning range for the neural network are to be inputted, the parameters are converted to predetermined values before being inputted into the neural network, so that the accuracy of the estimation of the air/fuel ratio can be maintained.

Here, the air/fuel ratio control apparatus may further include a transition amount detecting unit for detecting a transition amount for the engine, wherein the compensatory fuel amount calculating unit may adjust the compensatory amount for the injected fuel amount based on the detected transition amount.

With the above construction, by suppressing the compensation of the injected fuel amount during normal operation, normal operational biases can be overcome by not adding the air/fuel ratio to the input parameters of the neural network, with appropriate air/fuel ratio control still being possible during transitional engine states. Here, transitional states may be detected by having the transition amount detecting unit detect the transition amount based on an amount of change in at least one of the physical values detected by the state detecting unit. Alternatively, the transition amount detecting unit may detect the transition amount based on an amount of change in air/fuel ratio estimated by the air/fuel ratio estimating unit. Also, the air/fuel ratio control apparatus &ay further include: an air/fuel ratio sensor for detecting the air/fuel ratio, wherein the transition amount detecting unit may detect the transition amount based on an amount or change in the air/fuel ratio detected by the air/fuel ratio sensor.

Here, the neural network used by the air/fuel ratio estimating unit may perform a learning process using teaching data which includes information showing that if an output of the air/fuel ratio sensor is an air/fuel ratio which is not compatible with the injected fuel amount, then the air/fuel ratio is not too lean but too rich.

With the above construction, even when a reading showing that the fuel/air mixture is too lean is given when an ignition failure occurs due to the injection of an excessive amount of fuel, control to further increase the injected fuel amount can be suppressed, so that air/fuel ratio control can be improved.

Here, the air/fuel ratio control apparatus may further include a fuel type determining unit for determining a fuel type used by the engine, wherein the air/fuel ratio estimating unit may include a numeric value which corresponds to properties of the determined fuel type as an input parameter.

With the above construction, air/fuel ratio control can be performed in accordance with the fuel type selected by the driver.

Here, an air/fuel ratio control apparatus, for executing auxiliary control of an air/fuel ratio by compensating an injected fuel amount set by a control system for maintaining the air/fuel ratio at a preset value, includes: a state detecting unit for detecting a plurality of physical values which show a state of an engine, including an injected fuel amount and an air/fuel ratio; an intake air amount estimating unit for estimating a cylinder intake air amount using a neural network with at least two of the physical values detected by the state detecting unit as input parameters; and a compensatory fuel amount calculating unit for calculating a compensatory fuel amount for the injected fuel amount from the injected fuel amount and the air/fuel ratio detected by the state detecting unit and from the cylinder intake air amount estimated by the intake air amount estimating unit.

With the above construction, the object estimated by the neural network can be specifically detected, so that compensation during the learning process and the detection of the causes of any problems become easier, thereby assisting the development of the system.

The first object of the present invention can also be achieved by an air/fuel ratio auxiliary control apparatus for executing auxiliary control of an air/fuel ratio by compensating an injected fuel amount set by a control system for maintaining the air/fuel ratio at a preset value, the air/fuel ratio control apparatus including; a state detecting unit for detecting a plurality of physical values which can be detected at low temperature and which show a state of an engine, the low temperature being a temperature being a temperature at which an air/fuel ratio sensor cannot operate; a change amount estimating unit for estimating an amount of change in a physical value related to the air/fuel ratio using a neural network, with the detected plurality of physical values as input parameters; and a compensatory fuel amount calculating unit for calculating a compensatory fuel amount for the injected fuel amount from the estimated amount of change in the physical value related to the air/fuel ratio.

Here, the physical values related to air/fuel ratio are physical values which direct affect the magnitude of the air/fuel ratio. The change amount refers the rate of change and/or to the speed of change. With the above construction, the air/fuel ratio can be estimated by a neural network at low temperatures at which air/fuel ratio sensors cannot operate, with the estimated air/fuel ratio then being used to calculate the compensatory fuel amount. Since the compensatory fuel amount is calculated from the change amount, the effects of normal operational bias can be removed by not using air/fuel ratio as an input parameter of the neural network.

Here, the change amount estimating unit may have the plurality of detected physical values as input parameters, the change amount estimating unit may use a neural network to estimate a physical value related to the air/fuel ratio, and the change amount estimating unit may estimate an amount of change in the input parameter related to the air/fuel ratio by calculating a change amount in the physical value.

Also, the physical value related to the air/fuel ratio may be air/fuel ratio.

Here also, the neural network used by the air/fuel ratio estimating unit may perform a learning process using teaching data which includes information showing that if an output of the air/fuel ratio sensor is an air/fuel ratio which is not compatible with the injected fuel amount, then the air/fuel ratio is not too lean but too rich. By doing so, appropriate control can be performed when the ignition failures occur due to the excessive injection of fuel.

The second object of the present invention can be achieved by an error/deterioration detecting apparatus which detects errors and deterioration in an air/fuel ratio control system that is composed of a control system for performing auxiliary control for control of an air/fuel ratio by compensating an injected fuel amount to keep the air/fuel ratio at a preset value, the error/deterioration detecting apparatus including: a state detecting unit for detecting a plurality of physical values which can be measured at low temperature and which show a state of an engine, the low temperature being a temperature being a temperature at which an air/fuel ratio sensor cannot operate; an air/fuel ratio estimating unit for receiving the plurality of physical values detected by the state detecting unit as input parameters and for estimating the air/fuel ratio using a neural network; an air/fuel ratio sensor for detecting the air/fuel ratio; and an error/deterioration detecting unit for comparing the air/fuel ratio estimated by the air/fuel ratio estimating unit and the air/fuel ratio detected by the air/fuel ratio sensor to detect any errors or deterioration in the air/fuel ratio control system.

With the above construction, if the difference between the estimated air/fuel ratio and the detected air/fuel ratio is within a valid range, the system can know that there are no errors or deterioration in the air/fuel ratio sensor or in the air/fuel ratio estimating system.

Here, the error/deterioration detecting unit may compare the air/fuel ratio estimated by the air/fuel ratio estimating unit with the air/fuel ratio detected by the air/fuel ratio sensor to detect the dynamic characteristics of the air/fuel ratio sensor.

With the above construction, the dynamic characteristics of the air/fuel ratio sensor can be detected and, as one example, the feedback gain of the system which performs feedback control using an air/fuel ratio can be appropriately adjusted.

Here, the dynamic characteristics of the air/fuel ratio sensor can be detected by having the error/deterioration detecting unit perform differential calculation for changes with time or the air/fuel ratio estimated by the air/fuel ratio estimating unit and for changes with time of the air/fuel ratio detected by the air/fuel ratio sensor to find respective extreme values, and find phase delay and change in gain for the air/fuel ratio sensor from a detected time and detected value or the extreme values. The dynamic characteristics of the air/fuel ratio sensor can also be detected by the error/deterioration detecting unit using a neural network which calculates changes in the dynamic characteristics of the air/fuel ratio sensor, the neural network having at least one of the physical values detected by the state detecting unit, in addition to the air/fuel ratio estimated by the air/fuel ratio estimating unit and the air/fuel ratio detected by the air/fuel ratio sensor as input parameters.

Also, the air/fuel ratio estimating unit may estimate an air/fuel ratio in an exhaust pipe before a catalytic converter, the air/fuel ratio sensor may detect an air/fuel ratio in the exhaust pipe after the catalytic converter, and the error/deterioration detecting unit may detect deterioration in the catalytic converter by comparing the air/fuel ratio estimated by the air/fuel ratio estimating unit with the air/fuel ratio detected by the air/fuel ratio sensor. By doing so, deterioration in the catalyst can be detected, so that the driver may then have the catalyst changed.

Also, the error/deterioration detecting apparatus may further include: a comparison result signal generating unit for outputting a comparison result signal when an absolute value for a deviation between the air/fuel ratio detected by the air/fuel ratio sensor and a stoichiometric value is equal to or below a predetermined first set value; and a state detection inaccuracy judging unit for comparing, when the comparison result signal has been outputted, an absolute value of a deviation between the air/fuel ratio estimated by the air/fuel ratio estimating unit and the air/fuel ratio detected by the air/fuel ratio sensor with a predetermined second set value, and for judging that an error or deterioration has occurred in the state detecting unit when the absolute value is equal to or above the predetermined second set value. By doing so, when the stoichiometric value, at which the output value of the air/fuel ratio sensor hardly changes as the air/fuel ratio censor deteriorates, is detected, the detected air/fuel ratio and estimated air/fuel ratio can be compared. If there is a certain difference between the two, the estimated value can be judged as erroneous. By doing so, the system can detect errors and deterioration in the state detecting unit which detects the physical values used as input parameters into the neural network.

Here, the error/deterioration detecting apparatus may further include: an air/fuel sensor inaccuracy judging unit for comparing, when no comparison result signal has been outputted and no error or deterioration has been detected in the state detecting unit by the state detection inaccuracy judging unit, an absolute value or a deviation between the air/fuel ratio estimated by the air/fuel ratio estimating unit and the air/fuel ratio detected by the air/fuel ratio sensor with a predetermined third set value, and for judging that an error or deterioration has occurred in the air/fuel ratio sensor when the absolute value is equal to or above the predetermined third set value. By doing also, when there is no error in the estimated air/fuel ratio, and the air/fuel ratio is not at the stoichiometric value, so that any deterioration in the air/fuel ratio sensor will be easily detectable, the detected air/fuel ratio and estimated air/fuel ratio can be compared. If there is a certain difference between the two, the detected value can be judged as erroneous. By doing so, the system can detect errors and deterioration in the air/fuel ratio sensor.

Here, at least one of the comparison result signal generating unit, the state detection inaccuracy judging unit, and the air/fuel sensor inaccuracy judging unit, in comparing an absolute value with a predetermined set value, may set the absolute value at an average of deviations in a fixed sampling time period.

Here, the error/deterioration detecting apparatus may further include: an exhaust mixing rate estimating unit for estimating a mixing rate for an exhaust of each cylinder in an exhaust gathering unit using a neural network, with physical values detected by the state detecting unit as input parameters; a comparison result signal generating unit for outputting a comparison result signal when an absolute value for a deviation between the air/fuel ratio detected by the air/fuel ratio sensor and a stoichiometric value is below a predetermined first set value; a single cylinder defect judging unit for comparing, when a comparison result signal has been outputted and exhaust mixing rate estimated for a specific cylinder by the exhaust mixing rate estimating unit has a highest value, an absolute value for a deviation between the air/fuel ratio estimated by the air/fuel ratio estimating unit and the air/fuel ratio detected by the air/fuel ratio sensor with a predetermined fourth set value, and for detecting an error or deterioration in the specific cylinder when the absolute value is equal to or above the predetermined fourth set value.

By doing so, when the stoichiometric value, at which the output value of the air/fuel ratio sensor hardly changes as the air/fuel ratio sensor deteriorates, is detected, and most of the exhaust gas is expelled by a specified cylinder, the detected air/fuel ratio and estimated air/fuel ratio can be compared. If there is a certain difference between the two, the specified cylinder can be judged as having a problem, thereby assisting the maintenance of the engine.

Here, at least one of the comparison result signal generating unit and the single cylinder defect judging unit, in comparing an absolute value with a predetermined set value, sets the absolute value at an average of deviations in a fixed sampling time period.

The second object of the present invention can also be achieved by an air/fuel ratio control apparatus for executing auxiliary control of an air/fuel ratio by compensating an injected fuel amount set by a control system for maintaining the air/fuel ratio at a preset value, the air/fuel ratio control apparatus including: a state detecting unit for detecting a plurality of physical values which can be measured at low temperature and which show a state of an engine, the low temperature being a temperature being a temperature at which an air/fuel ratio sensor cannot operate; an air/fuel ratio sensor for detecting an air/fuel ratio; an operational state detecting unit for detecting physical values which express a state of an engine and for judging whether the engine is in a certain operational state, based on the physical values; a response time detecting unit for changing, when the engine is judged to be in the certain operational state, at least one of the physical values detected by the state detecting unit, and for measuring and storing a response time which is a time taken from a change in the physical value to a time a change is detected in the air/fuel ratio detected by the air/fuel ratio sensor; an air/fuel ratio estimating unit for estimating the air/fuel ratio using a neural network, with the plurality of detected physical values and stored response time as input parameters; and a compensatory fuel amount calculating unit for calculating a compensatory amount for the injected fuel amount from the estimated air/fuel ratio.

By doing so, when the engine is in the predetermined state, the response time for the air/fuel ratio sensor is measured, and the air/fuel ratio can be estimated by the neural network with regard to this response time. Accordingly, an appropriate air/fuel ratio can still be outputted when the air/fuel ratio sensor deteriorates and its response time increases, so that a proper compensatory fuel amount can be calculated based on this air/fuel ratio. Here, the neural network used by the air/fuel ratio estimating unit may perform a learning process using an output signal of a non-defective air/fuel ratio sensor as a teaching signal for study data obtained using a deteriorated air/fuel ratio sensor.

The third object of the present invention can be achieved by an air/fuel ratio control apparatus for executing auxiliary control of an air/fuel ratio by compensating an injected fuel amount set by a control system for maintaining the air/fuel ratio at a preset value, the air/fuel ratio control apparatus including: a state detecting unit for detecting a plurality of physical values which show a state of an engine; a fuel type determining unit for determining a fuel type using a neural network, with the detected plurality of physical values as input parameters; an operational state judging unit for detecting a physical value which expresses a state of an engine and for judging whether the engine is in a certain operational state, based on the physical values; a fuel compensatory amount calculating unit for calculating, when the engine is in the certain operational state, a compensatory amount for the injected fuel amount from the fuel type detected by the fuel type determining unit.

With the stated construction, a neural network can estimate the fuel type used by the engine, so that a compensatory amount for the injected fuel amount can be calculated in the predetermined engine state in accordance with the detected fuel type. As a result, air/fuel ratio control can be performed in accordance with the fuel type selected by the driver.

This type of compensation of the injected fuel amount in accordance with the fuel type is especially desirable when the engine is being started or when the engine is cold. Here, the starting state for the engine can be detected by detecting the application of a current to the spark plugs, while low temperatures can be detected by detecting the temperature of the engine.

The accuracy or estimation can be further improved by detecting the battery voltage and the number of crank revolutions from the application of the current to the spark plugs to the complete ignition of the fuel/air mixture, and using these as input parameters when estimating. Also, by only performing the determination of fuel type at a temperature at which the differences between different fuel types can be detected, more precise determination of the fuel type can be performed.

Here, the state detecting unit may detect at least an injected fuel amount and an air/fuel ratio as physical values, and the fuel type determining unit may include: an intake air amount estimating unit for estimating a cylinder intake air amount using a neural network, with the plurality of detected physical values as input parameters; a fuel characteristics calculating unit for calculating at least one of a fuel evaporation rate and a fuel adhesion rate from the air/fuel ratio and injected fuel amount detected by the state detecting unit, and from the cylinder intake air amount estimated by the intake air amount estimating unit; and a type determining unit for determining a fuel type from the fuel evaporation rate and/or a fuel adhesion rate calculated by the fuel characteristics calculating unit.

When doing so, it is desirable to have the fuel type determined from a record of the evaporation rate and adhesion rate of the fuel.

Here, the first injected fuel mount used when the engine is restarted after stopping may be set using the fuel type which was detected by the fuel type determining unit the previous time the engine was operated, meaning that appropriate control of the air/fuel ratio can be performed even during starting.

Here, the air/fuel ratio control apparatus may further include: an air/fuel ratio estimating unit for estimating, when a standard fuel type is being used to power the engine, the air/fuel ratio using a neural network which estimates the air/fuel ratio using the detected physical values as input parameters, the neural network performing a learning process with the physical values detected by the state detecting unit as input parameters; an air/fuel ratio sensor for detecting the air/fuel ratio; and a fuel type estimating unit for estimating a fuel type using the air/fuel ratio estimated by the air/fuel ratio estimating unit and the air/fuel ratio detected by the air/fuel ratio sensor.

The fourth object of the present invention can be achieved by a control apparatus for compensating a fluctuation component, the control apparatus being installed in a control system where an inputted parameter in a factor adding a fluctuation component to a control object, the control apparatus including: a convergence extent estimating unit for estimating an extent of convergence for the control object, using a neural network which has a physical value related to the control object as an input parameter; a compensatory amount calculating unit for calculating a compensatory amount for the inputted parameter so that convergence is quickly achieved for the control object, using the estimated extent of convergence.

One specific example is an air/fuel ratio control apparatus for executing auxiliary control of an air/fuel ratio by compensating an injected fuel amount set by a control system for maintaining the air/fuel ratio at a preset value, the air/fuel ratio control apparatus including: a state detecting unit for detecting a plurality of physical values which show a state of an engine; an ignition failure extent estimating unit for estimating an extent of ignition failure using a neural network, with the detected plurality of physical values as Input parameters: and a compensatory fuel amount calculating unit for calculating the compensatory amount for the injected fuel amount, based on the estimated extent of ignition failure obtained from the ignition failure extent estimating unit.

By doing so, the ignition failure extent can be estimated by the neural network, so that the compensatory amount for the injected fuel amount can then be calculated in accordance with this ignition failure extent. By doing so, appropriate control of air/fuel ratio can be performed in accordance with ignition failures.

Here, it is also preferable to have control of air/fuel ratio performed in accordance with ignition failures during starting, and the learning process of the neural network can be simplified by limiting such control to when to engine is started.

Here, the neural network used by the ignition failure extent estimating means may perform a learning process which uses teaching data including information that sets the extent of ignition failure at zero when, for a time period between the engine starting and the engine reaching a normal operational state, a rate of change of an output of the air/fuel ratio sensor is negative.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 26 is a functional block diagram showing a different example of an air/fuel ratio control apparatus or the sixth embodiment which includes an error/deterioration detection apparatus;

FIG. 27 is a functional block diagram showing the air/fuel ratio control apparatus of the seventh embodiment which includes an error/deterioration detection apparatus;

FIG. 48 shows another example of the air/fuel ratio control apparatus of the eleventh embodiment;

FIG. 49A shows a part of the table used by the fuel type determining unit;

FIG. 49B shows another part of the table used by the fuel type determining unit;

DESCRIPTION OF THE PREFERRED EMBODIMENTS

The following is a description of the embodiments of the present invention, with reference to the drawings.

First Embodiment

Figure 2:
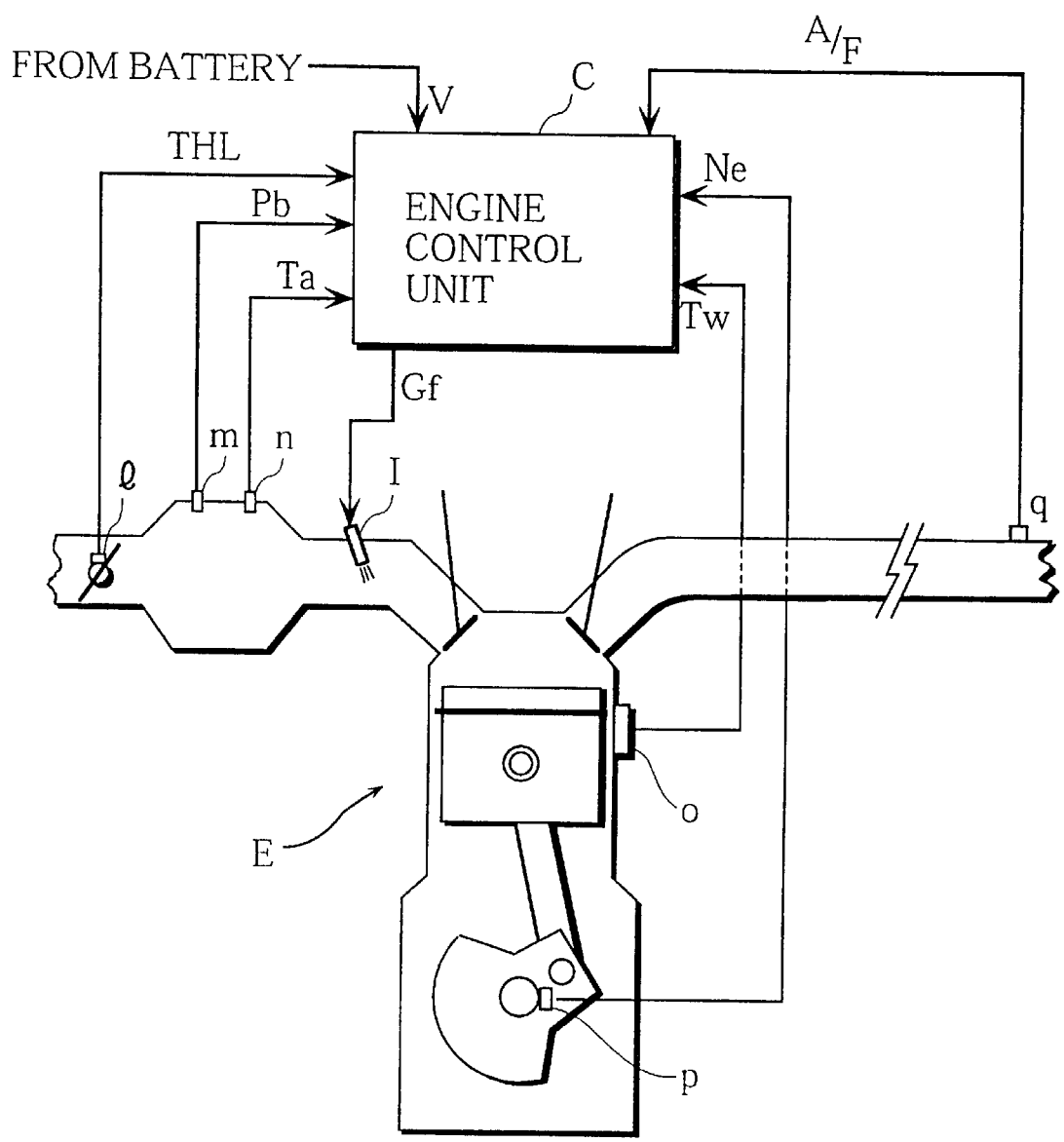
FIG. 2 shows the construction of the entire control apparatus to which the first embodiment relates.

FIG. 2 shows an outline model of the construction of the control apparatus which includes the air/fuel ratio control apparatus or the first embodiment of the present invention. As shown in FIG. 2, the outputs of the throttle sensor 1, the intake air pressure sensor m, the intake air temperature sensor n, the cooling water temperature sensor o, the crank RPM sensor p, the air/fuel ratio sensor q, and, depending on the occasion, the battery voltmeter v are inputted into the engine control unit C which then calculates an injected fuel amount (Gf) which keeps the air/fuel ratio at a specific value. The engine control unit C outputs this calculated injected fuel amount Gf to the injector I which injects the indicated amount of fuel into the engine. Note here that the output of the air/fuel ratio sensor q is not used when the engine is cold.

Figure 3:
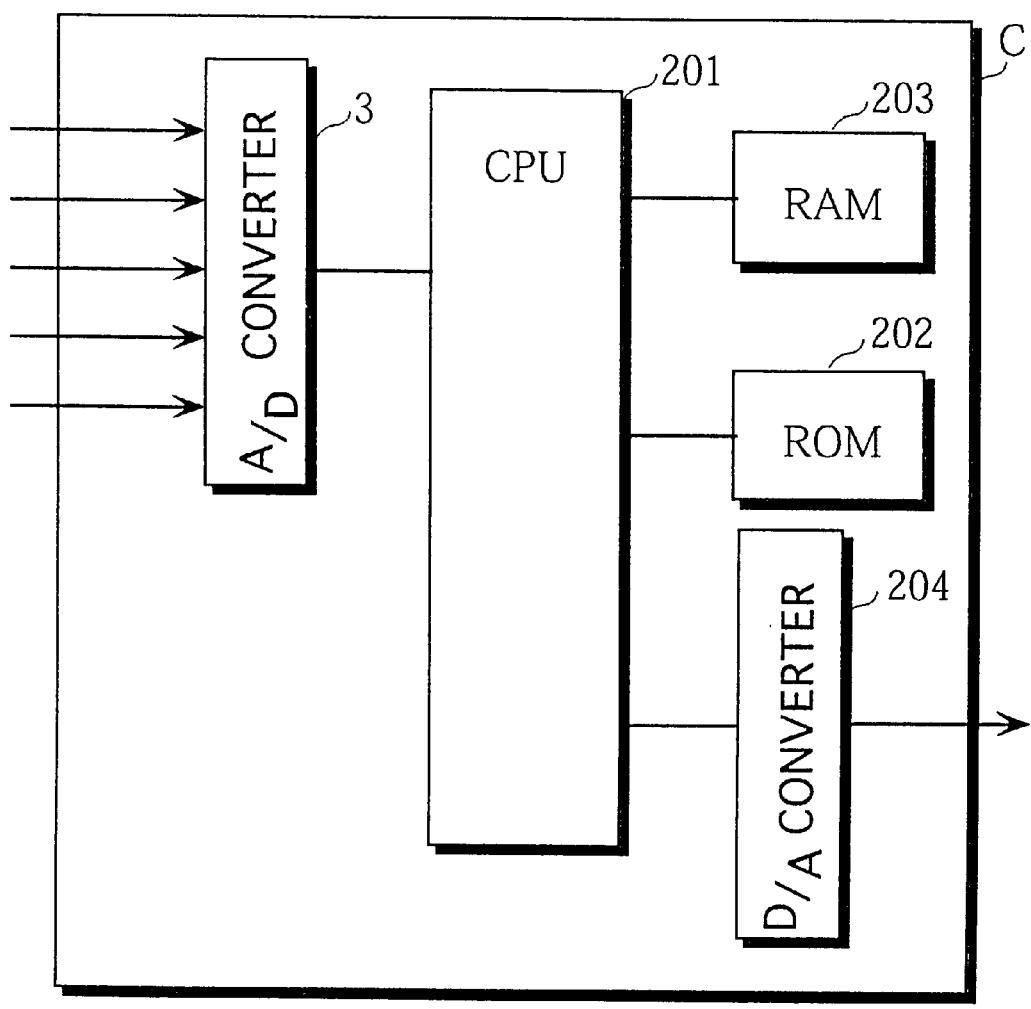
FIG. 3 shows the hardware construction of the engine control unit.

The hardware construction of the engine control unit C is shown in FIG. 3, As shown in the figure, the engine control unit C is composed of a CPU 201 for performing calculations, a ROM 202 which stores such information as a control program, various maps, weighting values for the neural network, threshold values, and transfer functions, a RAM 203 which is used to store calculated values, an A/D converter 3, and a D/A converter 204.

Figure 4:
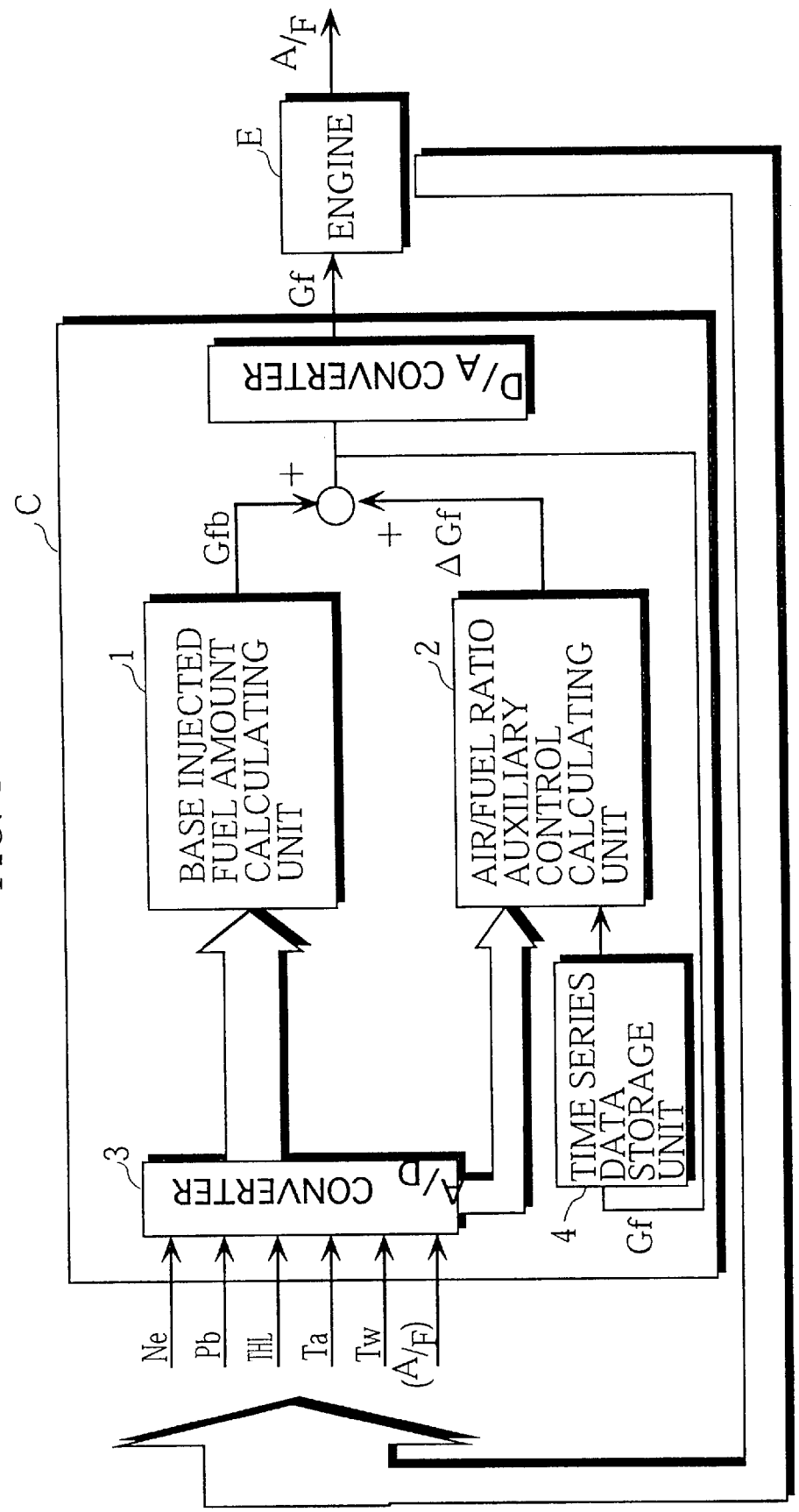
FIG. 4 is a functional block diagram which shows the construction of the engine control unit.

FIG. 4 is a functional block diagram for the engine control unit C which is achieved by the hardware construction of FIG. 3. As shown in this drawing, the engine control unit C is mainly composed of a base injected fuel amount calculating unit 1 and an air/fuel ratio supplementary control calculating unit 2.

The base injected fuel amount calculating unit 1 performs feed forward control using a map for the inputs from all of the sensors after they have been converted to digital values by the A/D converter 3, in addition to feedback control from the air/fuel ratio sensor q within its operational temperature range to calculate the base injected fuel amount (Gfb) according to conventional techniques. During normal operation of the engine, only the air/fuel ratio (A/F) In the engine is kept at the specified value by the operation of this base injected fuel amount calculating unit 1 alone.

The air/fuel ratio supplementary control calculating unit 2 calculates a correction amount (ΔGf) which is added to the base injected fuel amount (Gfb) calculated by the base injected fuel amount calculating unit 1 during transitional operation of the engine. Thin correction amount (ΔGf) for the injected fuel amount (Gf) is calculated by a neural network using the output of each sensor and the injected fuel amount (Gf) in the previous control cycle, which is the total of the base injected fuel amount (Gfb) calculated by the base injected fuel amount calculating unit 1 and the correction amount (ΔGf) calculated by the air/fuel ratio supplementary control calculating unit 2 in the previous control cycle. This air/fuel ratio supplementary control calculating unit 2 is the main component of the air/fuel ratio control apparatus of the present invention, It should be noted here that the correction amount (ΔGf) for the injected fuel amount is calculated by a neural network without using the output of the air/fuel ratio sensor q, although the system can be set so that the output of the air/fuel ratio sensor q is not used when the engine is cold but is used within the operating temperature range of the air/fuel ratio sensor q, with the neural network being set to switch its calculation procedure in accordance with such temperature changes.

The following is an outline of the control operation of the construction described above. First, when the car is being driven, sensors l to p and, if appropriate, sensor q are used to detect the current condition of the engine E, with the output of each sensor being converted by the A/D converter 3 and then inputted into the base injected fuel amount calculating unit 1 which uses the sensor outputs to calculate the base injected fuel amount (Gfb). Here, time series data for the actual injected fuel amounts (Gf) calculated in previous control cycles is stored in the time series data storage unit 4 which is provided inside the RAM. These injected fuel amounts stored in the time series data storage unit 4 are inputted into the air/fuel ratio supplementary control calculating unit 2 together with the engine parameters detected by the various sensors and converted by the D/A converter 3, The air/fuel ratio supplementary control calculating unit 2 then calculates a compensatory amount (ΔGf) for the injected fuel amount. The results of those calculations, (Gfb) and (ΔGf), are then added to give the actual injected fuel amount (Gf) which is the amount of fuel injected into the engine E by the injector I. It should be noted here that while the time series data storage unit 4 has been described as only storing a time series of injected fuel amounts (Gf), it may also store time series data for the outputs of the sensors.

Figure 1:
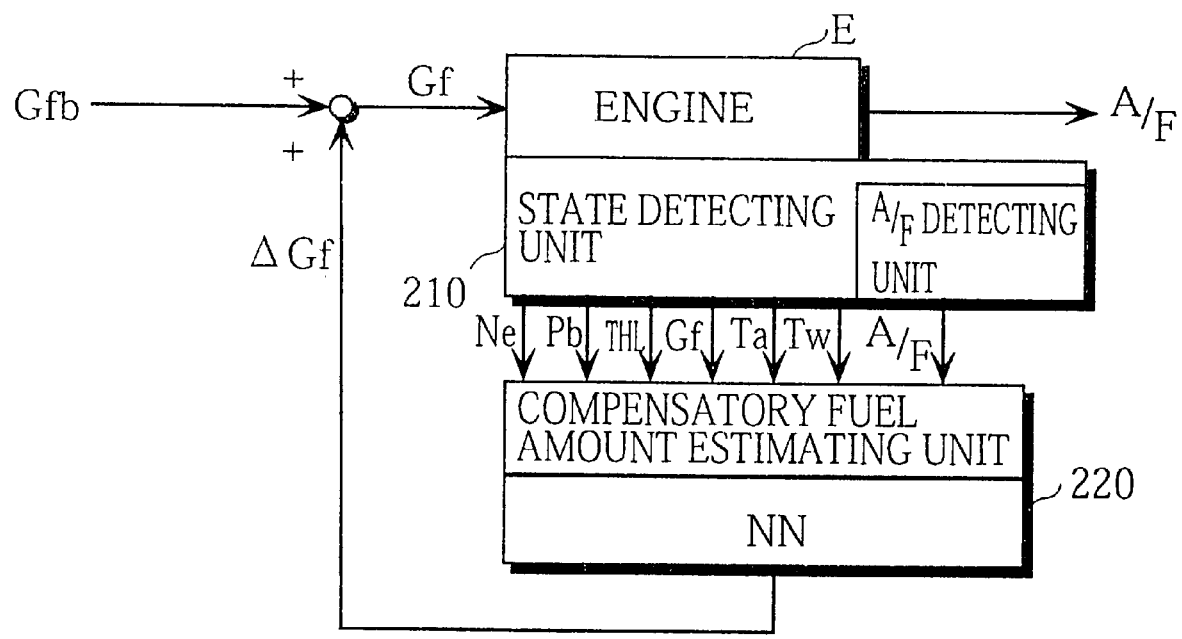
FIG. 1 is a block diagram showing the construction of a conventional air/fuel ratio control apparatus.

FIG. 4 is a functional block diagram showing the construction of the air/fuel ratio control apparatus of this first embodiment. As shown in the figure, this air/fuel ratio control apparatus is composed of a state detecting unit 10, an air/fuel ratio estimating unit 20, and a compensatory fuel amount calculating unit 30. Here, the air/fuel ratio compensatory control calculating unit 2 is composed of the air/fuel ratio estimating unit 20 and the compensatory fuel amount calculating unit 30, while the base injected fuel amount calculating unit 1 is composed of all of the sensors, the A/D converter 3, and the time series data storage unit 4. It should be noted here that the air/fuel ratio control apparatus of each of the following embodiments are each used as one part of the control apparatus shown in these FIGS. 1 to 3.

The state detection 10 is the part of the control apparatus that detects a variety of physical parameters which show the state of the engine E and which may be detected even when the engine is cold. As before, the physical parameters which are detected here are the engine RPM (Ne), the intake air pressure (Pb), the present throttle amount (THL), the injected fuel amount (Cf), the intake air temperature (Ta), and the cooling water temperature (Tw), with the state detecting unit 10 being composed of sensors for the above values, a CPU 201 which uses the values of each sensor to perform certain calculations on the values detected by the sensors, and a RAM 203 which stores the injected fuel amount in the previous control cycles. It should be noted here that the present invention is not limited to using the parameters listed above, and so may also detect other physical values.

The air/fuel ratio estimating unit 20 receives an input of the physical values detected by the state detecting unit 20 as parameters, and is the part of the control apparatus which estimates the air/fuel ratio using the neural network which is described in detail below.

Figure 5:
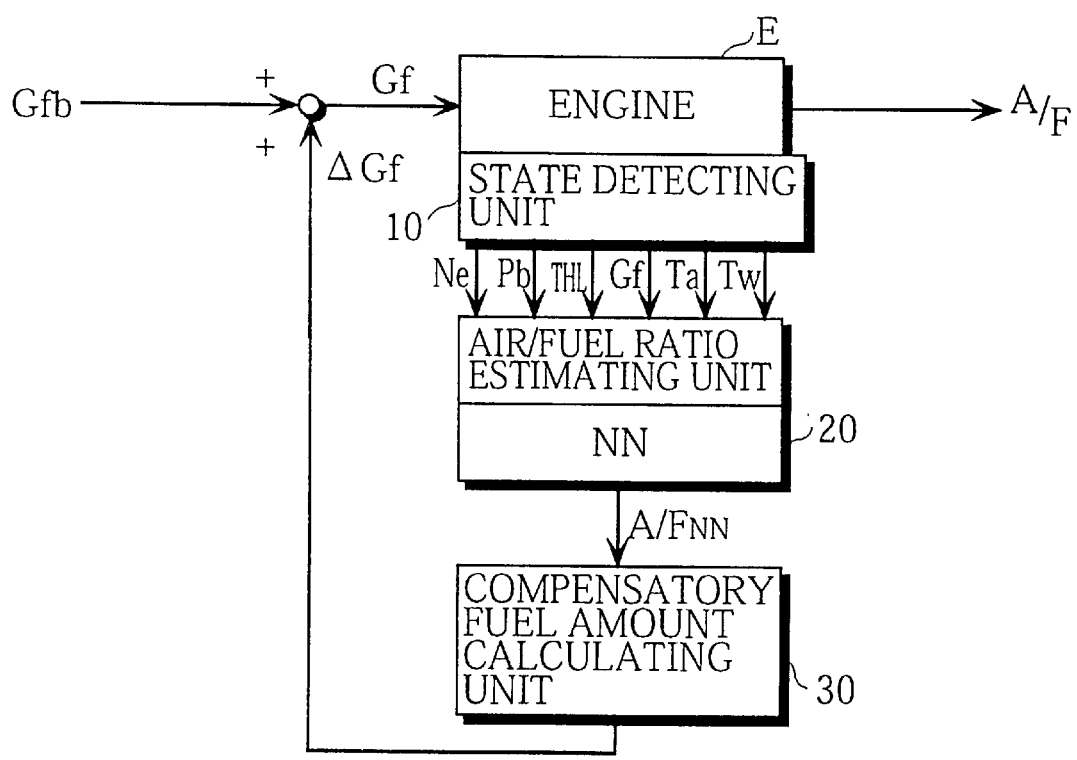
FIG. 5 is a functional block diagram for the air/fuel ratio control apparatus of the first embodiment.

The learning process for the neural network used by the air/fuel ratio estimating unit 20 is shown in FIG. 5. FIG. 5 shows a model example of the learning process for a neural network which estimates the air/fuel ratio with engine RPM (Ne), intake air pressure (Pb), present throttle amount (THL), injected fuel amount (Gf), intake air temperature (Ta), and cooling water temperature (TW) as its input parameters. Here, learning data in gathered by installing an air/fuel ratio sensor (LAF sensor) 10a directly after the exhaust valve of each cylinder or in the exhaust pipe gathering unit, and by installing each of the state detecting unit 10 shown in FIG. 4 into the engine E to gather the input parameters. By doing so, the neural network can obtain learning data for the actual operation of the engine. Here, the air/fuel ratio sensors 10a are initially heated, so that even if the engine itself is cold, the sensors will be able to operate normally. The detected air/fuel ratio (A/F) is inputted into the neural network together with each of the parameters, with the neural network being constructed to detect the deviation e between the detected fuel air ratio (A/F) and the estimated air/fuel ratio ($A/F_{NN}$) and to change its construction so that this deviation e falls within a permitted range, such as 0.1 on the air/fuel ratio scale. Here, in view of the detection delay of the air/fuel ratio sensor 10a, appropriate feed forward control is achieved by using delayed learning data for comparing inputted data. Here, the previous inputted values of each of the parameters may also be used as input parameters, with it being possible in such case for the time series data storage unit 4 to store time series data for the parameters.

Changes in the construction of the neural network based on the deviation e are performed according to a back propagation method, whereby each of the input parameters is converted according to a transfer function, with the weighting value used to multiply each converted input parameter and the threshold value for each processing unit being changed with a predetermined method according to the value of the deviation e. Here, a sigmoidal tangent function (f(x)=tanh(x)) is used as the transfer function. However, so long as the neural network obtains the value of the air/fuel ratio from each of the stated parameters, a variety of constructions may be used. This is also the case with the learning processes of the neural networks referred to in the following embodiments. As a result of these learning processes, the neural network can estimate an air/fuel ratio (A/F) for a transitional state of the engine when the amount of throttle is being changed.

The compensatory fuel amount calculating unit 30 calculates the compensatory amount (ΔGf) for the injected fuel amount from the air/fuel ratio (A/F) estimated by the air/fuel ratio estimating unit 20 which is equipped with the neural network described above. More specifically, the relation between the air/fuel ratio (A/F) and the compensatory amount (ΔGf) for the injected fuel amount is set as approximating to a P (proportionate) or PI (proportionate, differential) relation, so that (ΔGf) may be calculated according to an equation such as (ΔGf)=K1*(A/F) or (ΔGf)=K1*(A/F)+K2*ΣA/F Here, K1 and K2 are constants whose values are set in accordance with the results of experimentation.

The following is a description of the operation of the air/fuel ratio control apparatus of the above construction. First, the state detecting unit 10 detects the engine RPM (Ne), intake air pressure (Pb), present throttle amount (THL), injected fuel amount (Gf), intake air temperature (Ta), and cooling water temperature (Tw). Next, the neural network in the air/fuel ratio estimating unit 20 estimates the air/fuel ratio with the physical values detected by the state detecting unit 10 as its input values. The compensatory fuel amount calculating unit 30 then calculates the compensatory fuel amount (ΔGE) using the estimated air/fuel ratio (A/F). This compensatory fuel amount (ΔGf) is then added to the base injected fuel amount (Gfb) calculated by the base injected fuel amount calculating unit 1 to give the actual injected fuel amount (Gf) which then outputted to the injector I so that the appropriate amount of fuel is injected into the engine S.

FIG. 6A shows the results of feedback control using an $O_2$ sensor when the throttle is suddenly opened or closed, thereby changing the axial torque for 5 kgm to 10 kgm when Ne=2000 rpm. FIG. 6B shows the result of control performed by the air/fuel ratio control apparatus of the present embodiment under the same conditions. As can be seen by comparing FIGS. 6A and 6B, there is less fluctuation in the air/fuel ratio in FIG. 6B, with such fluctuations being kept within a given range during transitional operation of the engine, even when a detected value of the air/fuel ratio sensor in not inputted.

With the air/fuel ratio control apparatus of the above construction, the inputs into the neural network do not include the output from an air/fuel ratio sensor which would not function when the engine is cold, so that accurate feed forward control can be performed using the neural network even when the engine is started from cold. It is also no longer necessary to consider the deterioration or an air/fuel sensor over years of use.

Here, it is desirable for the neural network used by the air/fuel ratio estimating unit 20 to perform its learning process with consideration to ignition failures in the engine. This refers to cases during engine operation, and especially when the engine is started, when too much fuel is injected by the injector I resulting in an air/fuel mixture which is too rich, or conversely too little fuel is injected causing a mixture which is too lean, which fails to ignite in the engine's cylinders. In either of these cases, the air/fuel ratio sensor provided either after the exhaust valve of each cylinder or in the exhaust pipe gathering unit will detect the cylinder airflow as it is, so that air/fuel sensor output value in both cases will indicate that the mixture is too lean. Should a neural network use this detected value which indicates that the mixture is too lean regardless of the fact that the mixture is too rich, the neural network will output an erroneous indication for the injector I to inject yet more fuel. For this reason, it is desirable for the neural network to study the causes of ignition failures to avoid such erroneous control indications.

Figure 7A:
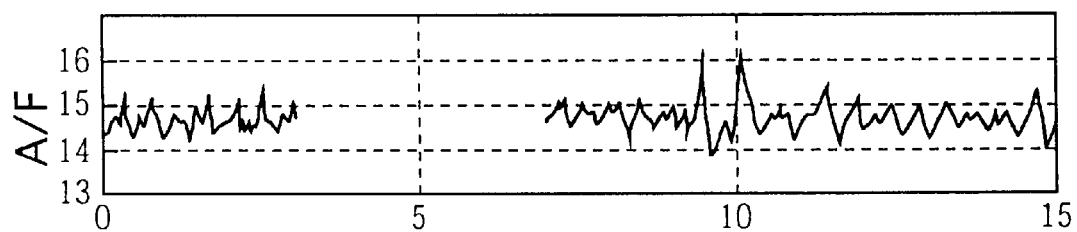
FIG. 7A shows the results or the air/fuel ratio control according to feedback control during transitional conditions.
Figure 7B:
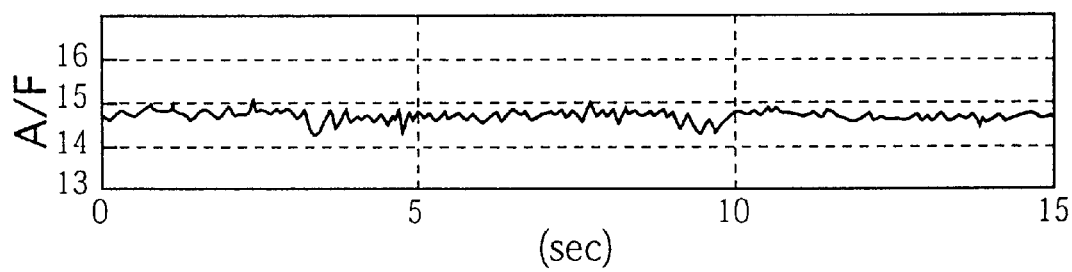
FIG. 7B shows the air/fuel ratio which is the control result of the air/fuel ratio control apparatus of the first embodiment during transitional conditions.
Figure 8:
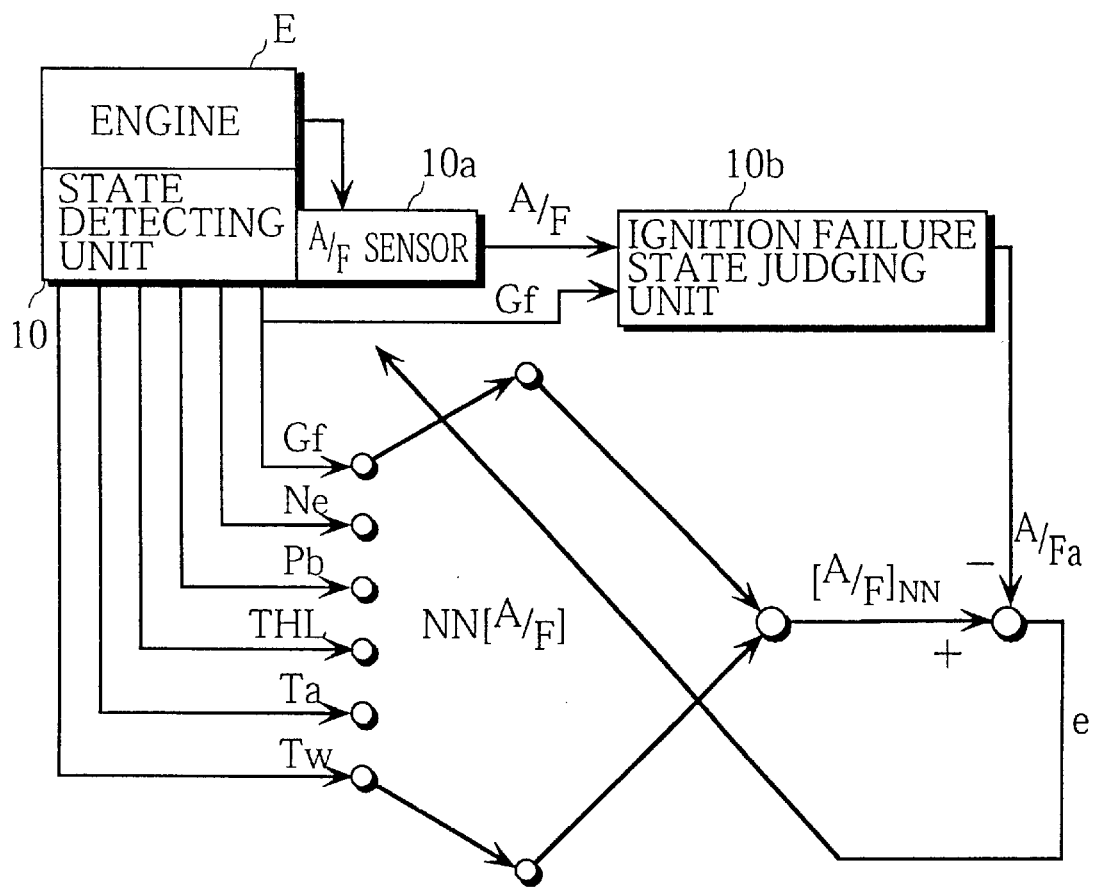
FIG. 8 shows a model example of the learning process for the neural network of the air/fuel ratio estimating unit when considering an ignition failure.
Figure 9:
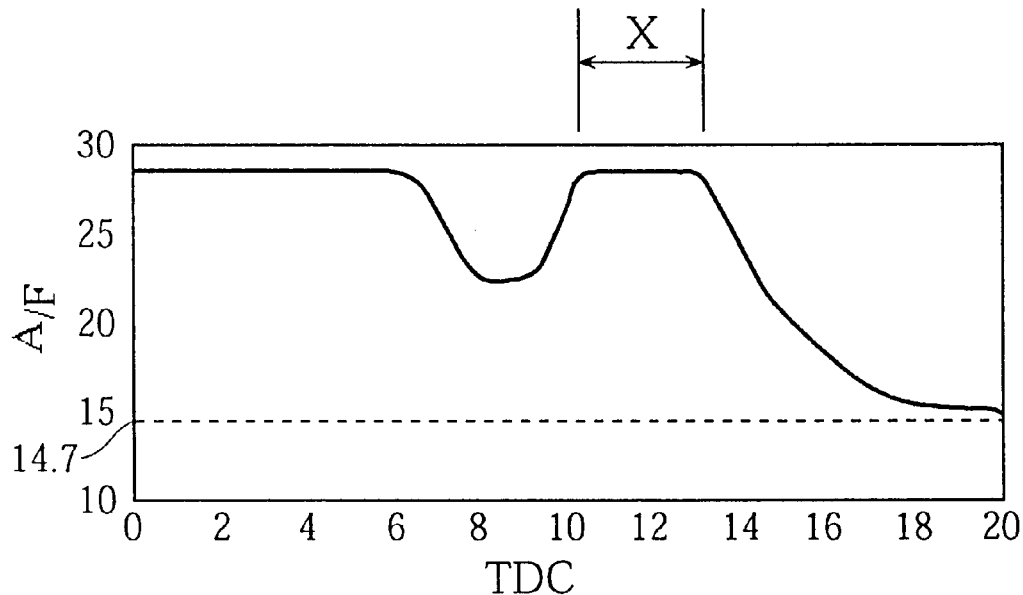
FIG. 9 shows an example of the change in the air/fuel ratio during an ignition failure.

The following is an explanation of a neural network which studies the causes of ignition failures in the engine. A model example of the learning process of such neural network is shown in FIG. 7. FIG. 7 differs from FIG. 5 in the provision of the ignition failure judging unit 10b. This ignition failure judging unit 10b compares the air/fuel ratio (A/F) detected by the air/fuel ratio sensor 10a with the injected fuel amount (Gf) and judges that the air/fuel ratio (A/F) is too rich when there is no consistency between the detection of an air/fuel ratio (A/N) which is too lean and injection of an injected fuel amount (Gf) which is an appropriate amount.

More specifically, when there is an ignition failure during starting, even though the air/fuel ratio should steadily be reduced, when an ignition failure occurs, the air/fuel ratio (A/F) detected by the air/fuel ratio will show that the mixture is too lean, so that the air/fuel ratio will be increase until it reaches a boundary value for the detectable range of the air/fuel ratio sensor. At this boundary value, a period X where there is no change in the air/fuel ratio occurs. Should this kind of period X occur despite the changes in the injected fuel amount, this proves that there is no consistency between the air/fuel ratio detected by the air/fuel ratio sensor and the injected fuel amount, so that this period x indicates that an ignition failure has occurred. When the engine is driven and study data obtained, the neural network can be taught to change the air/fuel ratio during this kind of period X to a predetermined value, such as "10" which shows that the mixture is too rich. By doing so, the neural network can correct such cases where the output of the air/fuel ratio sensor shows that the air/fuel ratio is too lean in spite or it actually being too rich.

Figure 10:
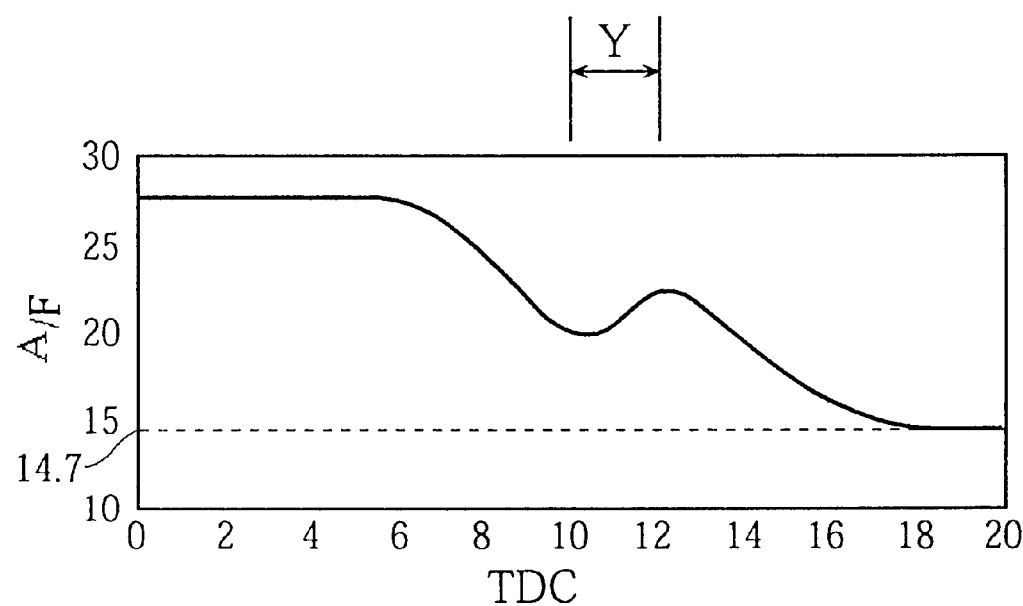
FIG. 10 shows another example of the change in the air/fuel ratio during an ignition failure.

Also, if the injected fuel amount is steadily increased, such as when the engine is started, and an ignition failure occurs, as shown in FIG. 10 this will result in a range Y when the change in the air/fuel ratio detected by the air/fuel ratio sensor does not steadily decrease but in fact increases. Here, instead of detecting a range X where there is a constant output of the air/fuel ratio sensor, it is possible to detect an ignition failure by detecting a region Y where the output of the air/fuel ratio sensor increases in spite or the steady increase in the injected fuel amount When the engine is driven and study data obtained, the neural network can be taught to change the air/fuel ratio during this kind of period Y to a predetermined value which shows that the mixture is too rich. Here, it is desirable to take the air/fuel ratio (A/F) and the injected fuel amount (Gf) during the period Y into account when calculating the value which shows that the air/fuel ratio is too rich.

It should be noted here that these methods for detecting ignition failures with a neural network can also be applied to the other embodiments. Here, ignition failures have been detected by considering the injected fuel amount (Gf) and its rate of change, although the parameters related to actual cylinder intake fuel amount may be instead, an example of which being the throttle amount (THL).

Second Embodiment

When the inputted parameters are within the range of the teaching data, neural networks can maintain a high degree of estimation precision. However, when the inputted parameters do not fall in the range of the teaching data, neural networks are in no way able to maintain such accuracy and so output highly inaccurate estimates. As a result, there will be cases with the first embodiment where the input of parameters outside the range of the teaching data will result in a breakdown in the system's ability to perform accurate control.

As one example, for the air/fuel ratio control apparatus of the first embodiment, the teaching data range for the parameter intake air temperature (Ta) may be given as minus thirty to sixty degrees Centigrade. This range is set since outside this range, changes in the intake air temperature have little effect on the extent to which the air/fuel ratio changes, and since there will be very few cases where this temperature will be outside the stated range. In such a case, when this parameter is outside the stated range of the teaching data, such as Ta=70° C., the estimated air/fuel ratio will end up being somewhat offset.

Figure 11:
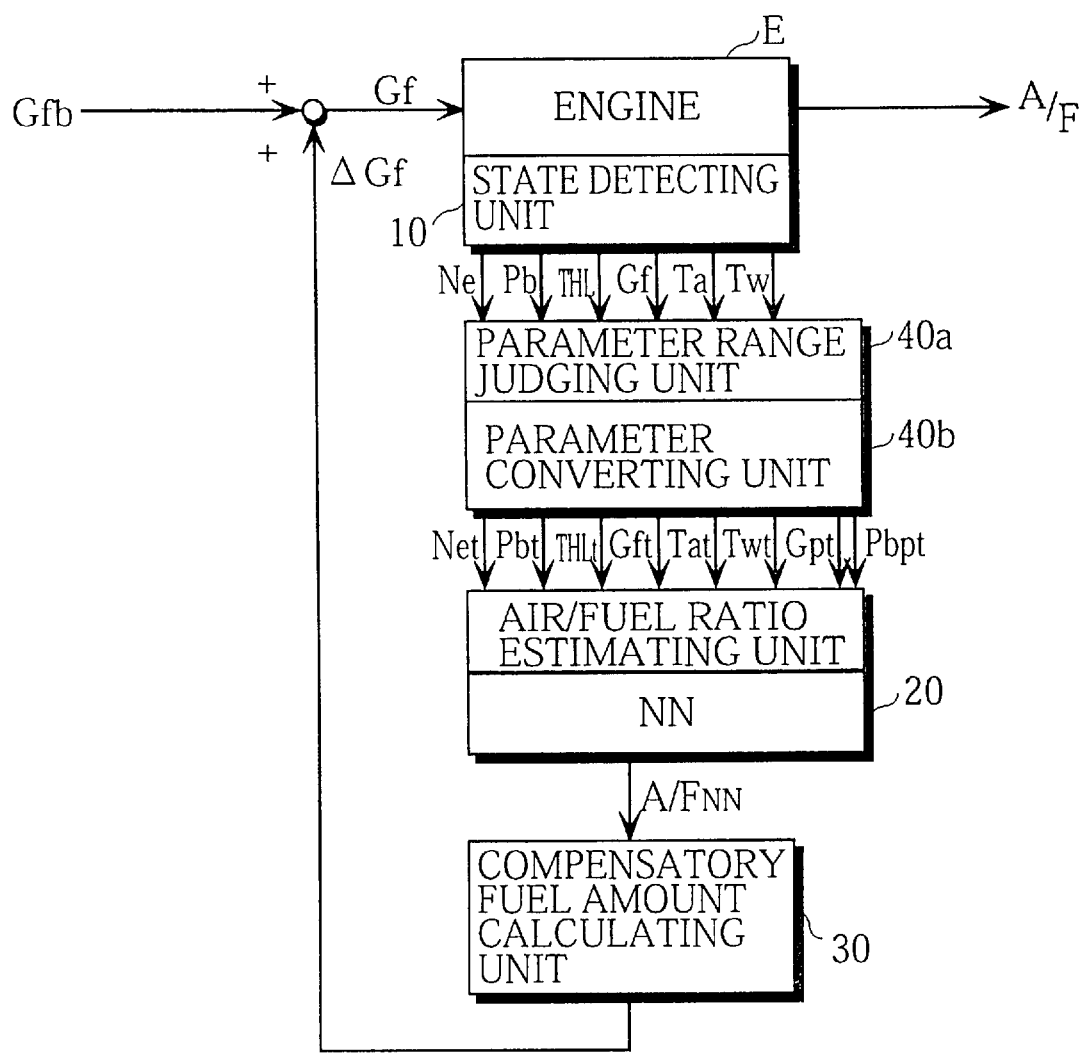
FIG. 11 is a functional block showing the air/fuel ratio control apparatus of the second embodiment.

The air/fuel ratio control apparatus of this second embodiment is provided with extra components to address this problem of the first embodiment. A functional block diagram for the air/fuel ratio control apparatus of the second embodiment is shown in FIG. 11. As can be seen from the drawings, the present air/fuel ratio control apparatus differs from that of the first embodiment in that it is provided with a parameter range judging unit 40a and a parameter converting unit 40b.

The parameter range judging unit 40a judges whether each or the parameters detected by the state detecting unit 10 is within a range which is respectively set for each of the parameters. Here, the range between the lowest and is highest values of each of the parameters used during study by the neural network of the air/fuel ratio estimating unit 20 is used as the predetermined range for each of the parameters.

The parameter conversing unit 40b converts the value of a parameter which is judged by the parameter range judging unit 40a as outside the respective set range of the parameter at a value which is within this range. More specifically, when the value of the parameter is higher than the maximum value of the range, the parameter conversing unit 40b converts the value of the parameter to the maximum value of the range, while when the value of the parameter is lower than the minimum value of the range, the parameter converting unit 40b converts the value of the parameter to the minimum value of the range.

Figure 12:
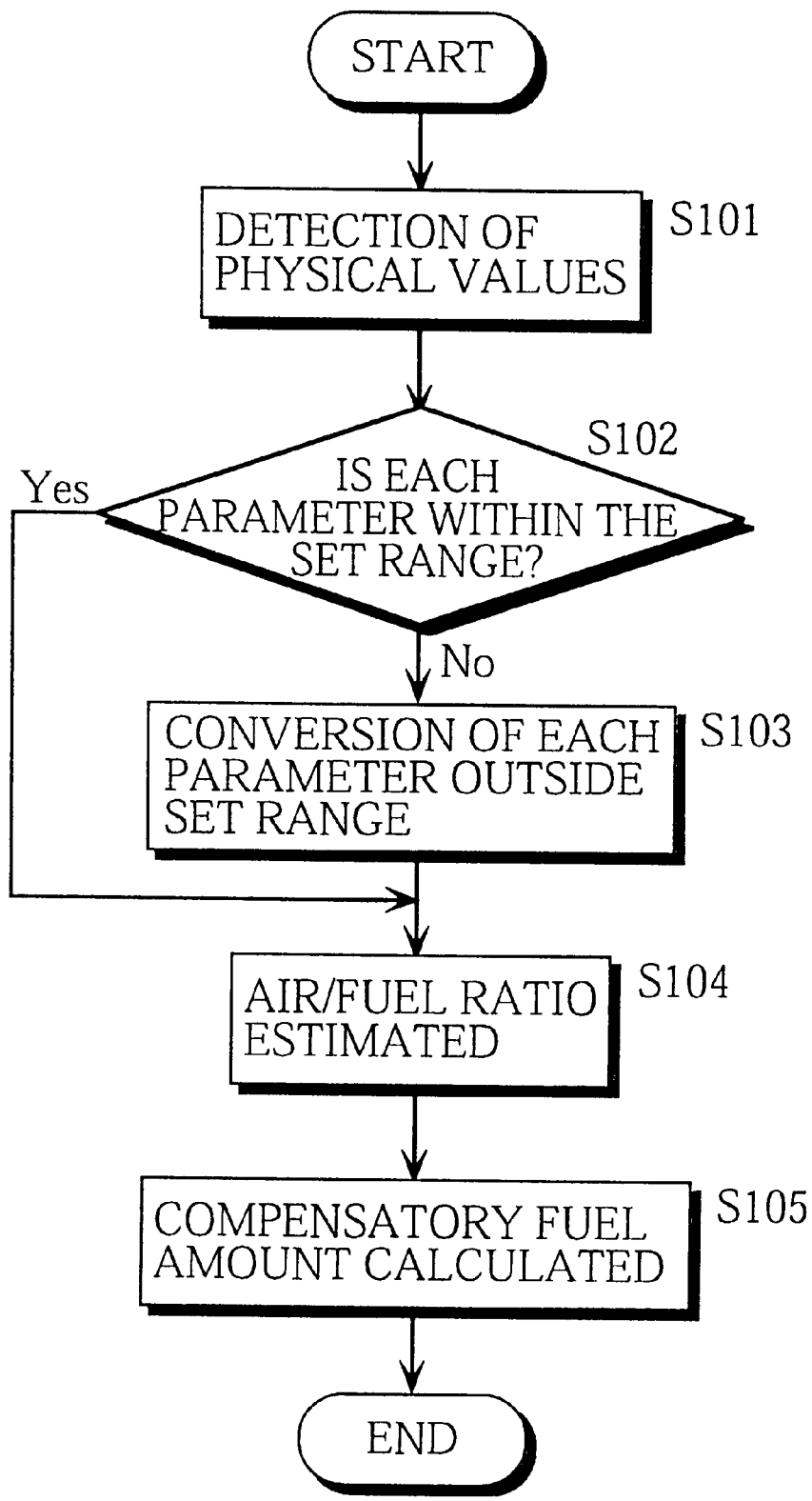
FIG. 12 is a flowchart showing the operation of the air/fuel ratio control apparatus of the second embodiment.

The following is an explanation of the operation of the air/fuel ratio control apparatus of the construction described above. The flowchart for the present air/fuel ratio control apparatus is shown in FIG. 12. First, the state detecting unit 10 detects each of the physical values (S101). Next, the parameter range judging unit 40a judges whether each of the detected parameters is within its respective set range (S102). Hero, if there is a parameter which in outside its set range, the parameter converting unit 40b converts the value of that parameter to a predetermined value (S103) and inputs it into the air/fuel ratio estimating unit 20. Parameters which are within the set ranges are inputted into the air/fuel ratio estimating unit 20 as they are. After this, the air/fuel ratio estimating unit 20 estimates the air/fuel ratio based on these inputted values and the compensatory fuel amount calculating unit 30 calculates the compensatory fuel amount (ΔGE).

Figure 13B:
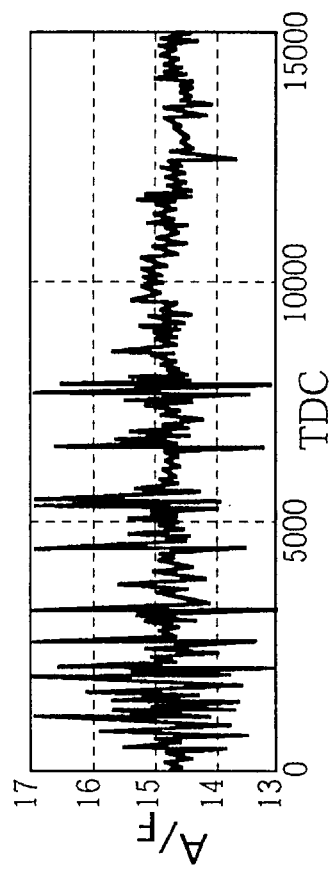
FIG. 13B shows a comparison of the air/fuel ratio estimated after converting input data outside the learned range with the actual air/fuel ratio.
Figure 13A:
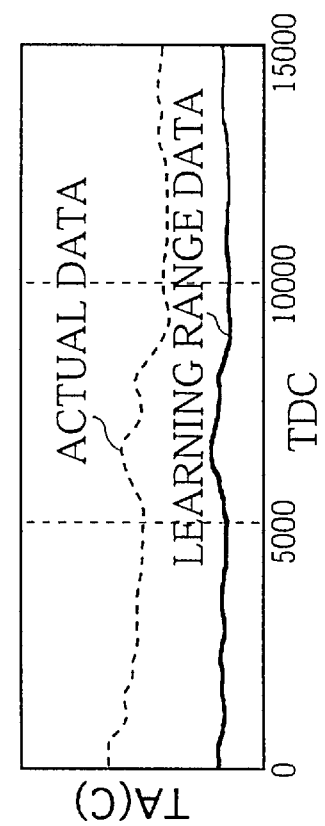
FIG. 13A snows a comparison of the air/fuel ratio estimated based on input data outside the learned range with the actual air/fuel ratio.

FIGS. 13A and 13B respectively show the experimental results of when the conversion of a parameter described above is and is not performed. In the illustrated example, the parameter in question is the intake air temperature (Ta). The upper part of FIG. 13A shows the actual air/fuel ratio (A/F) and the estimated air/fuel ratio ($A/F_{NN}$) for when no conversion is performed when the value or the intake air temperature (Ta) falls outside the range of the teaching data. The lower part of FIG. 13A shows the actual data for the intake air temperature (Ta). Meanwhile, the upper part of FIG. 13B shows the actual air/fuel ratio (dotted line) and the value of estimated air/fuel ratio ($A/F_{NN}$) (solid line) for when conversion is performed when the value of the intake air temperature (Ta) falls outside the range of the teaching date. The lower part of FIG. 13B shown the actual data for the intake air temperature (Ta). From these graphs it can be seen that there is noticeable deviation between the actual air/fuel ratio (A/F) and the estimated air/fuel ratio ($A/F_{NN}$) in the upper part of FIG. 13A. In the upper part of rig. 13B, values of the intake air temperature which fall outside the study range are replaced with variables which fall within the study range (the solid line in the lower drawing) so that there is little deviation between the actual air/fuel ratio (A/F) and the estimated air/fuel ratio (A/F$_{NN}$). In this way, the air/fuel ratio control apparatus of the present embodiment is definitely able to prevent against large variations in the accuracy of estimating caused by the input parameters being outside a set study range.

As described above, the air/fuel ratio control apparatus of the present embodiment can achieve a high degree of estimation accuracy not just when the input parameters fall within the range of the teaching data of the neural network provided in the air/fuel ratio estimating unit 20, which is to say where interpolation is possible, but also when the parameters are outside the range of the neural network are inputted, which is to say when extrapolation would be necessary.

Third Embodiment

In the above embodiments, air/fuel ratio (A/F) is estimated without using the output of an air/fuel sensor, which would not operate at low temperatures, as an input into the neural network, with the estimated air/fuel ratio then being used to control the compensatory amount of the injected fuel amount. However, there are cases where it is not possible to properly estimate the air/fuel ratio without using the output of an air/fuel ratio sensor.

Figure 14A:
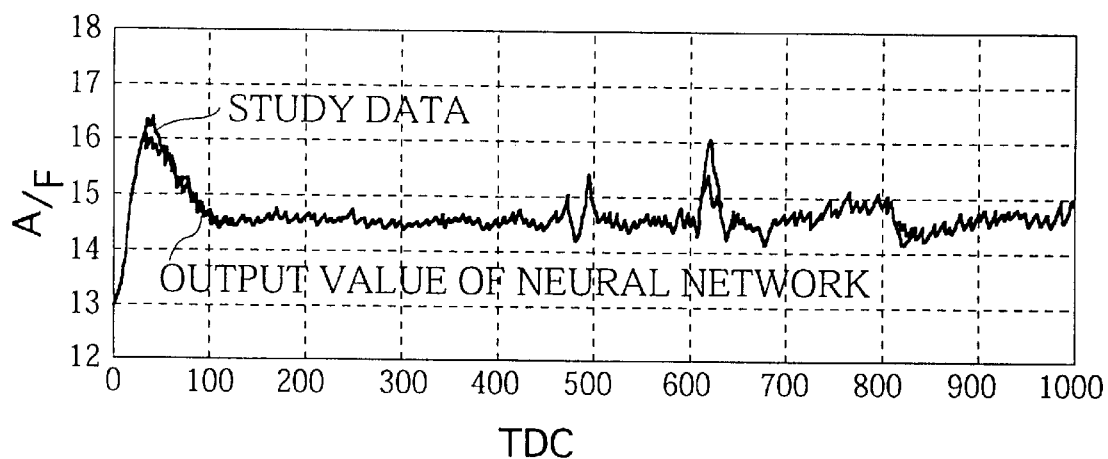
FIG. 14A shows a comparison of an estimated air/fuel ratio, estimated by a neural network with an input from an air/fuel ratio sensor, with teaching data.
Figure 14B:
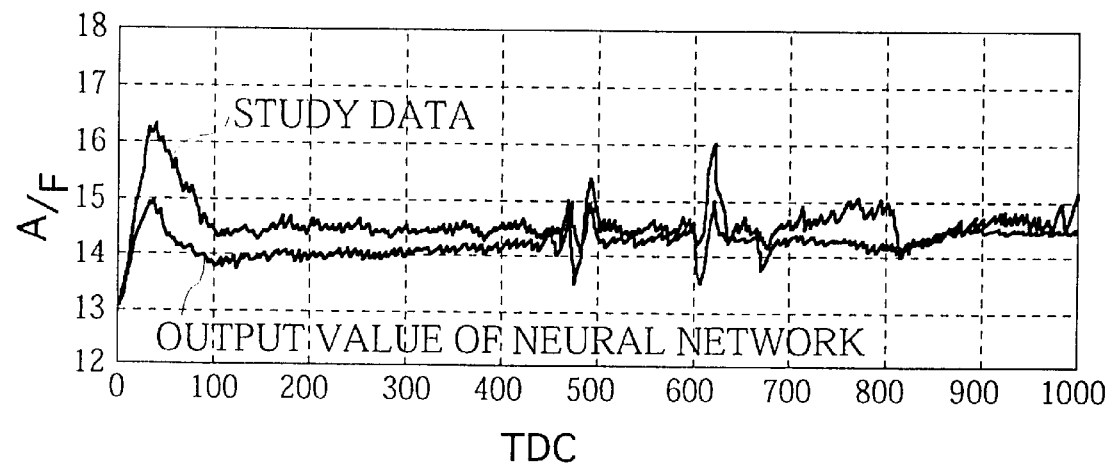
FIG. 14B shows a comparison of an estimated air/fuel ratio, estimated by a neural network without an input from an air/fuel ratio sensor, with teaching data.
Figure 15A:
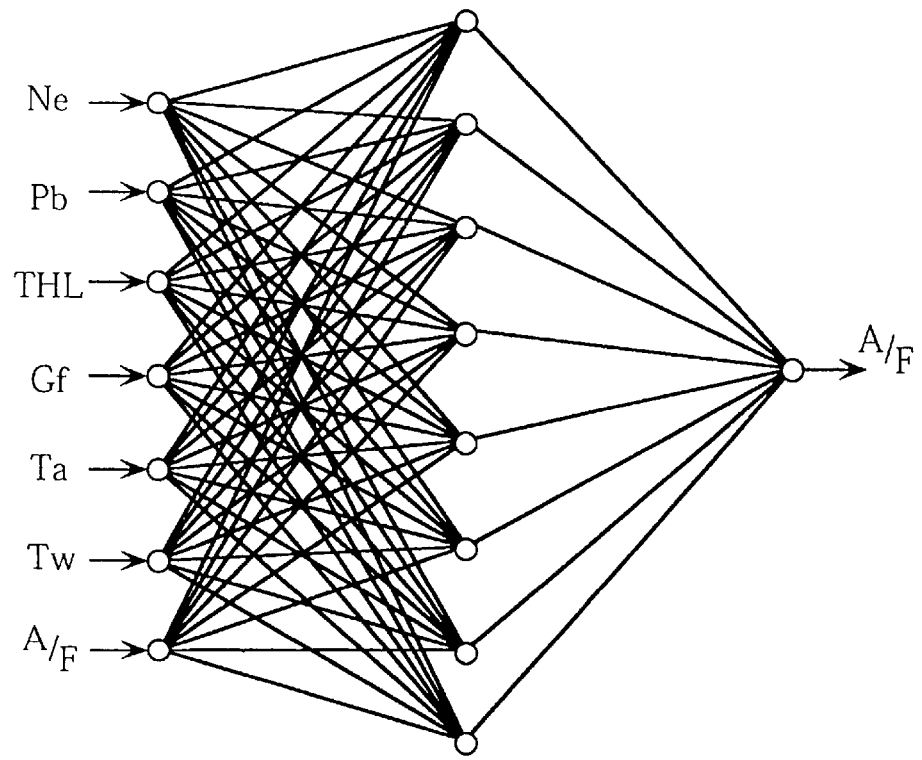
FIG. 15A shows the construction of a neural network equipped with an input from an air/fuel ratio sensor.
Figure 15B:
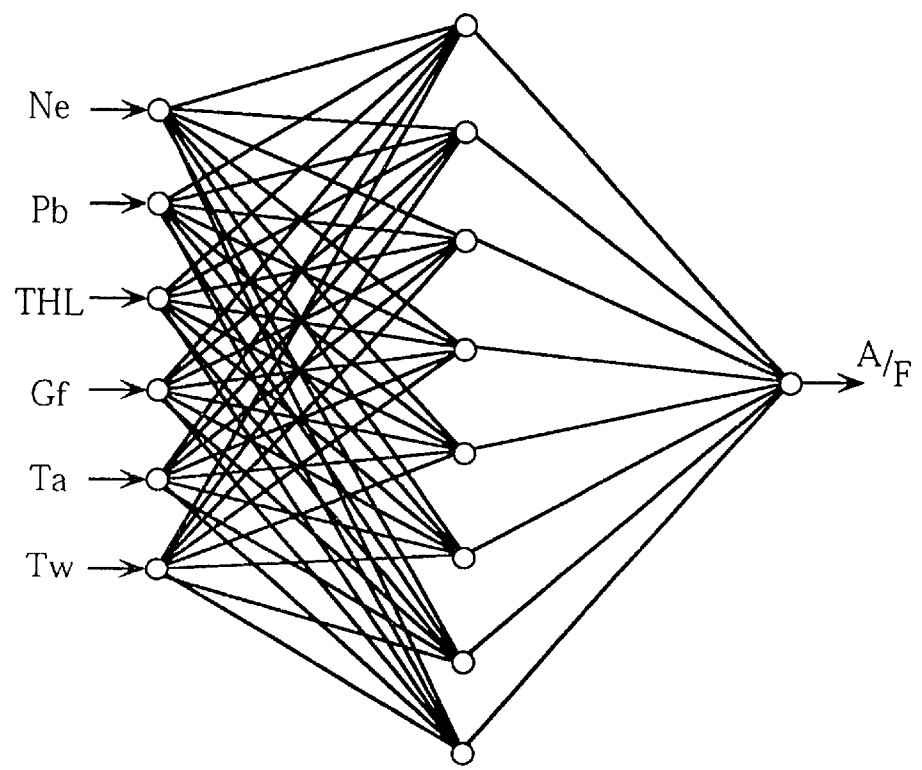
FIG. 15B shows the construction of a neural network not equipped with an input from an air/fuel ratio sensor.

An experimental example showing such condition is shown in FIGS. 14A and 14D. FIG. 14A shows the teaching data and the actual output value for the neural network shown in FIG. 15A which estimates the air/fuel ratio using air/fuel ratio as an input parameter Here, the inputted air/fuel ratio is the air/fuel ratio which was detected or calculated in the previous control cycle. FIG. 14B, meanwhile, shows the teaching data and the actual output value for the neural network shown In FIG. 15B which estimates the air/fuel ratio without using air/fuel ratio as an input parameter. As can be seen from FIG. 14A, when the neural network has air/fuel ratio as an input parameter, the teaching data and actual output value almost match each other, while as shown in FIG. 14A, when the neural network does not have air/fuel ratio as an input parameter, the teaching data and actual output value do not coincide, with the actual output value of the neural network on the whole being lower than the teaching data, even during normal operation. The direct causes of this lower output value (hereinafter referred to a normal operational bias) are not known, but since the phenomenon does not always occur, it is believed to be caused by the coexistence of a variety of factors. However, during transitional engine driving conditions, estimating in performed with the correct direction of fluctuation, so that it is believed ouch values may be used as they are.

Figure 16:
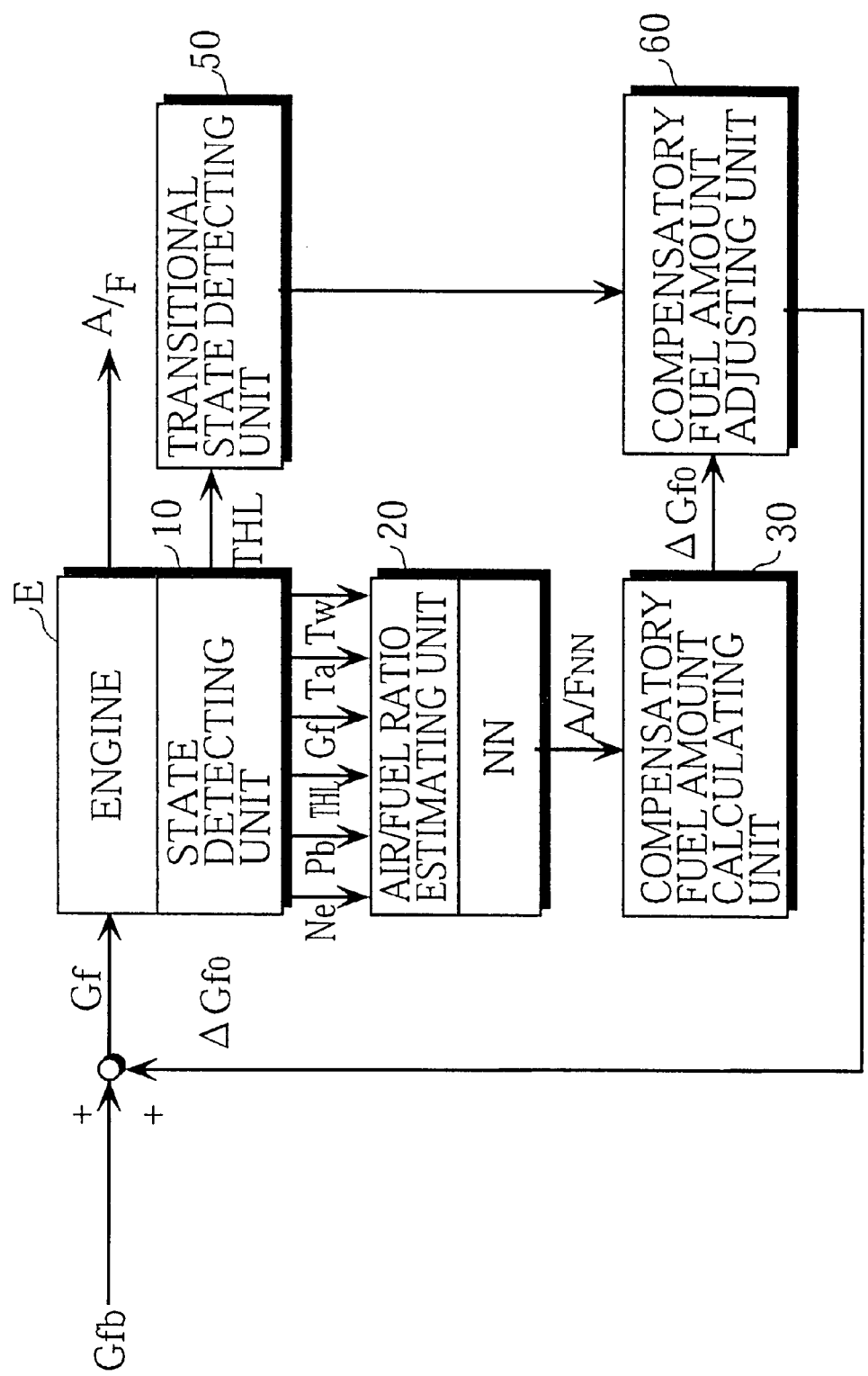
FIG. 16 is a functional block diagram showing the air/fuel ratio control apparatus of the third embodiment.

The air/fuel ratio control apparatus of this third embodiment is equipped with means for dealing with this normal operational bias. A functional block diagram showing the construction of the air/fuel ratio control apparatus of this embodiment is shown in FIG. 16. This air/fuel ratio control apparatus is composed of a state detecting unit 10, an air/fuel ratio estimating unit 20, a compensatory fuel amount calculating unit 30, a transitional state detecting unit 50, and a compensatory fuel amount adjusting unit 60. The difference between the air/fuel ratio control apparatus of the present embodiment and that of the first embodiment lies in the provision of this transitional state detecting 50 and compensatory fuel amount adjusting unit 60.

The transitional state detecting unit 50 detects the degree of transition for the engine E. More specifically, the present throttle amount (THL) and engine RPM (Ne), which are two of the physical values obtained by the state detecting unit 10, are inputted into the transitional state detecting unit 50 which compares the absolute differentials, |ΔTHL| and |ΔNe|, between each value and its value in the previous control cycle to predetermined values, and judges that the engine is in a normal operational state when the differentials are lower than the predetermined values. In this case, the transitional state detecting unit 50 outputs "0" as the transitional state value. On the other hand, when either differential is above its predetermined value, the transitional state detecting unit 50 judges that the engine is in a transitional state and outputs "1" as the transitional state value.

As an alternate method, two set values A and B (where 0<A<B) can be provided and the transitional state detecting unit 50 can be set to judge that the engine is in a normal operational state when the differential |ΔTHL| for the present throttle amount is such that |ΔTHL|≦A, so that "0" is outputted as the transitional state value. On the other hand, when the present throttle amount is such that B≦|ΔTHL|, the amount of change is regarded as significant and "1" is outputted as the transitional state value. As a result, a state where A≦|ΔTHL|≦B can be considered as corresponding to a state where rate of change is within a normal operation range, so that a value given for example by the formula (|ΔTHL|−A)/(B−A) can be used to set a value between 0 and 1 as the transition state value.

As yet another method, the throttle amount (THL) and engine RPM (Ne) which are obtained by the state detecting unit 10 may be set as input values which may be passed through a high-pass filter. When the rate or change of the throttle amount (THL) and engine RPM (Ne) is low, which is to say when the frequency is low, the output value of the high-pass filter is "0". However, when the rate of change of the throttle amount (THL) and engine RPM (Ne) is high, the high-pass filter outputs a value which reflects the rate of change. Accordingly, a normalized value between "0" and "1" is outputted as the transition state value.

The compensatory fuel amount adjusting unit 60 adjusts the compensatory fuel amount (ΔGf) calculated by the compensatory fuel amount calculating unit 30, based on the transition state value detected by the transition state detecting unit 50. More specifically, the compensatory fuel amount adjusting unit 60 receives the above value which ranges from "0" to "1", and multiplies the compensatory fuel amount (ΔGf) for the injected fuel amount by this transitional state value. As a result, when the transitional state value is "1", representing a clearly transitional state, the compensatory fuel amount (ΔGf$_0$) for the injected fuel amount is outputted as it is. On the other hand, when the transitional state value is "0", representing a clearly normal operational state, the compensatory fuel amount (ΔGf$_0$) for the injected fuel amount becomes "0".

The following is an explanation of the operation of the present air/fuel ratio control apparatus described above. In this description, the engine is already running. First, the state detecting unit 10 detects the engine RPM (Ne), intake air pressure (Pb), present throttle amount (THL), injected fuel amount (Gf), intake air temperature (Ta), and cooling water temperature (Tw), these being the physical values which can be detected at low temperatures, in each control cycle. Next, the neural network in the air/fuel ratio estimating unit 20 estimates the air/fuel ratio with the physical values detected by the state detecting unit 10 as its input values. The compensatory fuel amount calculating unit 30 then calculates the compensatory fuel amount (ΔGf) using the estimated air/fuel ratio (A/F). This compensatory fuel amount (ΔGf) is then outputted to the compensatory fuel amount adjusting unit 60. Here, the throttle amount (THL) detected by the state detecting unit 10 is inputted into the transitional state detecting unit 50. The transitional state detecting unit 50 then finds the difference between the present throttle amount (THL) and the throttle amount in the previous control cycle and calculates a value in the range of "0" to "1" as the transitional state value which it outputs the compensatory fuel amount adjusting unit 60. The compensatory fuel amount adjusting unit 60 then multiplies the compensatory fuel amount ($\Delta Gf$) for the injected fuel amount by the transitional state value and outputs the adjusted compensatory fuel amount ($\Delta Gf_0$) for the injected fuel amount, This adjusted compensatory fuel amount ($\Delta Gf_0$) for the injected fuel amount is then added to the base injected fuel amount (Gfb) calculated by the base injected fuel amount calculating unit 1 to give the actual injected fuel amount (Gf). This value is then outputted to the injector I which then injects the indicated amount of fuel into the engine E.

Here, when the engine is started and the driver suddenly presses or releases the accelerator, the value "1" is outputted as the transitional state value, so that the value outputted by the compensatory fuel amount calculating unit 30 is outputted by the compensatory fuel amount adjusting unit 60 as it is. When the engine is running normally, the value "0" is outputted as the transitional state value, so that the compensatory fuel amount adjusting unit 60 outputs "0" as the compensatory fuel amount for the injected fuel amount, so that no compensation of the injected fuel amount is performed during normal operational conditions. As a result, even if the neural network which does not have air/fuel ratio (A/F) as an input value normally suffers from a bias on the outputted air/fuel ratio (A/F), the compensatory amount for the injected fuel amount can be set at zero during normal operational conditions, thereby ridding the system of inappropriate compensation. As a result, the air/fuel ratio control apparatus will only output a compensatory amount for the injected fuel amount during a transitional state when such compensation is necessary, thereby preventing fluctuations in the injected fuel amount.

Figure 17:
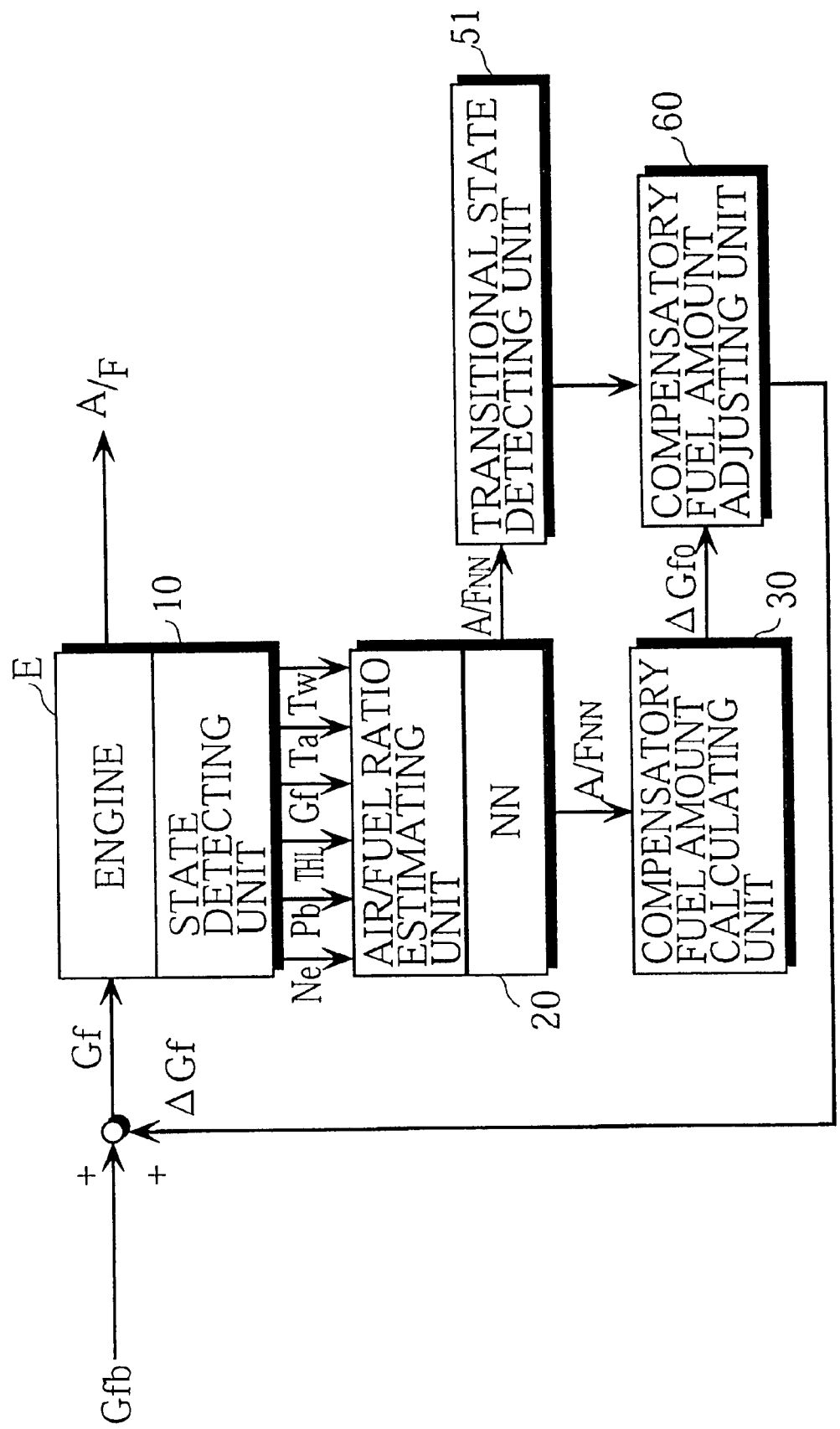
FIG. 17 is a functional block diagram showing another example of the air/fuel ratio control apparatus of the third embodiment.
Figure 18:
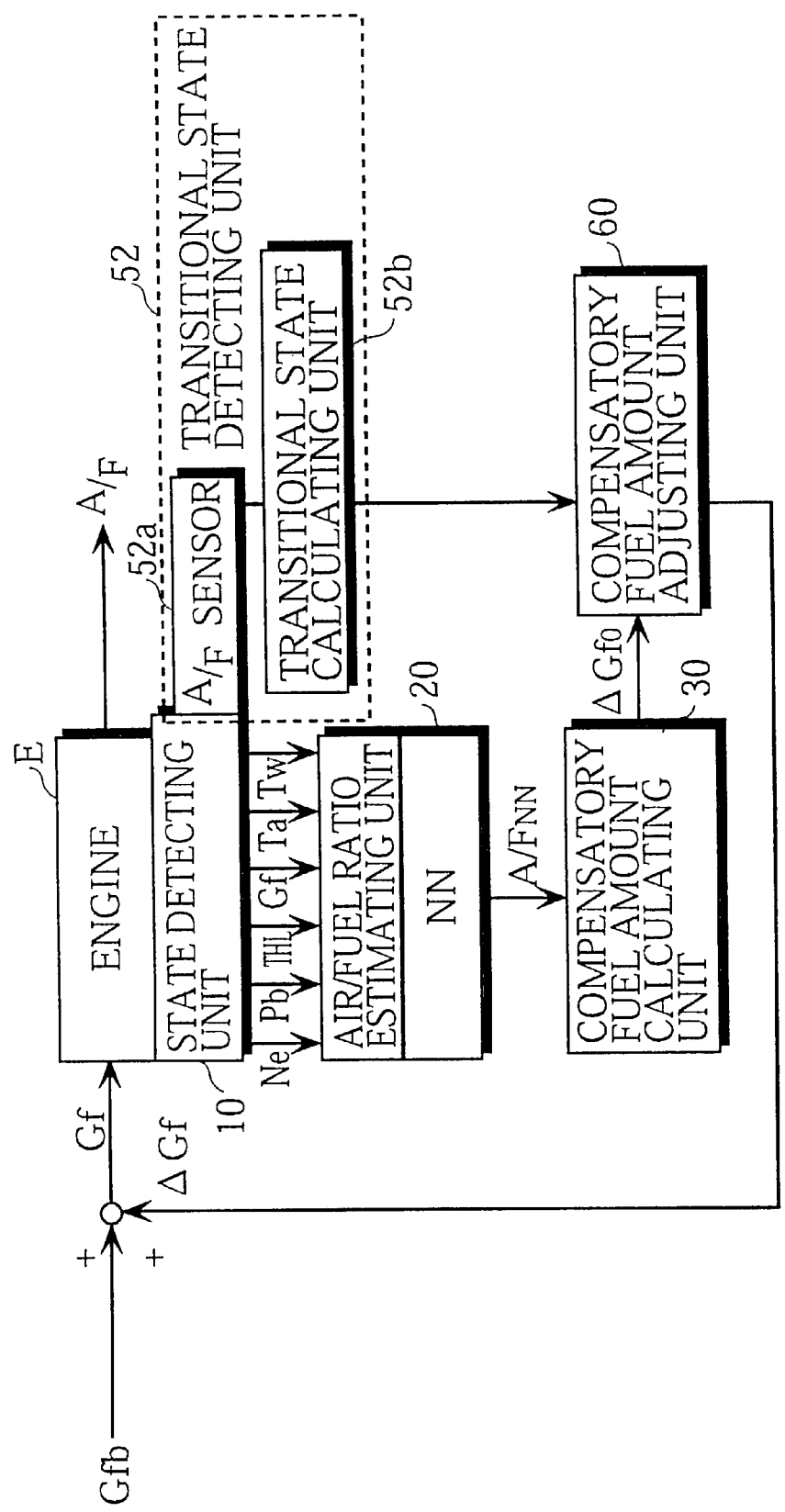
FIG. 18 is a functional block diagram showing another example of the air/fuel ratio control apparatus of the third embodiment.

It should be noted here that while the transitional state detecting unit 50 has been described as calculating a transitional state value with physical values detected by the state detecting unit 10 as its input values, as shown in FIG. 17 the transitional state detecting unit 51 may use the air/fuel ratio estimated by the air/fuel ratio estimating unit 20 as its input value and set the transitional state value based on the changes in this estimated air/fuel ratio. In such a case, the transitional state detecting unit may set an absolute value $|\Delta A/F_{NN}|$ for the difference between the estimated fuel/air ratios ($A/F_{NN}$) in successive control cycles as the change in the air/fuel ratio and then use this to set the transitional state value, according to the same methods as were used when this value was calculated from the physical values calculated by the state detecting unit 10.

Also, as shown in FIG. 10, it is possible to construct a transitional state detecting unit 52 from an air/fuel sensor 52a which detects the air/fuel ratio in the engine E and a transitional state calculating unit 52b which calculates the transitional state value based on the changes in the output value of the air/fuel sensor 52a. In this case, the transitional state value may be calculated by the transitional state calculating unit 52b using the same method as when the estimated air/fuel ratio ($A/F_{NN}$) is inputted from the air/fuel ratio estimating unit 30. Here, since the transitional state detecting unit 52 cannot operate when the air/fuel sensor is not operational due to low temperatures when the engine is started, the compensatory fuel amount ($\Delta Gf$) for the injected fuel amount which is calculated by the compensatory fuel amount calculating unit 30 is outputted by the compensatory fuel amount adjusting unit 60 without amendment. However, since starting conditions always correspond to the transitional state, the output of the compensatory fuel amount ($\Delta Gf$) for the injected fuel amount corresponds to an output or a transitional state value "1" by the transitional state detecting unit 52, meaning that there are no particular problems with such results.

With the air/fuel ratio control apparatus of the present embodiment, when there is a normal operational bias, no unnecessary adjustment of the compensatory fuel amount is made during normal operation, with the adjustment of the compensatory fuel amount to bring the air/fuel ratio closer to the desired value only being performed during the transitional state when such adjustment is necessary. As a result, control can be performed during normal operation so that the bias has no affect during normal operation, and appropriate air/fuel ratio control can be performed during transition states, even at low temperature.

Fourth Embodiment

Figure 19:
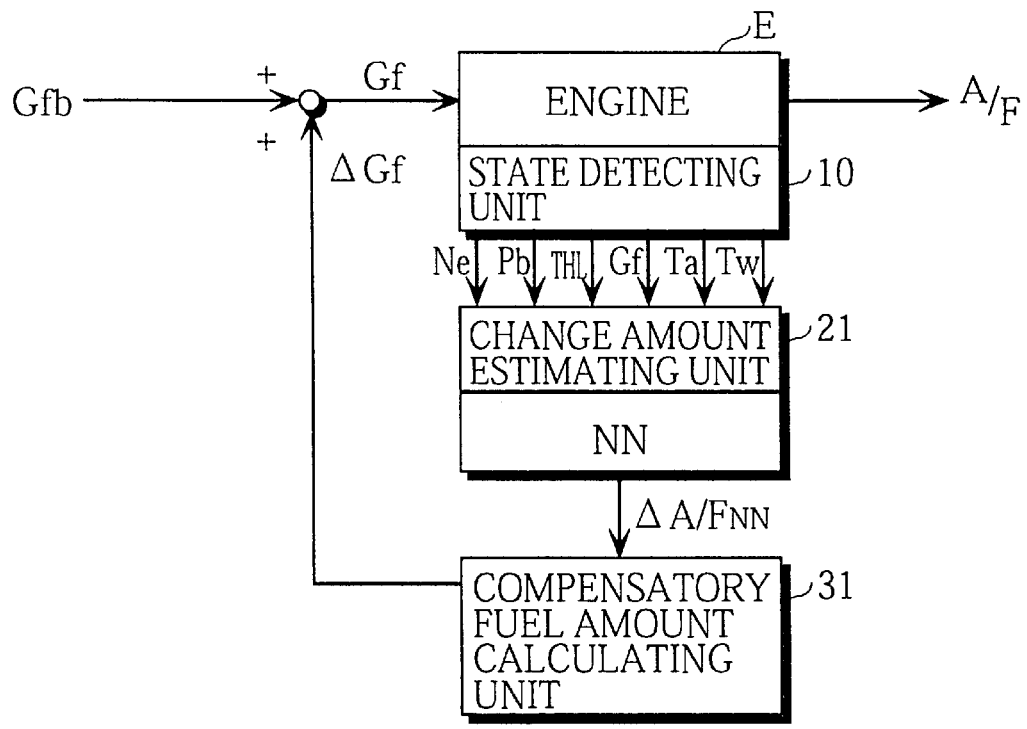
FIG. 19 in a functional block diagram showing the air/fuel ratio control apparatus of the fourth embodiment.
Figure 20:
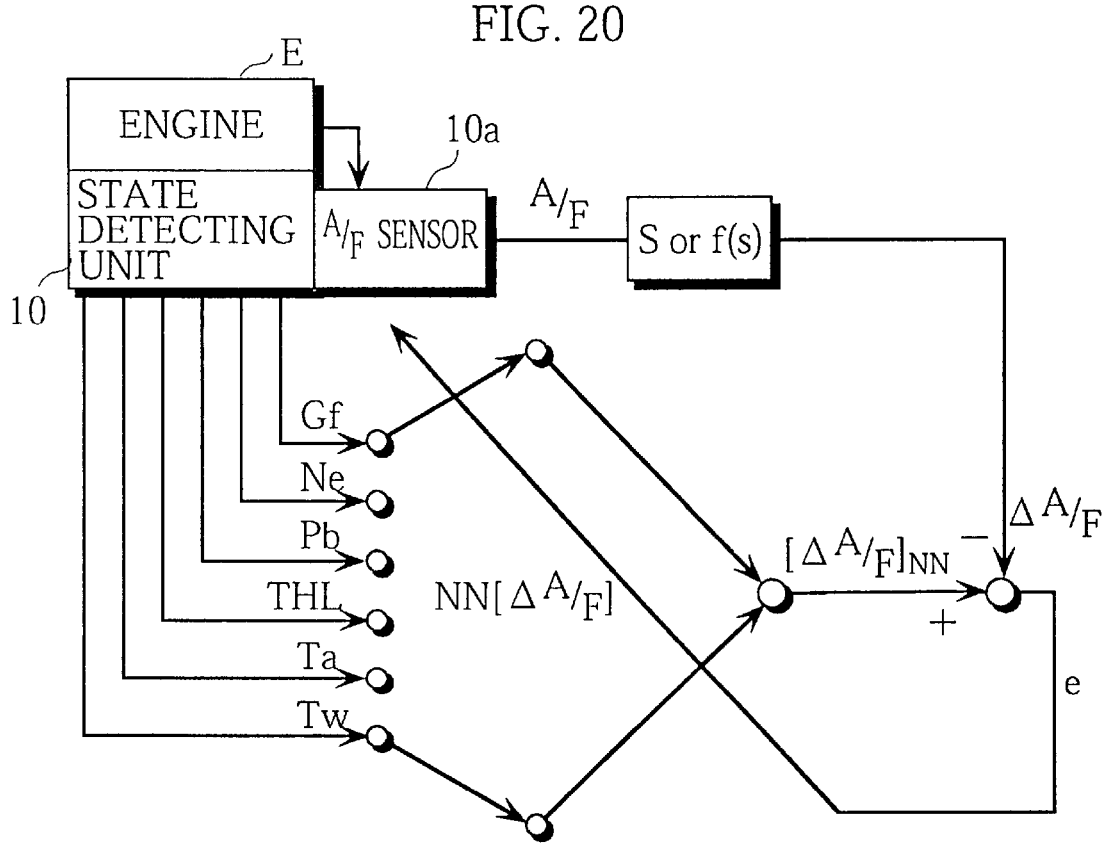
FIG. 20 shows a model example of the learning process of the neural network of the change amount estimating unit.

This fourth embodiment gives a different example of an air/fuel ratio control apparatus which is equipped with means for dealing with normal operational bias. FIG. 19 is a functional block diagram showing the construction of the air/fuel ratio control apparatus of the fourth embodiment of the present Invention. As shown in the drawing, this air/fuel ratio control apparatus is composed of a state detecting unit 10, a change amount estimating unit 21 and a compensatory fuel amount calculating unit 31. This air/fuel ratio control apparatus differs to that of the air/fuel ratio control apparatus of the first embodiment in that it is equipped with a change amount estimating unit 21 in place of the air/fuel ratio estimating unit and in that the compensatory fuel amount calculating unit 31 calculates te compensatory fuel amount based on the output value of the change amount estimating unit 21.

The change amount estimating unit 21 uses a neural network to estimate the change in the physical values relating to the air/fuel ratio which are detected by the state detecting unit 10. Here, the air/fuel ratio itself is the input parameter which relates to the air/fuel ratio so that a differential for the air/fuel ratio ($\Delta A/F$) is used to indicate the change in air/fuel ratio, with this differential being inputted into a high-pass filter which only allows the high frequency signal part of the air/fuel ratio differential to pass. This is to say, the change in the air/fuel ratio ($\Delta A/F$) is calculated as $$\Delta A/F(s) = s * A/F(s) \qquad [1]$$

or $$\Delta A/F(s) = f(s) * A/F(s) \qquad [2]$$

where s is a Laplace operator, and f(s) is a high-pass filter which cuts the low-frequency signal component and only allows the high-frequency signal component to pass. It should be noted here that besides air/fuel ratio, other parameters such as mass of air flow in the cylinders or mass of fuel flowing in the cylinders may be used as the parameters relating to air/fuel ratio. The change in the air/fuel ratio ($\Delta A/F$) which results from these calculations is a differential value or a value which has passed through a high pass filter, so that it is unaffected by normal operational bias.

The learning process for the neural network used by the change amount estimating unit 21 is shown in FIG. 19. The differences between FIG. 19 and FIG. 5 lie in the conversion of the detected air/fuel ratio (A/F) to the change amount ($\Delta A/F$) for the air/fuel ratio using either equation [1] or [2]

above and in the output of the neural network being a change amount (ΔA/F) for the air/fuel ratio. As a result, the learning process is mainly the same as that shown in FIG. 5. This is to say, teaching data which is obtained by actually operating the engine is used by the neural network which has the change amount (ΔA/F) for the air/fuel ratio and the detected parameters as its inputs. This neural network progressively changes its construction according to a back propagation method so that the deviation e between the inputted change amount (ΔA/F) for the air/fuel ratio and the estimated change amount (ΔA/F) for the air/fuel ratio as its output is reduced.

It should be noted here that while the change amount estimating unit 21 has been described as directly estimating the change amount (ΔA/F) for the air/fuel ratio using a neural network, it may instead use the same neural network as the first embodiment to estimate the air/fuel ratio (A/F), before calculating the change amount (ΔA/F) for the air/fuel ratio using this estimated air/fuel ratio (A/F) and either equation [1] or [2].

The compensatory fuel amount calculating unit 31 calculates a compensatory amount (ΔGf) for the injected fuel amount from the change amount (ΔA/F) for the air/fuel ratio estimated by the change amount estimating unit 21 using the neural network which performs the learning process described above. More specifically, the relation between the change amount (ΔA/F) for the air/fuel ratio and the compensatory amount (ΔGf) for the injected fuel amount approximates to a P (proportionate) or a PI (proportionate, differential) relation, and so can be calculated as $$\Delta Gf = K3 * \Delta A/F$$

or $$\Delta Gf = K3 * \Delta A/F + K4 * \Delta \Sigma A/F$$

Here, K3 and K4 are constants whose values are found by experimentation.

The following is an explanation of the operation of the present air/fuel ratio control apparatus described above. In this description, the engine has just been started and so is at a low temperature. First, the state detecting unit 10 detects the engine RPM (Ne), intake air pressure (Pb), present throttle amount (THL), injected fuel amount (Gf), intake air temperature (Ta), and cooling water temperature (Tw), these being the physical values which can be detected at low temperatures. Next, the neural network in the air/fuel ratio estimating unit 20 estimates the air/fuel ratio with the physical values detected by the state detecting unit 10 as its input values. The compensatory fuel amount calculating unit 30 then calculates the compensatory fuel amount (ΔGf) using the estimated air/fuel ratio (A/F). This calculated compensatory amount (ΔGf) for the injected fuel amount is added to the base injected fuel amount calculated by the base injected fuel amount calculating unit 1 and the result is then outputted to the injector I which injects the indicated amount of fuel into the engine E.

In this way, the air/fuel ratio control apparatus of the present embodiment uses a neural network to estimate the amount of change for the physical values related to air/fuel ratio, and then has the compensatory amount for the injected fuel amount calculated from this estimated amount of change. This is to say, the amount of change will not be affected by normal operational bias, which means that the effects of normal operational bias on the compensatory amount for the injected fuel amount can be nullified.

Fifth Embodiment

When using a neural network to directly calculate a compensatory amount for the injected fuel amount, as with conventional air/fuel ratio control apparatuses which use neural networks, the setting of the teaching data and the measurement or the compensatory amount of the injected fuel amount are extremely problematic. As a result, during research, it is difficult to grasp where inaccuracies lie in the system, so that product development can be expected to consume a considerable amount of time and effort. When using a neural network to estimate air/fuel ratio (and the like) as described in the preceding embodiments, such burden can be somewhat eased when using such estimates to calculate the compensatory fuel amount. The present embodiment is an air/fuel ratio control apparatus which, in addition to estimating a neural network to estimate the air/fuel ratio and its change amount, is easier to develop.

Figure 21:
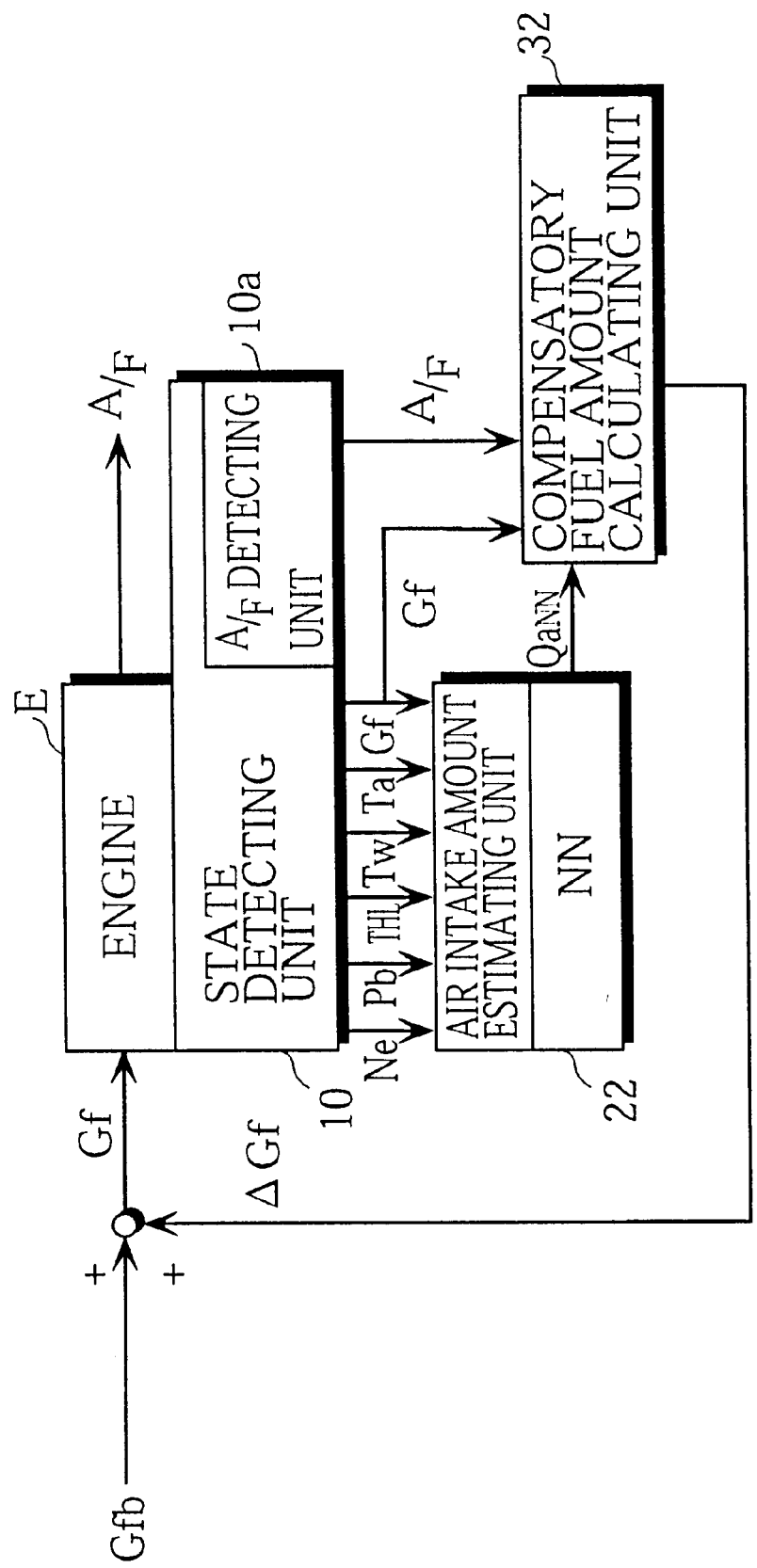
FIG. 21 is a functional block diagram showing the air/fuel ratio control apparatus of the fifth embodiment.

FIG. 21 shows the air/fuel ratio control apparatus of the third embodiment. This air/fuel ratio control apparatus is composed of a state detecting unit 10, an air intake amount estimating unit 22, and a compensatory fuel amount calculating unit 32. This air/fuel ratio control apparatus differs from that of the first embodiment in that the state detecting unit 10 is provided with an air/fuel ratio detecting unit 10a, in that the detection of the injected fuel amount (Gf) becomes necessary, in that an air intake amount estimating unit 22 is provided in place of the air/fuel ratio estimating unit, and in that the compensatory fuel amount calculating unit 32 uses different input parameters.

Figure 22:
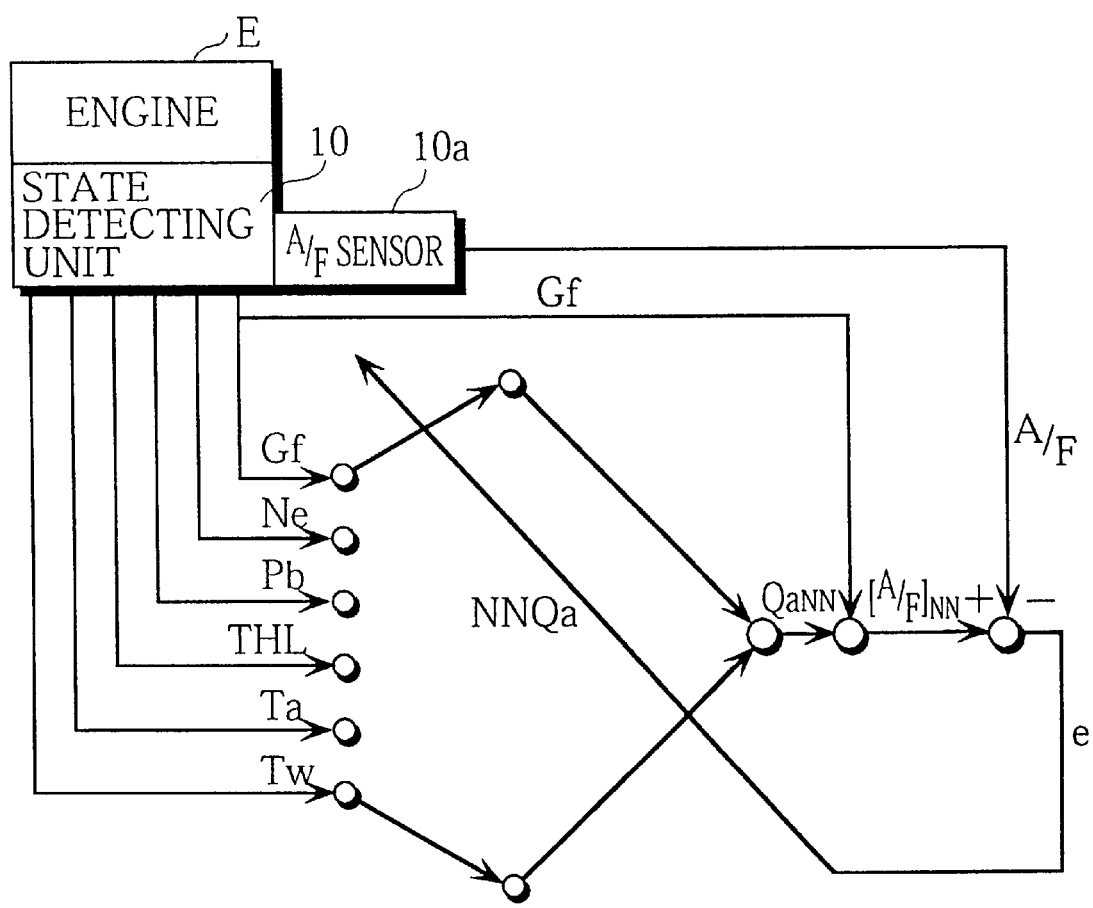
FIG. 22 shows a model example of the learning process of the neural network of the intake air amount estimating unit.

The air intake amount estimating unit 22 uses at least two input parameters out of the physical values detected by the state detecting unit 10 and uses a neural network to estimate the air intake amount (Qa). The learning process used by this neural network is shown in FIG. 22. Here, data which is obtained by driving a real car is used as the teaching data, various parameters are inputted into the neural network, and the estimated intake fuel amount ($Qa_{NN}$) is divided by the injected fuel amount (Gf) to calculate the estimated fuel/air ratio ($A/F_{NN}$) as the output. Here, there is no problem if the air/fuel ratio is used as an input parameter. In such case, it is necessary to additionally use the value of the air/fuel ratio (A/F) as an input value of the air intake amount estimating unit 22. Here also, the neural network can be designed to change its construction to minimize the deviation e between this detected air/fuel ratio (A/F) and the estimated air/fuel ratio ($A/F_{NN}$). By doing go, a neural network which estimates intake fuel amount ($Qa_{NN}$) with various parameters as its inputs can be constructed.

Here, the intake fuel amount ($Qa_{NN}$) is estimated by a neural network which has the detectable air/fuel ratio sensor values as the teaching data, so that compared to the case when the compensatory amount for the injected fuel amount is directly calculated by a neural network, the degree of trial and error necessary for convergence with the teaching data can be reduced, with it also being easy to detect faults in the system when the accuracy of the learning process cannot be achieved.

The compensatory fuel amount calculating unit 32 calculates the compensatory fuel amount (ΔGf) from the air/fuel ratio (A/F) and the injected fuel amount (Gf) detected by the state detecting unit 10 and from the intake fuel amount ($Qa_{NN}$) estimated by the air intake amount estimating unit 22.

The following is an explanation of the equation used to calculate the compensatory fuel amount (ΔGf) for the injected fuel amount. Here, when fuel is injected by the injector I, not all of the fuel will flow into the cylinders, with some of the fuel coating the inner walls of the intake pipes and some of this fuel coating evaporating and then flowing into the cylinders. As a result, there is a difference between the injected fuel amount (Gf) and the amount of fuel flow in the cylinders (Gfc), with this difference being calculated as the compensatory amount (ΔGf) for the injected fuel amount. As a result, the actual amount of fuel flowing in the cylinders (Gfc) is calculated first to enable the calculation of the compensatory amount (ΔGf) for the injected fuel amount.

The relationship between the air/fuel ratio A/F, the intake air amount Qa, and the intake fuel amount Gfc is given by the following equation.

$$A/F = Qa/Gfc$$

As a modification of the above equation, if the detection delay of the air/fuel ratio A/F is assumed to be one sampling cycle, the amount of fuel flow in the cylinders (Gfc) is given as $$Gfc(z) = Qa(z)/(z*A/F)$$

(z=time lead extension)

Here, Gfc(z) can be found by substituting the air/fuel ratio (A/F) detected by the state detecting unit 10 and the cylinder airflow amount ($Qa_{NN}$) estimated by the intake air amount estimating unit 22 into the above equation. After this, the difference between the injected fuel amount (Gf) detected by the state detecting unit 10 and the cylinder fuel flow amount (Gfc) is calculated as the compensation amount for the injected fuel amount (ΔGf). As a result, the compensatory amount for the injected fuel amount is calculated according to the equation given below.

$$\Delta Gf = Gf - Gfc$$

It should be noted here that it is also possible for the fuel adhesion rate (a) and the fuel evaporation rate (b) to be calculated from the injected fuel amount (Gf), the air/fuel ratio (A/F), and the cylinder airflow amount ($Qa_{NN}$), so that after the fuel adhesion rate (a) and the fuel evaporation rate (b) have been calculated, the compensatory fuel amount calculating unit 32 can use a map for the relationship between the fuel adhesion rate (a) and fuel evaporation rate (b) and the compensatory amount (ΔGf) for the injected fuel amount and so find the compensatory amount (ΔGf) for the injected fuel amount. Here, it has been supposed that the detection delay for the air/fuel ratio (A/F) is one sampling cycle, although this detection delay can be varied with the operational state of the engine.

The following is an explanation of the operation of the air/fuel ratio control apparatus constructed as described above. First, the state detecting unit 10 detects the engine RPM (Ne), intake air pressure (Pb), present throttle amount (THL), injected fuel amount (Gf), intake air temperature (Ta), cooling water temperature (Tw), and air/fuel ratio (A/F) as the physical values. Next, these physical values, with the exception of air/fuel ratio (A/F), are inputted into the neural network in the intake air amount estimating unit 22 which estimates the cylinder intake air amount (Qa). After this, the air/fuel ratio (A/F) and the injected fuel amount (Gf) detected by the state detecting unit 10 and the cylinder intake air amount (Qa) estimated by the intake air amount estimating unit 22 are inputted into the compensatory fuel amount calculating unit 32 which calculates the compensatory amount (ΔGf) for the injected fuel amount from these values. As in the previous embodiments, this compensatory amount (ΔGf) is added to the base injected fuel amount (Gf) and the total is sent to the injector I which injects the indicated amount or fuel into the engine E.

When, as described above, the air/fuel ratio control apparatus has a neural network which estimates the intake air amount, a reduced amount of trial and error is required than when the compensatory amount for the injected fuel amount is calculated by a neural network, and it also becomes easier to diagnose a problem with the system when the desired degree of accuracy cannot be achieved in the learning process. This makes it easier to develop the system, which in turn allows reductions in the necessary development time and development cost.

Sixth Embodiment

Figure 23:
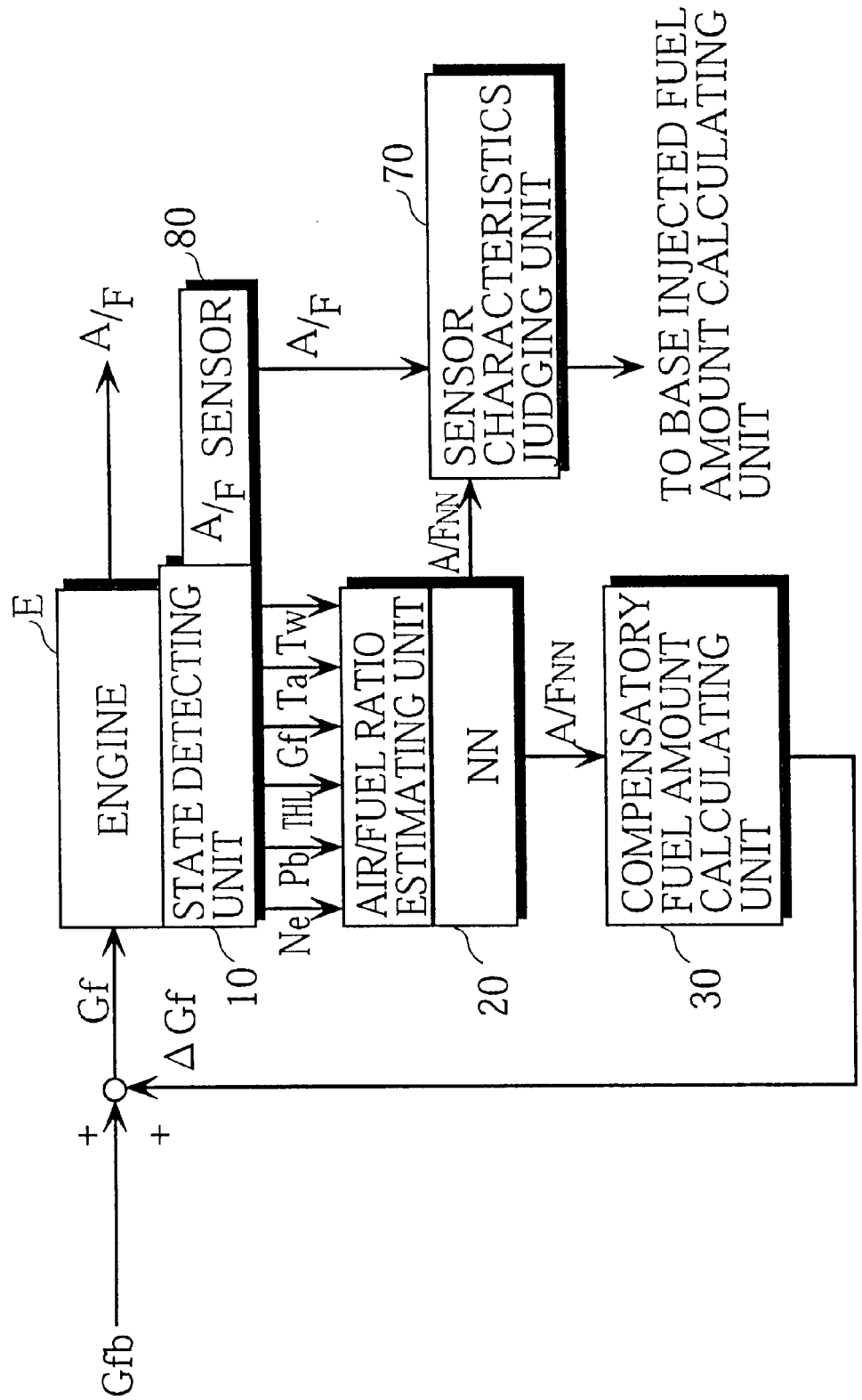
FIG. 23 is a functional block diagram showing the air/fuel ratio control apparatus of the sixth embodiment which includes an error/deterioration detection apparatus.

FIG. 23 is a functional block diagram for an air/fuel ratio control apparatus which includes the error/deterioration detecting apparatus of the present embodiment. The construction of this air/fuel ratio control apparatus includes a sensor characteristics judging unit 70 and an air/fuel ratio sensor 80 in addition to the air/fuel ratio control apparatus shown in FIG. 4. The error/deterioration detecting apparatus of the present embodiment is composed of the state detecting unit 10, the air/fuel ratio estimating unit 20, and an error/deterioration detecting means which is composed of the sensor characteristics judging unit 70 and the air/fuel ratio sensor 80.

The error/deterioration detecting apparatus of the present embodiment detects changes in operational characteristics for the air/fuel ratio sensor 80 using an air/fuel ratio estimated by a neural network. This is to say, the base injected fuel amount calculating unit 1 of FIG. 4 performs feedback control using the output value of an air/fuel ratio sensor, but when the operational characteristics of the air/fuel ratio sensor change over several years of use, the control characteristics deteriorate, which can lead to control fluctuations. Because of this, a conventional countermeasure is to reduce the feedback gain which lowers the control performance. In this respect, the present embodiment determines the extent of deterioration of the air/fuel ratio sensor so as to not excessively reduce the feedback gain, and so can avoid fluctuations in the control system.

In FIG. 23, the state detecting unit 10, the air/fuel ratio estimating unit 20, and the compensatory fuel amount calculating unit 30 are the same as those shown in FIG. 4, so that no further explanation will be given. The air/fuel ratio sensor 80 detects the air/fuel ratio in the exhaust pipe, and is achieved using the air/fuel ratio sensor q shown in FIG. 2.

Figure 24A:
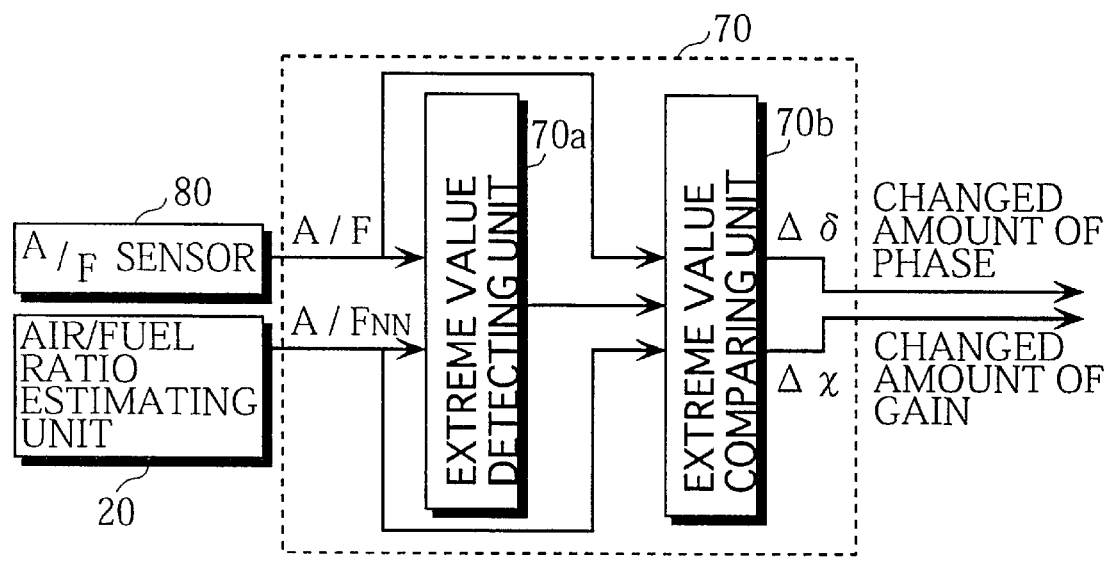
FIG. 24A shows the construction of the sensor characteristics judging unit.
Figure 24B:
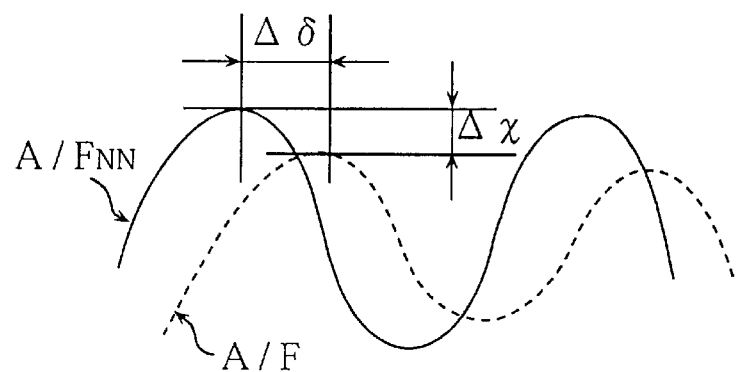
FIG. 24B shows a state where the characteristics of the detected air/fuel ratio and the estimated air/fuel ratio differ.

In more detail, the sensor characteristics judging unit 70 is made up of an extreme value detecting unit 70a and an extreme value comparing unit 70b. The extreme value detecting unit 70a performs differential calculation for each of the estimated air/fuel ratio ($A/F_{NN}$) calculated by the air/fuel ratio estimating unit 20 and the air/fuel ratio (A/F) detected by the air/fuel ratio sensor 80 and finds the extreme values. The extreme value comparing unit 70b then compares the time and values for these extreme values detected by the extreme value detecting unit 70a and finds the phase delay (Δδ) and the change in gain (ΔK) shown in FIG. 24B as the characteristics of the air/fuel ratio sensor 80. Here, the output values of the extreme value comparing unit 70b may be time constants or overhead times.

The operational characteristics of the air/fuel ratio sensor 80 which are calculated as described above by the sensor characteristics Judging unit 70 are then outputted to the base injected fuel amount calculating unit 1 shown in FIG. 4. The base injected fuel amount calculating unit 1 the changes the feedback gain based on these operational characteristics so as to maintain the control performance.

The following is a simplified description of the operation of the present error/deterioration detecting apparatus. First, the state detecting unit 10 detects the various physical values, such as engine RPM (Ne) and intake air pressure (Pb), which are then used as input parameters for the neural network of the air/fuel ratio estimating unit 20. This neural network estimates the air/fuel ratio ($A/F_{NN}$) and outputs it. At the same time, the air/fuel ratio sensor 80 detects the air/fuel ratio (A/F). The sensor characteristics judging unit 70 compares the estimated air/fuel ratio ($A/F_{NN}$) with the detected air/fuel ratio (A/F) and calculates a phase change amount and gain change amount which it outputs to the base injected fuel amount calculating unit 1. The base injected fuel amount calculating unit 1 then uses these values to adjust the feedback gain to an appropriate value.

Figure 25A:
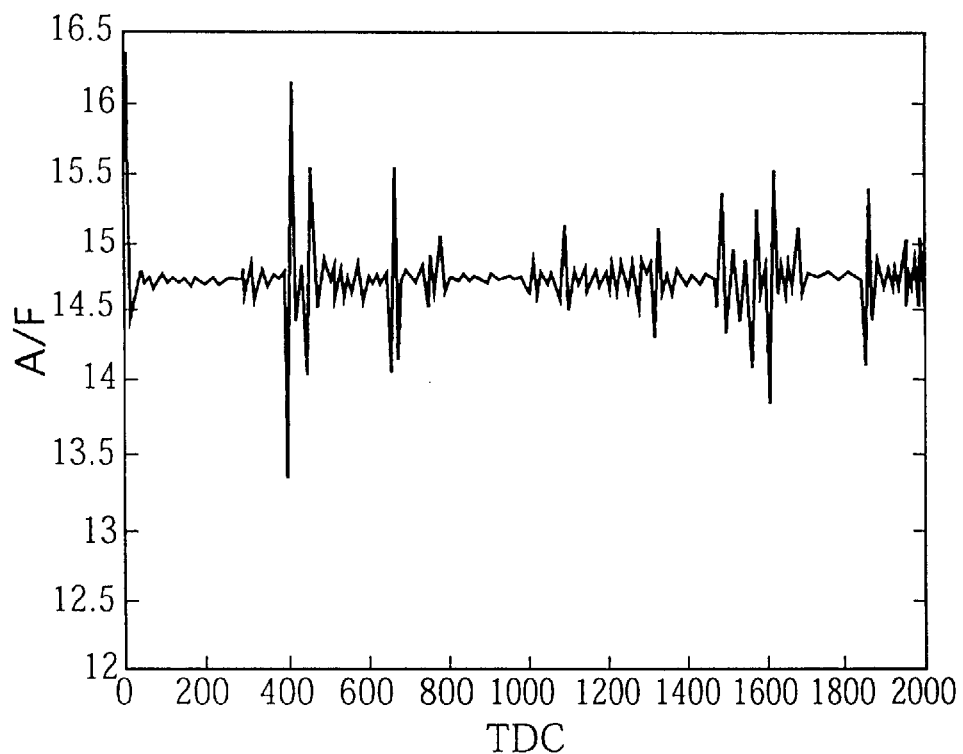
FIG. 25A shows the results of the air/fuel ratio control achieved by feedback control when the operational characteristics of the air/fuel ratio sensor have changed.
Figure 25B:
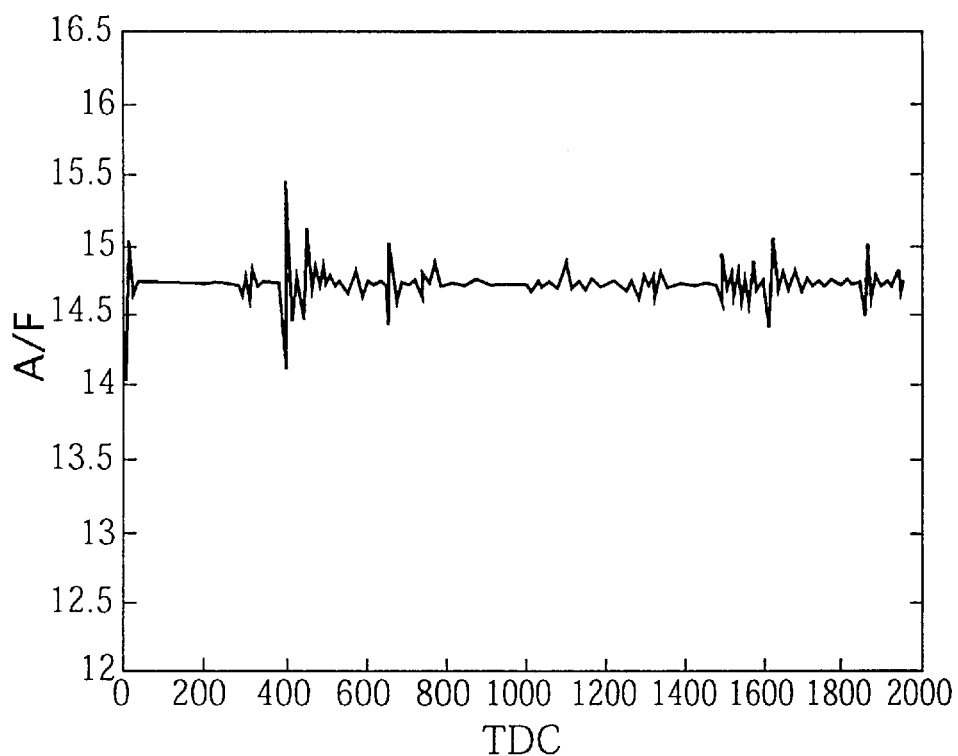
FIG. 25B shows the results of the air/fuel ratio control achieved by feedback control having changed the feedback gain in accordance with the changes in the operational characteristics of the air/fuel ratio sensor.

FIGS. 25A and 25B are comparative examples of the control results for random rapid opening and closing of the throttle when feedback gain is and is not adjusted with respect to the operational characteristics of the air/fuel ratio sensor 80 as described in the present embodiment. FIG. 25A shows the case when a deteriorated air/fuel ratio sensor 80 is used and feedback gain is not adjusted, while FIG. 25B shows the case when feedback gain is adjusted with respect to changes in the operational characteristics of the air/fuel ratio sensor 80. By comparing these figures, it can be seen that the fluctuations in air/fuel ratio are reduced when the feedback gain is adjusted with such operational characteristics.

In the present embodiment, the sensor characteristics judging unit 70 of the error/deterioration detecting apparatus has been described as detecting changes in the operational characteristics of the air/fuel ratio sensor 80 by comparing the extreme values over time of the air/fuel ratio detected by the air/fuel ratio sensor 80 and the air/fuel ratio estimated by the air/fuel ratio estimating unit 20, although it is also possible to estimate such changes using a neural network. Here, FIG. 26 is a functional block diagram for an error/deterioration detecting apparatus which includes a sensor characteristics judging unit 71 that uses a neural network to estimate the operational characteristics of the air/fuel ratio sensor 80.

In FIG. 26, the sensor characteristics judging unit 71 has the air/fuel ratio ($A/F_{NN}$) estimated by the air/fuel ratio estimating unit 20, the air/fuel ratio (A/F) detected by the air/fuel ratio sensor 80, and the physical values outputted by the state detecting unit 10 as its input parameters, and performs neural calculation with the operational characteristics of the air/fuel ratio sensor 80 as its output value. Here, the operational characteristics of the air/fuel ratio sensor 80 are set as having a first order delay, so that the change in operational characteristics is set as the change amount for time constants and gain in a first order delay model. The base injected fuel amount calculating unit 1 changes the control gain in accordance with these change amounts in the first order delay model. Here, if the operational characteristics are set as having a second or later order delay, the change amount in two time constants will be outputted. Here, aside from time constants and gain, overhead time may also be outputted.

With the above construction, when there has been no deterioration in the air/fuel ratio sensor 80, neural calculation is performed with the detected air/fuel ratio as an input parameter, so that an extent of deterioration can be determined by reduced development processes. Once the phase delay becomes large, the control gain of the base injected fuel amount calculating unit 1 can be reduced in accordance with a predetermined phase delay, with results in reduced fluctuation in control. This control gain used by the base injected fuel amount calculating unit 1 may also be directly outputted as an output of the neural network.

With the error/deterioration detecting apparatus of the present embodiment, even if there is deterioration in the air/fuel ratio sensor, the feedback gain will be suitably adjusted to maintain control performance and reduce fluctuations in control.

Seventh Embodiment

The following is a description of the error/deterioration detecting apparatus of the present embodiment which detects deterioration in the catalyst provided in the exhaust pipe. Here, FIG. 27 is a functional block diagram of an air/fuel ratio control apparatus which includes the error/deterioration detecting apparatus of the seventh embodiment. This error/deterioration detecting apparatus is composed of a state detecting unit 10, an air/fuel ratio estimating unit 20a, a compensatory fuel amount calculating unit 30, a catalyst deterioration detecting unit 72, and an air/fuel ratio sensor 80. The present error/deterioration detecting apparatus differs from the error/deterioration detecting apparatus of the sixth embodiment in that the air/fuel ratio sensor 80 detects the air/fuel ratio in the exhaust pipe after the catalyst, in that it includes a catalyst deterioration detecting unit 72, and in that the compensatory fuel amount calculating unit 30 calculates the compensatory amount for the injected fuel amount using the air/fuel ratio before the catalyst.

Figure 6:
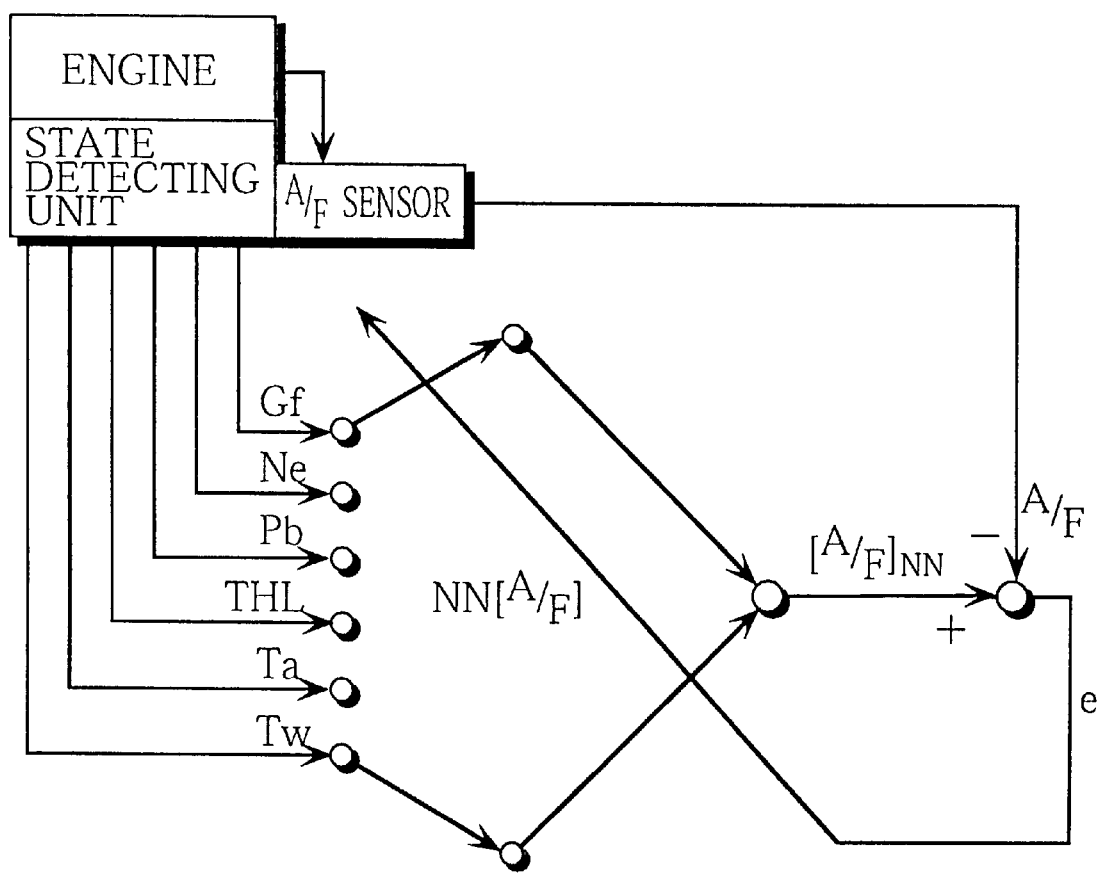
FIG. 6 shows a model example of the learning process for the neural network of the air/fuel ratio estimating unit.
Figure 28:
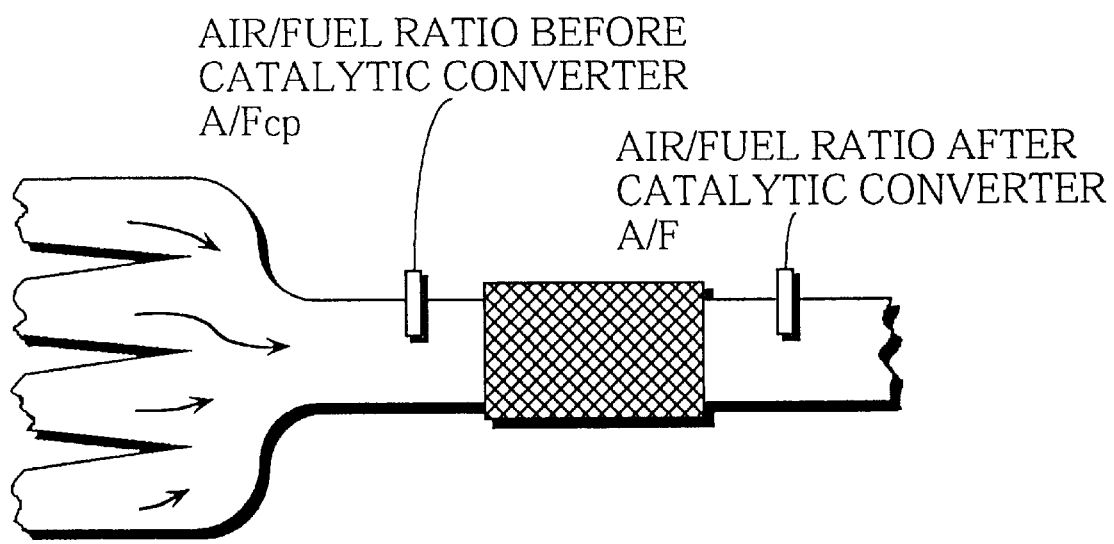
FIG. 28 shows the air/fuel ratio detection positions before catalytic conversion and after catalytic conversion.
Figure 29:
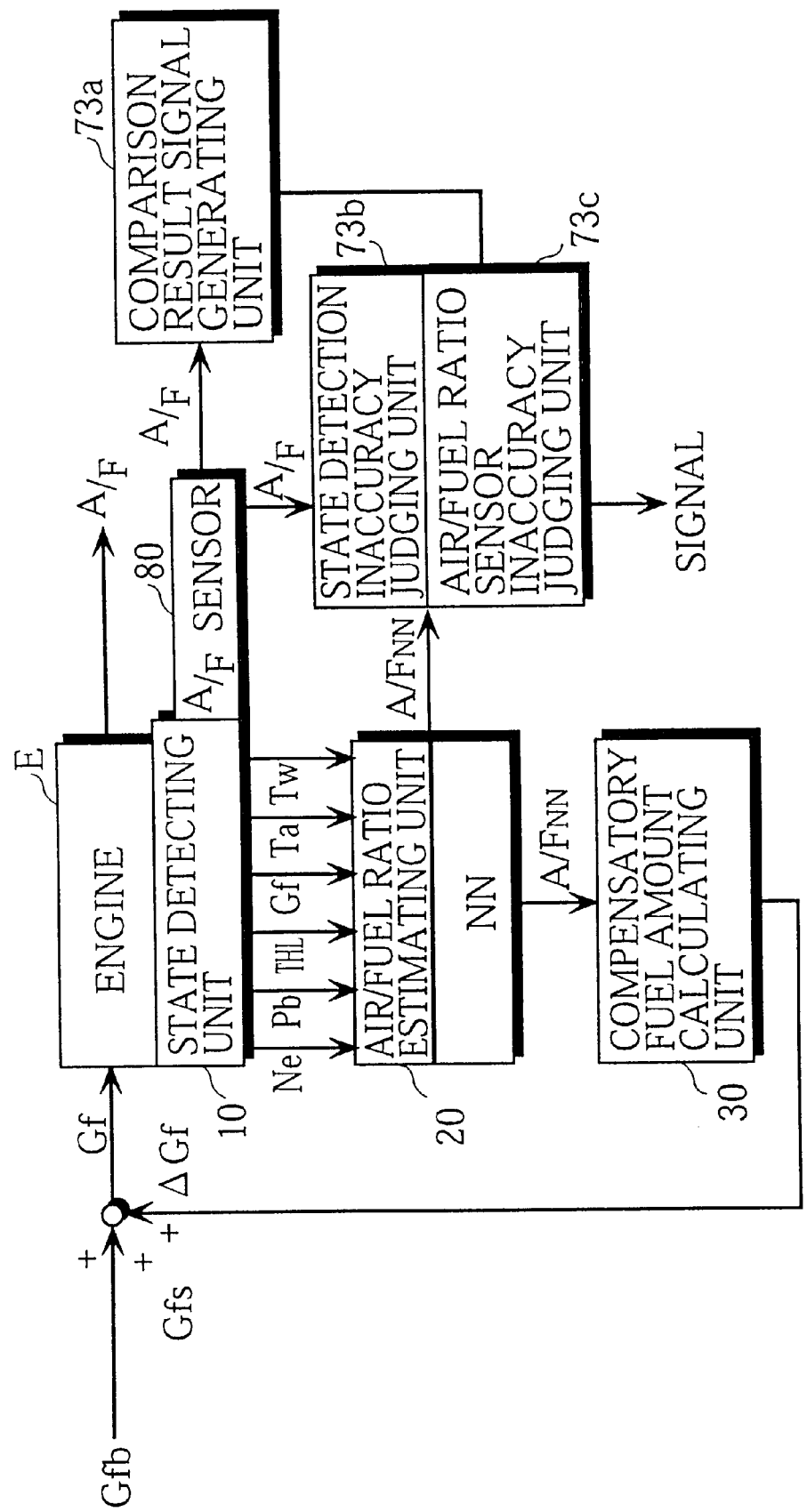
FIG. 29 is a functional block diagram showing the air/fuel ratio control apparatus of the eighth embodiment which includes an error/deterioration detection apparatus.

For the air/fuel ratio estimating unit 20a to estimate the air/fuel ratio in the exhaust pipe before the catalyst, the neural network in the air/fuel ratio estimating unit 20a may perform a learning process using the output signal for the air/fuel ratio (A/Fcp) detected by an air/fuel ratio sensor provided as shown in FIG. 28 before the catalyst as a teaching signal, according to a back propagation method as used by the neural network in FIG. 6.

The catalyst deterioration detecting unit 72 detects deterioration in the catalyst by comparing the air/fuel ratio (A/F) detected by the air/fuel ratio sensor 80 with the air/fuel ratio ($A/Fcp_{NN}$) estimated by the air/fuel ratio estimating unit 20a. More specifically, when the catalyst is functioning normally, if there is a change in oxygen density before the catalyst, this change in oxygen density will be less pronounced after the catalyst due to the oxygen holding ability of the catalyst, so that changes in fuel/air ratio after the catalyst are less pronounced than changes in air/fuel ratio before the catalyst. On the other hand, when the catalyst deteriorates, the change in air/fuel ratio after the catalyst will become closer to the change in air/fuel ratio before the catalyst. Because of this, the catalyst deterioration detecting unit 72 can detect deterioration in the catalyst by checking whether the difference between the change amount for the air/fuel ratio before the catalytic converter and the change amount for the air/fuel ratio after the catalytic converter is below a predetermined value. On detecting deterioration in the catalyst, the catalyst deterioration detecting unit 72 can issue a predetermined signal which can be a trigger for giving a warning to the driver to inform him/her of the deterioration of the catalyst.

The following is an explanation of the operation of the error/deterioration detecting apparatus of the present embodiment. First, the state detecting unit 10 detects the physical values such as engine RPM (Ne) and intake air pressure (Pb). These detected physical values are inputted into the air/fuel ratio estimating unit 20a which estimates the air/fuel ratio ($A/Fcp_{NN}$) before the catalyst using a neural network. At the same time, the air/fuel ratio sensor 80 detects the air/fuel ratio (A/F) after the catalyst. Following this, the catalyst deterioration detecting unit 72 compares the air/fuel ratio (A/Fcp$_{NN}$) before the catalyst which was estimated by the air/fuel ratio estimating unit 20a with the air/fuel ratio (A/F) after the catalyst detected by the air/fuel ratio sensor 80 and judges whether the difference in the values is equal to or below a predetermined value. Here, when the difference in the values is equal to or below a predetermined value, the catalyst deterioration detecting unit 72 issues a predetermined signal. This signal can then be used to inform the driver of the deterioration of the catalyst. On the other hand, when the difference in the values exceeds the predetermined value, the catalyst deterioration detecting unit 72 judges that the catalyst has not deteriorated and so does not issue the predetermined signal.

With the error/deterioration detecting apparatus of the present embodiment, the driver can be quickly informed of any deterioration in the catalyst and so will soon be able to have the catalyst replaced.

Eighth Embodiment

The following is an explanation of the error/deterioration detecting apparatus of the present embodiment which detects errors and deterioration in the state detecting unit or in the air/fuel ratio sensor. In an air/fuel ratio control system, when there is a decrease in the estimation accuracy of the neural network which outputs the estimated air/fuel ratio, such as when a normal operational bias is present between the air/fuel ratio estimated by the neural network and the air/fuel ratio detected by the air/fuel ratio sensor, it has not been conventionally possible to know whether such problem is caused by a range of values which nave poor estimating accuracy, by a problem with the input parameters of the neural network, or by deterioration of the air/fuel ratio sensor. However, with the construction of the present embodiment described below, such problems in the system can be detected in the system, FIG. 28 is a functional block diagram for an air/fuel ratio control apparatus which includes the error/deterioration detecting apparatus of the present embodiment. The error/deterioration detecting apparatus of the present embodiment is composed of a state detecting unit 10, an air/fuel ratio estimating unit 20, an air/fuel ratio sensor 80, and an error/deterioration detecting means which is made up of a comparison result signal generating unit 73a, a state detection inaccuracy judging unit 73b, and an air/fuel sensor inaccuracy judging unit 73c. This error/deterioration detecting means differs from that in the sixth embodiment in that in place of the sensor characteristics judging unit 70 as the error/deterioration detecting means, it includes a comparison result signal generating unit 73a, a state detection inaccuracy judging unit 73b, and an air/fuel sensor inaccuracy judging unit 73c.

The comparison result signal generating unit 73a calculates an absolute value (|A/F–A/Fs|) for the deviation between the air/fuel ratio (A/F) detected by the air/fuel ratio sensor 80 and a stoichiometric value (A/Fs=14.7), and outputs a comparison result signal when the absolute value of this deviation is below a predetermined first net value α. Here, "0.02" is used as this predetermined first set value α. It should be noted here that at the stoichiometric value, almost the same value will be detected by a deteriorated air/fuel ratio sensor as by a non-deteriorated air/fuel ratio sensor, no that it can be assumed that when the value detected by the air/fuel ratio sensor is the stoichiometric value, this value is correct, while when the air/fuel ratio sensor outputs a value which is not the stoichiometric value, deterioration in the air/fuel ratio sensor will result in an output value which is somewhat different to the actual value.

When a comparison result signal has been outputted, so the state detection inaccuracy judging unit 73b calculates an absolute difference |(A/F$_{NN}$)–(A/F)| between the air/fuel ratio (A/F) detected by the air/fuel ratio sensor 80 with the air/fuel ratio (A/F$_{NN}$) estimated by the air/fuel ratio estimating unit 20 and judges whether this absolute value is equal to or above a predetermined second met value β to detect an error or deterioration in the state detecting unit 10. In calculating this absolute value |(A/F$_{NN}$)–(A/F)|, the state detection inaccuracy judging unit 73b uses average values for the results of measurement in the previous control cycle. This is also the case for the air/fuel sensor inaccuracy judging unit 73c which is described below. When the state detection inaccuracy judging unit 73b does not detect an error or deterioration, it sats a flag E in a predetermined storage region, while when it detects an error or deterioration, it resets the flag E in a predetermined storage region and issues a predetermined signal Ss1. This signal Ss1 is then used as a trigger for issuing a warning to inform the driver of the problem with the sensors.

To set this predetermined second set value β, values which exceed the respective permitted range of error for each sensor may be used as input parameters which are individually set for each sensor, with the absolute deviation between the estimated air/fuel ratio (A/F$_{NN}$) and the detected air/fuel ratio (A/E) then being found and the smallest of these deviations being set as the set value β. Also, by finding out for each sensor the absolute value of the deviation between the estimated air/fuel ratio (A/F$_{NN}$) and the detected air/fuel ratio (A/F) when the value of the sensor exceeds its permitted range, it becomes easier to identify the defective sensor. Here, "1" is used as this set value β.

When no comparison result signal has been issued by the comparison result signal generating unit 73a and the state detection inaccuracy judging unit 73b has detected no error or deterioration in the state detecting unit 10, which is to say when the flag E is set, the air/fuel sensor inaccuracy judging unit 73c calculates an absolute difference |(A/F$_{NN}$)–(A/F)| between the air/fuel ratio (A/F) detected by the air/fuel ratio sensor 80 with the air/fuel ratio (A/F$_{NN}$) estimated by the air/fuel ratio estimating unit 20 and judges whether this absolute value is equal to or above a predetermined third set value γ to detect an error or deterioration in the air/fuel ratio sensor 80. Here, "1" is used as this predetermined third set value γ. On detecting an error or deterioration in the air/fuel ratio sensor 80, the air/fuel sensor inaccuracy judging unit 73c issues predetermined signal Ss2. This signal Ss2 is then used as a trigger for issuing a warning to inform the driver of the problem with the air/fuel ratio sensor.

Figure 30:
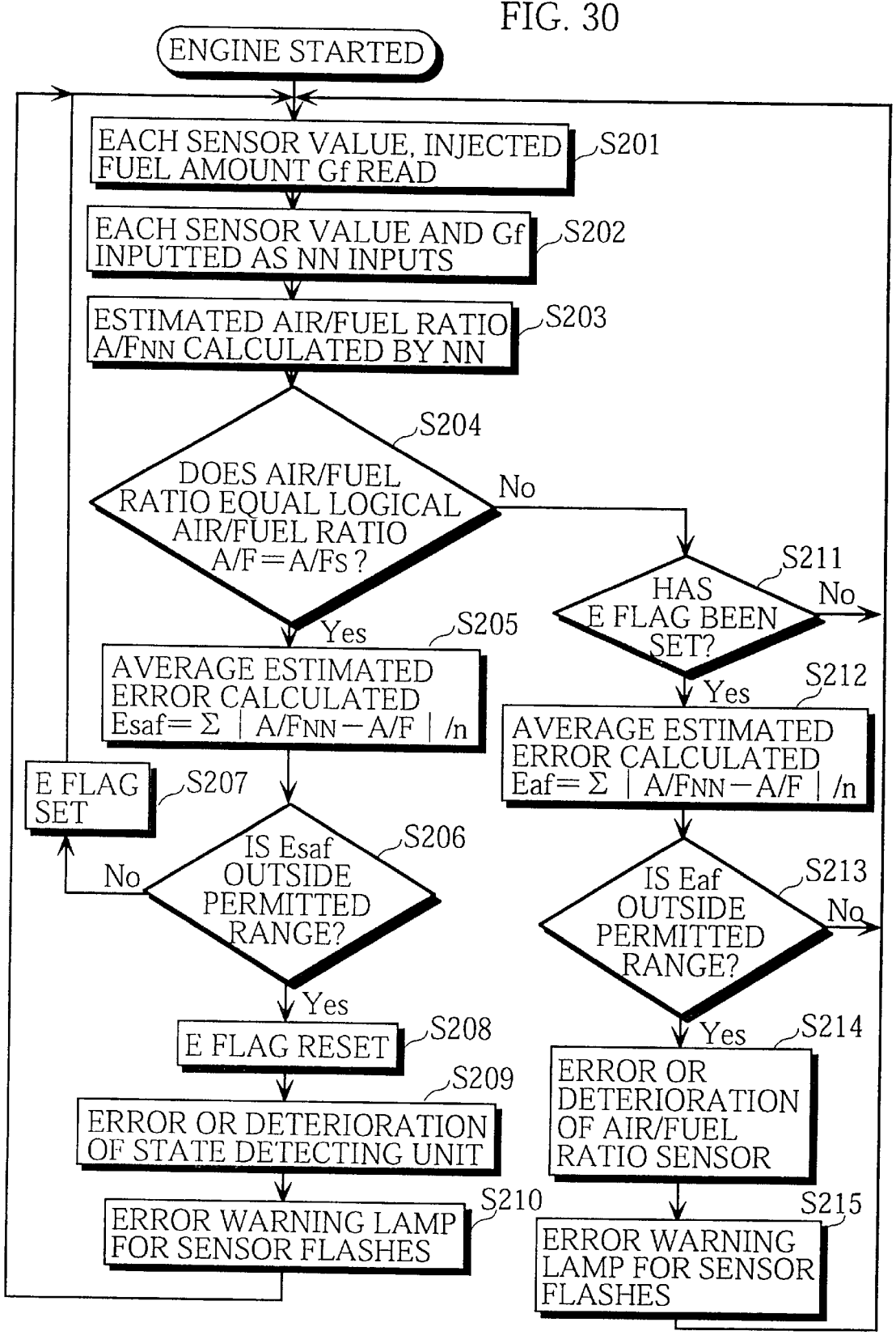
FIG. 30 is a flowchart showing the operation of the error/deterioration detection apparatus of the eighth embodiment.

The following is an explanation of the operation of the error/deterioration detecting apparatus of the present embodiment, with reference to the flowchart in FIG. 30. Once the engine has been started, the state detecting unit 10 obtains the output values of all of the sensors and the injected fuel amount (Gf) (S201), and inputs these values into the air/fuel ratio estimating unit 20 (S202). Next, the air/fuel ratio estimating unit 20 estimates the air/fuel ratio (A/F$_{NN}$) from these input parameters (S203). After this, the comparison result signal generating unit 73a judges whether the absolute value for the deviation between the air/fuel ratio (A/F) detected by the air/fuel ratio sensor 80 and the stoichiometric value (A/Fs) is below the predetermined first set value α, which is to say whether the air/fuel ratio (A/F) detected by the air/fuel ratio sensor 80 approximates to the stoichiometric value (S204).

When the air/fuel ratio (A/F) detected by the air/fuel ratio sensor 80 approximates to the stoichiometric value, the comparison result signal generating unit 73a outputs the comparison result signal. On receiving this signal, the state detection inaccuracy judging unit 73b calculates the average value Esaf for the absolute value of the estimated deviation $(A/F_{NN})-(A/F)$ between the air/fuel ratio $(A/F_{NN})$ estimated by the air/fuel ratio estimating-unit 20 and the air/fuel ratio (A/F) detected by the air/fuel ratio sensor 80 (S205), and judges whether the calculated average value Esaf is equal to or above a predetermined second set value β (S206). When this value Esaf is below the predetermined second set value β, the state detection inaccuracy judging unit 73b judges that the state detecting unit 10 is functioning normally and sets the E flag (S207). On the other hand, when this value Esaf is equal to or above the predetermined second set value β, the state detection inaccuracy judging unit 73b judges that there is an error or deterioration in the state detecting unit 10 and so resets the flag E if it were already set (S208) and outputs the predetermined signal Ss1 (S209). This is to say, if the output of the air/fuel ratio sensor approximates to the stoichiometric value, the output of the air/fuel ratio sensor can be assumed to be correct, so that when there is a large deviation between the estimated air/fuel ratio $(A/F_{NN})$ and the detected air/fuel ratio (A/F), this can be considered as having been caused by an error or deterioration with the state detecting unit 10 and not by a problem with the air/fuel ratio sensor 80. The outputted signal Sa1 is used to trigger the illumination of a warning lamp which informs the driver of a problem with the sensors (S210).

After this, the processing returns to S201, and steps S201 to S204 are repeated. If the comparison result signal generating unit 73a judges that the detected air/fuel ratio (A/F) approximates to the stoichiometric value, the processing continues from S206 as described above. On the other hand, when the comparison result signal generating unit 73a judges that the detected air/fuel ratio (A/F) does not approximate to the stoichiometric value, the air/fuel sensor inaccuracy judging unit 73c judges whether the flag E has been set, which is to say, whether the state detecting unit 10 is functioning properly (S211).

Here, if the flag E has not been set, an error or deterioration is present in the state detecting unit 10, so that it is not possible for the air/fuel ratio estimating unit 20 which uses the outputs of the state detecting unit 10 to output a correct estimated air/fuel ratio $(A/F_{NN})$, so that the processing returns to S201. On the other hand, when the flag E has been set, the air/fuel sensor inaccuracy judging unit 73c judges that the air/fuel ratio $(A/F_{NN})$ estimated by the air/fuel ratio estimating unit 20 is correct, and so calculates the average value Eaf for the absolute value of the estimated deviation $(A/F_{NN})-(A/F)$ between the air/fuel ratio $(A/F_{NN})$ estimated by the air/fuel ratio estimating unit 20 and the air/fuel ratio (A/F) detected by the air/fuel ratio sensor 80 (S212). The air/fuel sensor inaccuracy judging unit 73c then judges whether the calculated average value Eaf is equal to or above a predetermined third set value γ (S213). When this value Eaf is below the predetermined third set value γ, the air/fuel sensor inaccuracy judging unit 73c judges that the air/fuel ratio sensor 80 is functioning normally, so that the processing returns to step S201. On the other hand, when this value Eaf is equal to or above the predetermined third set value γ, the air/fuel sensor inaccuracy judging unit 73c judges that there is an error or deterioration in the air/fuel ratio sensor 80, and so outputs the predetermined signal Ss2 (S214). The outputted signal Ss2 is used to trigger the illumination of a warning lamp which informs the driver of a problem with the air/fuel ratio sensor (S215).

It should be noted here that while steps S205/S206 and S212/S213 have been described as taking an average value of absolute value for the estimated deviation and then judging whether the average value exceeds a predetermined value, it is also possible to construct the system so as to count the number of times the predetermined value is exceeded.

With the error/deterioration detecting apparatus of the present embodiment, deterioration and breakage of the various sensors can be detected while the engine is running, so that the driver can be informed of the need for inspection. While the present embodiment has been described as being used to inform a driver of problems with the sensors, it may alternatively be used during manufacturing to test whether each sensor is operating within its permitted range.

Ninth Embodiment

Figure 31:
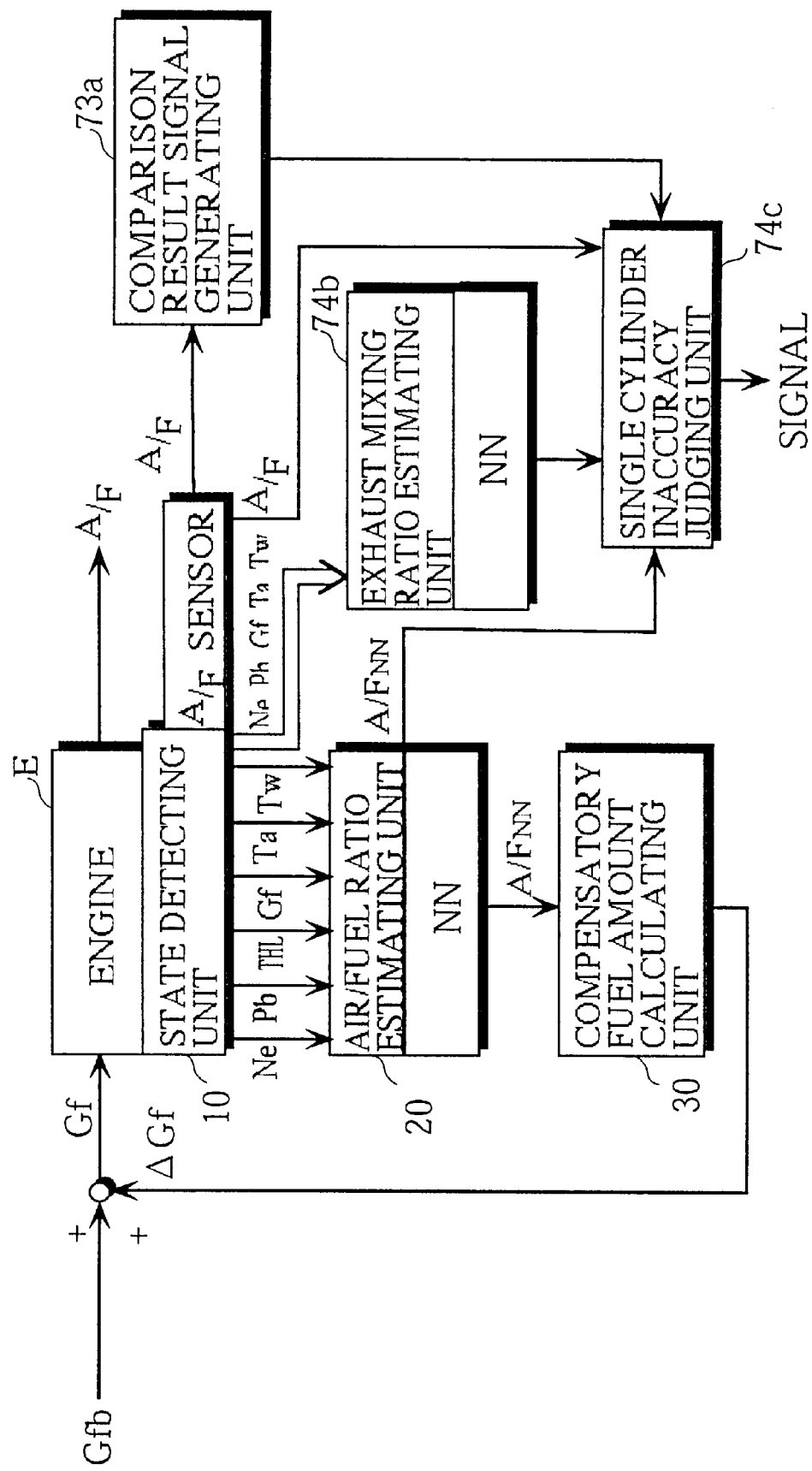
FIG. 31 is a functional block diagram showing the air/fuel ratio control apparatus of the ninth embodiment which includes an error/deterioration detection apparatus.

The following is an explanation of an error/deterioration detecting apparatus which detects problems in each of the separate cylinders. FIG. 31 is a functional block diagram showing an air/fuel ratio control apparatus which is equipped with the error/deterioration detecting apparatus of this ninth embodiment. This error/deterioration detecting apparatus is composed of a state detecting unit 10, an air/fuel ratio estimating unit 20, an air/fuel ratio sensor 80, and an error/deterioration detecting means including a comparison result signal generating unit 73a, an exhaust mixing ratio estimating unit 74b, and a single cylinder inaccuracy judging unit 74c. This error/deterioration detecting apparatus differs from that of the sixth embodiment in that in place of the sensor characteristics judging unit 70, it includes a comparison result signal generating unit 73a, an exhaust mixing ratio estimating unit 74b, and a single cylinder inaccuracy judging unit 74c.

The comparison result signal generating unit 73a is the same as that in the eighth embodiment, and so outputs a comparison result signal when the absolute value of the deviation between the air/fuel ratio (A/F) detected by the air/fuel ratio sensor 80 and the stoichiometric value is equal to or below the predetermined first value.

The exhaust mixing ratio estimating unit 74b receives an input of the physical values detected by the state detecting unit 10 and uses a neural network to estimate the exhaust mixing ratio of each cylinder in the exhaust gathering unit. For the example of a four-cylinder engine, it estimates four mixing ratios C1, C2, C3, and C4.

Figure 32:
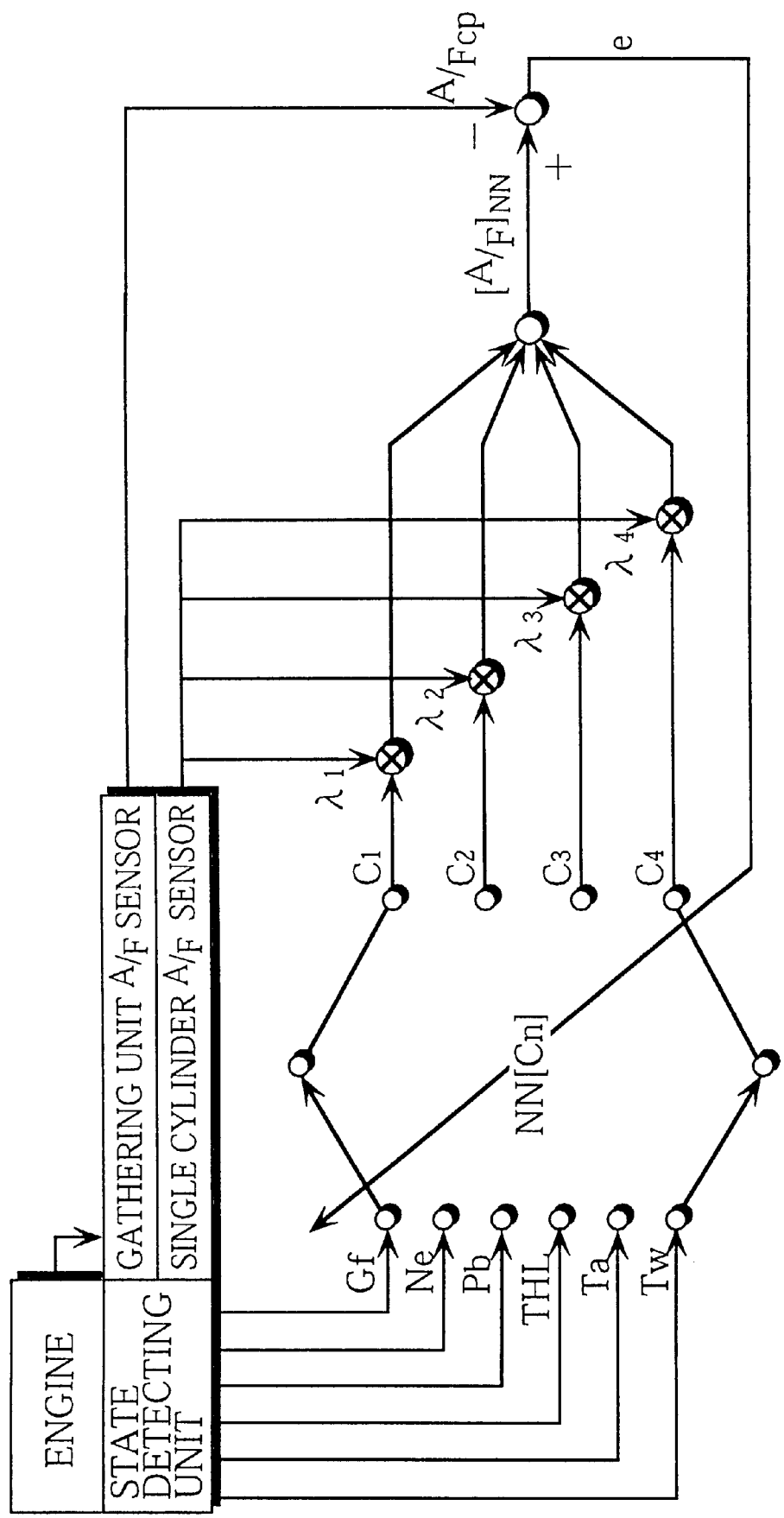
FIG. 32 shows a model example or the learning process of the neural network of the exhaust mixing ratio estimating unit.

FIG. 32 shows the learning process for the neural network used by the exhaust mixing ratio estimating unit 74b to estimate the exhaust mixing ratios (C1, C2, C3, and C4). As shown in the figure, a single cylinder air/fuel ratio sensor is provided for each cylinder, so that the air/fuel ratio (λ1, λ2, λ3, λ4) for each cylinder is detected. The gathering unit air/fuel ratio sensor detects the air/fuel ratio (A/Fcp) in the gathering unit. Here, the air/fuel ratio (A/Fcp) in the gathering unit can be expressed in terms of the exhaust mixing ratio of each cylinder (C1, C2, C3, and C4) and the air/fuel ratio in each cylinder (λ1, λ2, λ3, λ4) by the following expression $$A/Fcp = C1*\lambda1 + C2*\lambda2 + C3*\lambda3 + C4*\lambda4 \qquad [3]$$

Accordingly, a neural network which outputs the exhaust mixing ratio of each cylinder (C1, C2, C3, and C4) is constructed as shown in FIG. 32. This neural network uses the air/fuel ratio (A/Fcp) in the gathering unit as the teaching signal, and changes its construction according to a back propagation method so as to minimize the deviation e between the total of each of its output values calculated by the air/fuel ratio in the corresponding cylinders and the detected the air/fuel ratio (A/Fcp) in the gathering unit.

When the comparison result signal is outputted and the exhaust mixing ratio estimating unit 74b has estimated that the exhaust mixing ratio in a specified cylinder is the largest, the single cylinder inaccuracy judging unit 74c judges whether the absolute value for the deviation between the air/fuel ratio ($A/F_{NN}$) estimated by the air/fuel ratio estimating unit 20 and the air/fuel ratio (A/F) detected by the air/fuel ratio sensor 80 is equal to or above a predetermined fourth set value $\epsilon$, and if so judges that there is an error or deterioration in the specified cylinder. Here, "1" is used as this predetermined fourth set value $\epsilon$. When the single cylinder inaccuracy judging unit 74c judges that there is an error or deterioration in the specified cylinder, it outputs a signal which indicates the specified cylinder. This signal is then used as a trigger for a warning apparatus to warn the driver of a problem with the specified cylinder.

Figure 33:
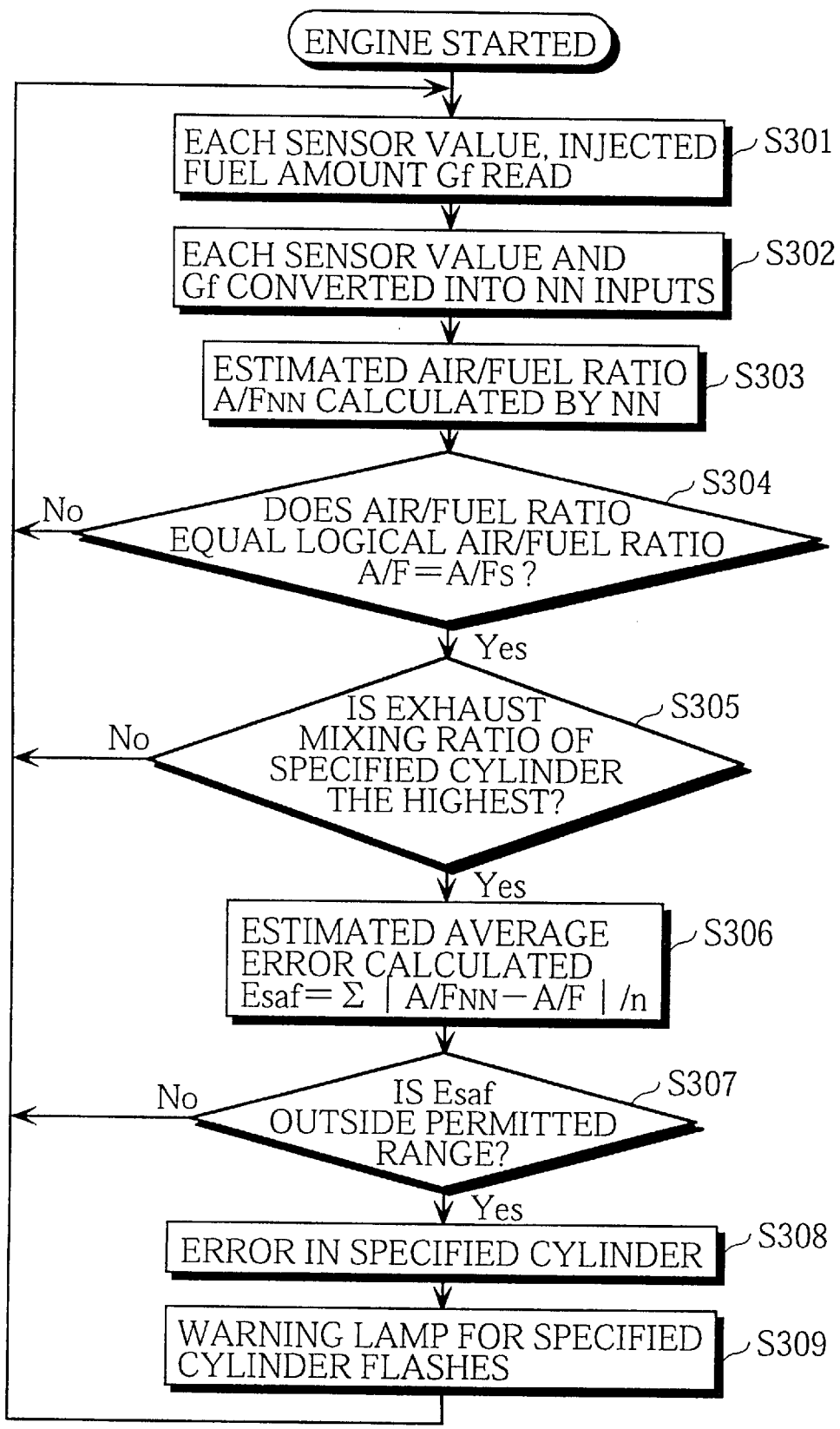
FIG. 33 is a flowchart showing the operation of the air/fuel ratio control apparatus of the ninth embodiment.

The following is an explanation of the operation of the error/deterioration detecting apparatus of the present embodiment, with reference to the flowchart shown in FIG. 33. Once the engine has been started, the state detecting unit 10 obtains the output values of all of the sensors and the injected fuel amount (Gf) (S301), and inputs these values into the air/fuel ratio estimating unit 20 (S302). Next, the air/fuel ratio estimating unit 20 estimates the air/fuel ratio ($A/F_{NN}$) from these input parameters (S303). After this, the comparison result signal generating unit 73a judges whether the absolute value for the deviation between the air/fuel ratio (A/F) detected by the air/fuel ratio sensor 80 and the stoichiometric value (A/Fs) is below the predetermined first set value $\alpha$, which is to say whether the air/fuel ratio (A/F) detected by the air/fuel ratio sensor 80 approximates to the stoichiometric value (S304).

When the air/fuel ratio (A/F) detected by the air/fuel ratio sensor 80 approximates to the stoichiometric value, the comparison result signal generating unit 73a outputs the comparison result signal. On receiving this signal, the single cylinder inaccuracy judging unit 74c judges whether the exhaust mixing ratio for a specified cylinder which has been estimated by the exhaust mixing ratio estimating unit 74b is the highest (S305). Here, if the exhaust mixing ratio for the specified cylinder is the highest, the single cylinder inaccuracy judging unit 74c calculates the average value Esaf for the absolute value of the estimated deviation ($A/F_{NN}$)–(A/F) between the air/fuel ratio ($A/F_{NN}$) estimated by the air/fuel ratio estimating unit 20 and the air/fuel ratio (A/F) detected by the air/fuel ratio sensor 80 (S306), and judges whether the calculated average value Esaf is equal to or above a predetermined fourth set value $\epsilon$ (S307). When this value Esaf is equal to or above the predetermined fourth set value $\epsilon$, the single cylinder inaccuracy judging unit 74c judges that there is an error or deterioration in the specified cylinder, and outputs a signal Ss3 which indicates the specified cylinder (S308).

This is to say, if the output of the air/fuel ratio sensor approximates to the stoichiometric value, the output of the air/fuel ratio sensor can be assumed to be correct, so that when there is a large deviation between the estimated air/fuel ratio ($A/F_{NN}$) and the detected air/fuel ratio (A/F) and the exhaust mixing ratio of a specified cylinder is the highest, this can be considered as having been caused by an error or deterioration with the specified cylinder and not by a problem with an air/fuel ratio sensor. Finally, a warning lamp for the specified cylinder is illuminated in accordance with the signal Ss3 (S309). Here, note that when a "No" judgement is given in any of steps S304, S305, or S307, the processing returns to step S301.

With the above operation, problems such as inconsistencies with the injector in one of the cylinders or deterioration in a spark plug in one of the cylinders can be correctly detected as a problem for a specified cylinder.

It should be noted here that while the air/fuel ratio estimating unit 20 has been described as directly estimating air/fuel ratio in the gathering unit from the values detected by the state detecting unit 10, it may instead use the exhaust mixing ratios (C1, C2, C3, and C4) estimated by the exhaust mixing ratio estimating unit 74b to estimate the air/fuel ratio. This is to say, it may estimate the air/fuel ratio in each cylinder ($\lambda 1$, $\lambda 2$, $\lambda 3$, $\lambda 4$) from the values detected by the state detecting unit 10 and then substitute each of these values and the exhaust mixing ratios (C1, C2, C3, and C4) estimated by the exhaust mixing ratio estimating unit 74b into the equation [3] shown above to calculate the air/fuel ratio (A/Fcp) in the gathering unit.

Figure 34:
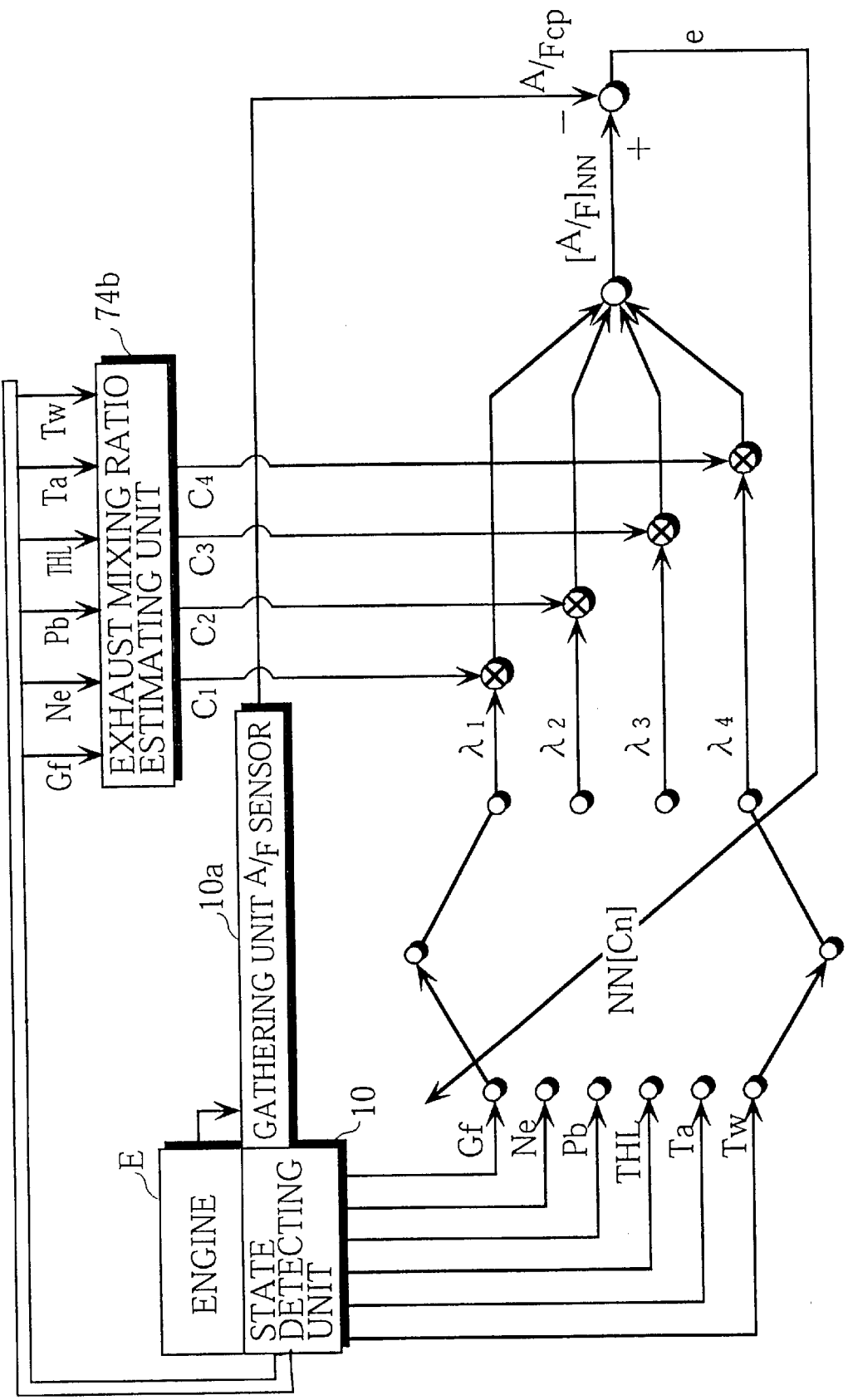
FIG. 34 shows a model example or the learning process of the neural network which estimates the air/fuel ratio for each cylinder.

The following is an explanation of the learning process of the neural network (NN2) which outputs the air/fuel ratio in each cylinder ($\lambda 1$, $\lambda 2$, $\lambda 3$, $\lambda 4$), which is shown in FIG. 34. As shown in the drawing, the neural network is constructed to output air/fuel ratio in each cylinder ($\lambda 1$, $\lambda 2$, $\lambda 3$, $\lambda 4$), with the neural network changing its construction in accordance with a back propagation method to minimize the deviation e between the air/fuel ratio ($A/Fcp_{NN}$), calculated by substituting these values ($\lambda 1$, $\lambda 2$, $\lambda 3$, $\lambda 4$) and the exhaust mixing ratios (C1, C2, C3, and C4) estimated by the exhaust mixing ratio estimating unit 74b into the equation. [3], and the air/fuel ratio (A/Fcp) detected by the air/fuel ratio sensor in the gathering unit. By doing so, a neural network which estimates the exhaust air/fuel ratio for each cylinder in accordance with operational state of the engine can be achieved. It should be noted here that a neural network which directly estimates the exhaust air/fuel ratio for each cylinder may perform a learning process with the outputs of air/fuel ratio sensors provided for each cylinder as teaching signals.

Tenth Embodiment

Figure 35:
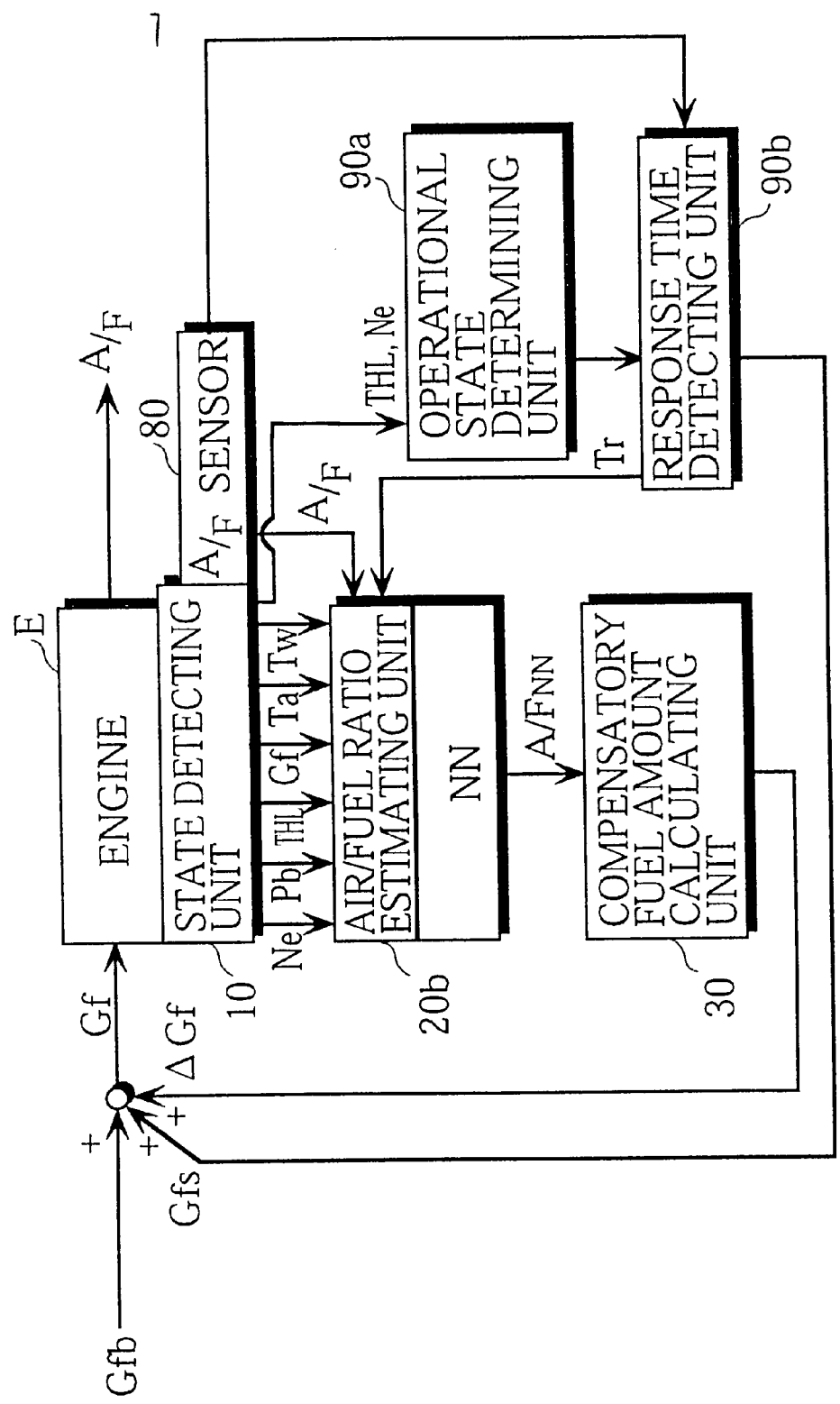
FIG. 35 is a functional block diagram showing the air/fuel ratio control apparatus of the tenth embodiment.

The tenth embodiment of the present invention is an air/fuel ratio control apparatus which performs appropriate control of air/fuel ratio even when there is an increase in response time due to deterioration of an air/fuel ratio sensor. FIG. 35 shows a functional block diagram for the air/fuel ratio control apparatus of the present embodiment. As shown in the drawing, the present air/fuel ratio control apparatus is composed of a state detecting unit 10, an air/fuel ratio estimating unit 20b, a compensatory fuel amount calculating unit 30, an air/fuel ratio sensor 80, an operational state determining unit 90a, and a response time detecting unit 90b. The air/fuel ratio control apparatus of the present embodiment differs from that of the first embodiment in that it additionally includes an air/fuel ratio sensor 80, an operational state determining unit 90a, and a response time detecting unit 90b, and in the input parameters of the air/fuel ratio estimating unit 20 include the air/fuel ratio (A/F) detected by the air/fuel ratio sensor 80 and the response time (Tr) detected by the response time detecting unit 90b.

The air/fuel ratio sensor 80 detects the air/fuel ratio in the exhaust pipe. The operational state determining unit 90a detects a certain state for the engine based on at least one of the physical values showing the state of the engine which are detected by the state detecting unit 10. Here, engine RPM (Ne) and throttle amount (THL) are used as the physical values showing the state of the engine, with the operational state determining unit 90a using these to detect whether the engine is idling. Here, the physical values detected by the state detecting unit 10 are used as they are, although it is also possible to detect other physical values to show the state of the engine.

When the operational state determining unit 90a detects that the engine is in the certain state, which in the above example is an idling state, the response time detecting unit 90b changes at least one of the physical values detected by the state detecting unit 10 and detects and stores the response time between the time the physical value is changed and a fluctuation in the air/fuel ratio detected by the air/fuel ratio sensor 80. Here, injected fuel amount is used as the physical value which is changed, with this injected fuel amount being increased by only a predetermined differential amount (Gfs). After this, the response time detecting unit 90b measures the time period from this increase in the injected fuel amount to a change in the air/fuel ratio detected by the air/fuel ratio sensor 80 to give the response time (Tr) of the air/fuel ratio sensor 80.

Figure 36:
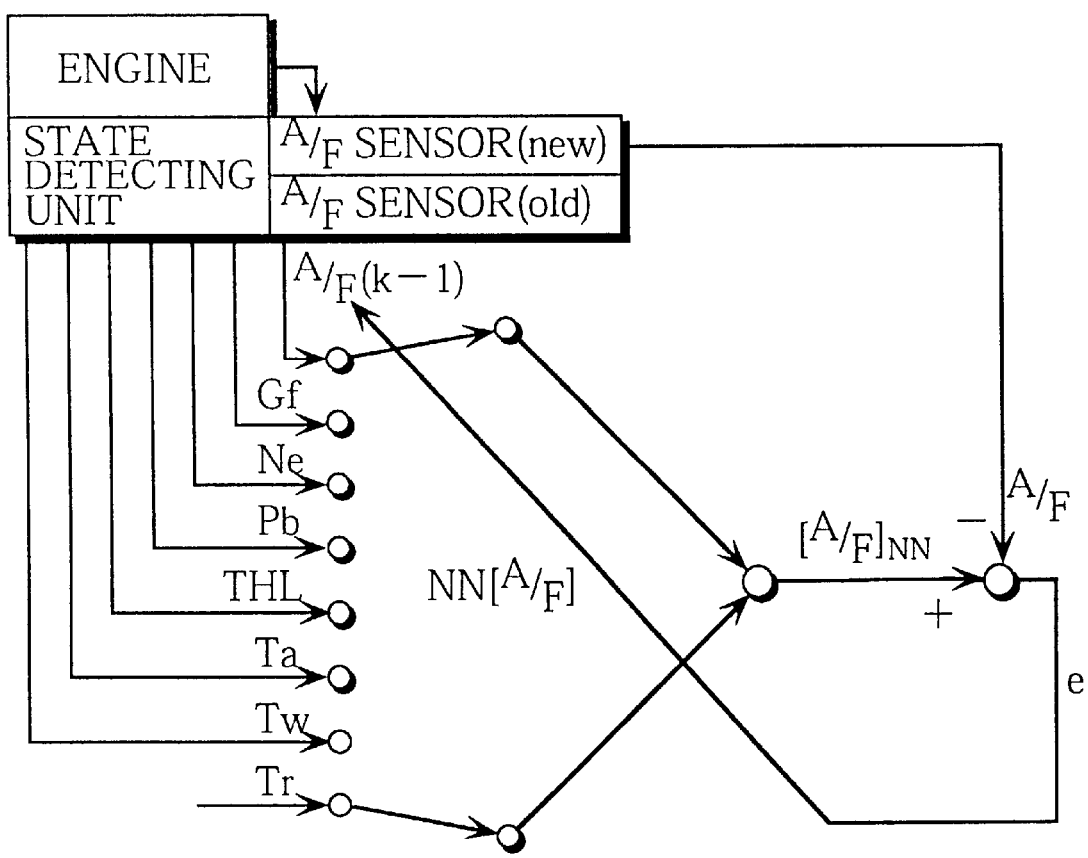
FIG. 36 shows a model example of the learning process of the neural network in the air/fuel ratio estimating unit.

The air/fuel ratio estimating unit 20b uses a neural network to estimate the air/fuel ratio, with the physical values (Ne, Pb . . . ) detected by the state detecting unit 10, the air/fuel ratio (A/F) detected by the air/fuel ratio sensor 80, and the response time (Tr) detected by the response time detecting unit 90b as its input parameters. The learning process for the neural network used by the air/fuel ratio estimating unit 20b is described below with reference to FIG. 36. As shown in the figure, the input parameters for this neural network are engine RPM (Ne), intake air pressure (Pb), throttle amount (THL), injected fuel amount (Gf), intake air temperature (Ta), and cooling water temperature (Tw) outputted by the state detecting unit 10, air/fuel ratio (A/F) detected by the air/fuel ratio sensor 80, and response time (Tr) detected by the response time detecting unit 90b. This inputted air/fuel ratio is an air/fuel ratio detected by a deteriorated air/fuel ratio sensor, so that the response time (Tr) is the response time for this deteriorated sensor. On the other hand, an output signal of a non-deteriorated air/fuel ratio sensor is used as the teaching signal for the neural network. Here, while using air/fuel ratio sensors in various states of deterioration for detecting the inputted air/fuel ratio so as to change the response time for such input, the neural network changes its construction according to a back propagation method so as to minimize the deviation between the air/fuel ratio (A/F) of the teaching signal and the air/fuel ratio (A/F$_{NN}$) estimated by the neural network. By doing so, the neural network becomes able to appropriately estimate the air/fuel ratio without a response delay or change in gain even when provided with the input of a deteriorated air/fuel ratio sensor.

Figure 37:
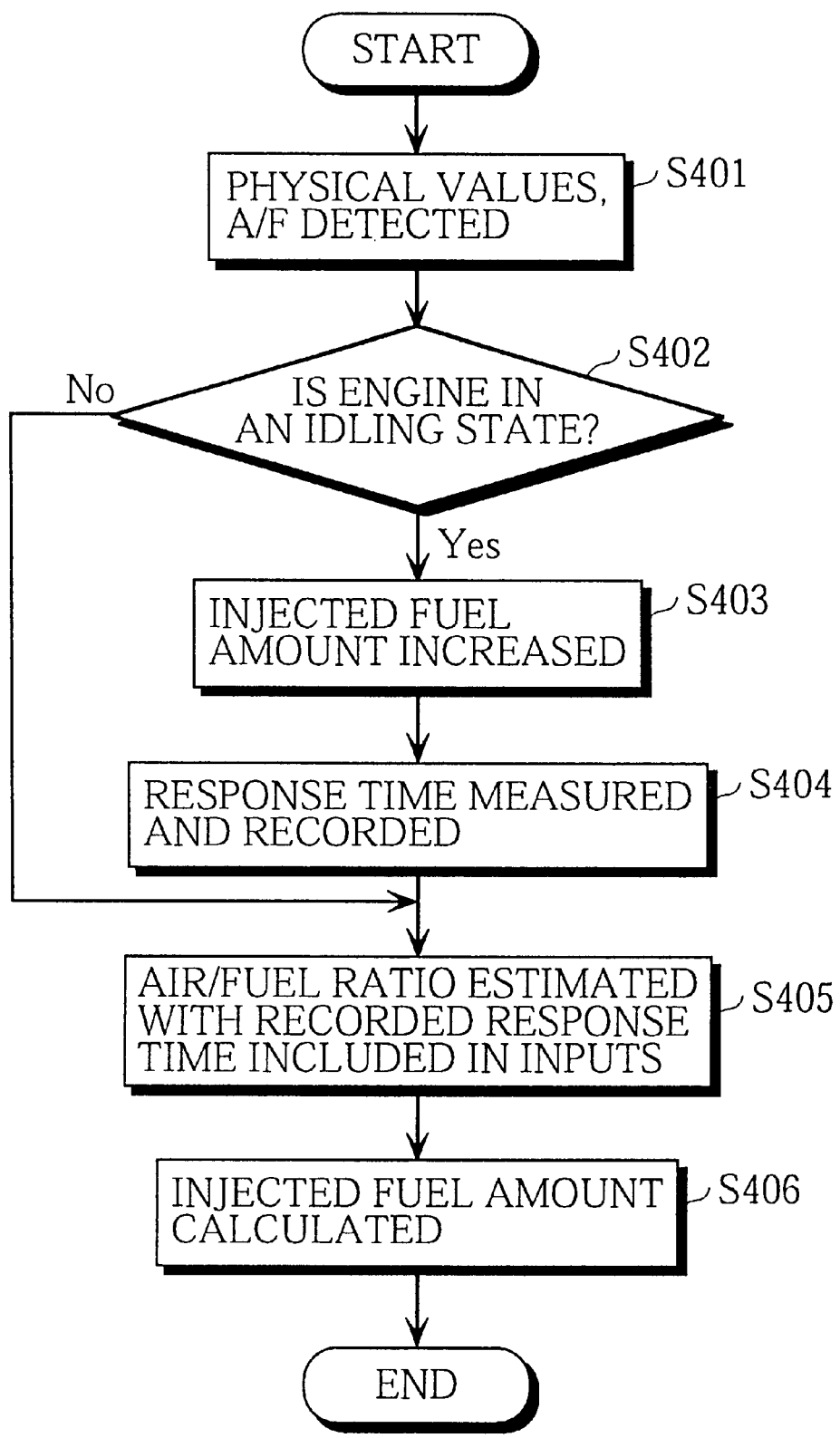
FIG. 37 is a flowchart showing the operation of the air/fuel ratio control apparatus of the tenth embodiment.
Figure 38A:
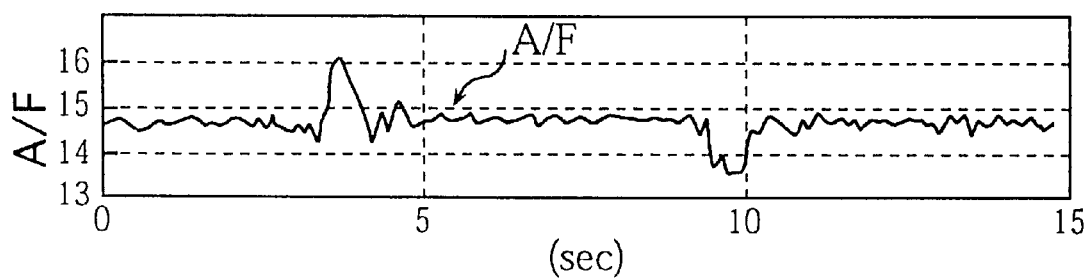
FIG. 38A shows the results of air/fuel ratio control according to a conventional air/fuel ratio control apparatus.
Figure 38B:
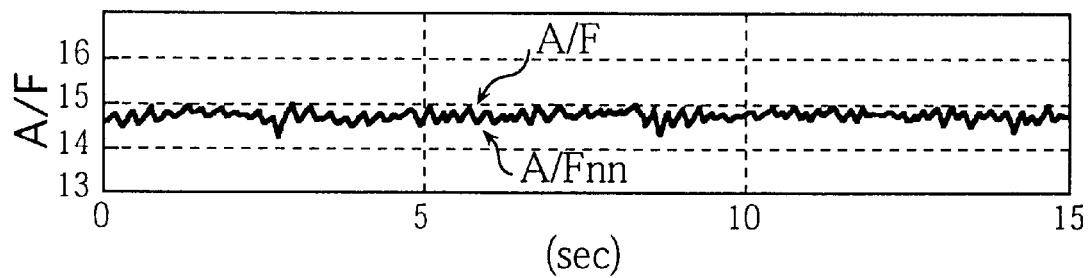
FIG. 38B shows the results of air/fuel ratio control according to the air/fuel ratio control apparatus of the tenth embodiment.

The following is an explanation of the operation of the present air/fuel ratio control apparatus, with reference to the flowchart in FIG. 37. First, the state detecting unit 10 detects the various physical values (S401). Next, the operational state determining unit 90a judges whether the engine is an idling state, based on the throttle amount (THL) and engine RPM (Ne), out of the physical values detected by the state detecting unit 10 (S402). Here, if the engine is idling, the response time detecting unit 90b adds the differential amount (Gfs) to the injected fuel amount (Gf) (S403). After this, the response time detecting unit 90b measures the time period from the increase in the injected fuel amount (Cf) to a change in the output of the air/fuel ratio sensor 80, which is to say the response time which it then stores (S404).

After this, the air/fuel ratio estimating unit 20b uses a neural network to estimate the air/fuel ratio with the physical values detected by the state detecting unit 10, the air/fuel ratio (A/F) detected by the air/fuel ratio sensor 80, and the stored response time (Tr) as input parameters (S405). Here, when the engine has not been judged to be in an idling state in S402, the response time for the previous control cycle is inputted into the neural network. Finally, the compensatory fuel amount calculating unit 30 calculates the compensatory fuel amount (ΔGf) for the injected fuel amount (Gf) from the air/fuel ratio (A/F$_{NN}$) (S406).

By performing the operation described above, the response time for the air/fuel ratio sensor is recorded when the engine is in an idling state, so that the air/fuel ratio estimating unit 20b can then use this response time in estimating the air/fuel ratio to maintain the accuracy of its estimating. As a result, accurate air/fuel ratio control can still be performed when there is deterioration of the air/fuel ratio sensor.

FIGS. 37A and 37B show experimental results for air/fuel ratio control apparatuses according to conventional techniques and to the present embodiment, respectively. In both cases, Ne=2000 rpm and the throttle is rapidly opened and closed to create a change in axial torque of between 5 to 10 kgm. FIG. 37A shows the results for a conventional apparatus, while FIG. 37B shows the results for the present embodiment, with a deteriorated air/fuel ratio sensor being used in both cases. As can be seen from the present drawings, the air/fuel ratio control apparatus of the present embodiment performs more precise control which keeps the air/fuel ratio at the desired value (14.7).

It should be noted here that while the air/fuel ratio estimating unit 20b has been described as using response time as an input parameter, it may instead use phase change, change in gain, or time constants. More precise control is also possible by using other values such as gain in addition to response time.

Eleventh Embodiment

The present embodiment is an air/fuel ratio control apparatus which can suitably control the injected fuel amount especially during starting, regardless of the type of fuel used to power the engine.

Figure 39:
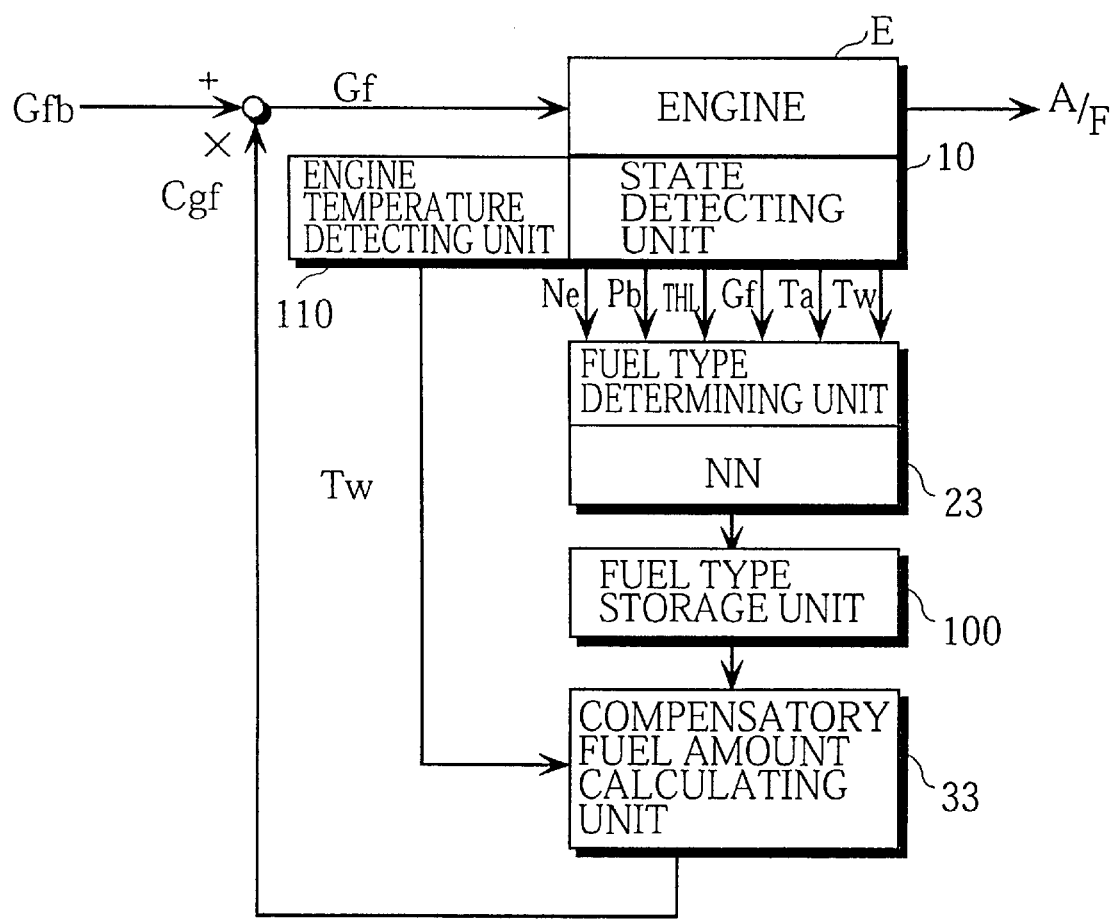
FIG. 39 is a functional block diagram showing the air/fuel ratio control apparatus of the eleventh embodiment.

FIG. 39 is a functional block diagram for the air/fuel ratio control apparatus of the present embodiment. This air/fuel ratio control apparatus is composed of a state detecting unit 10, a fuel type determining unit 23, a compensatory fuel amount calculating unit 33, a fuel type storage unit 100, and an engine temperature detecting unit 110.

The state detecting unit 10 is the same as in the first embodiment and so detects various physical values which show the state of the engine E. However, in the present embodiment, the air/fuel ratio supplementary control calculating unit 2 outputs a compensatory fuel coefficient (Cfg), with this value being multiplied by the base injected fuel amount (Gfb) calculated by the base injected fuel amount calculating unit 1.

The fuel type determining unit 23 uses a neural network to judge the fuel type, with the detected physical values as input parameters. Here, the "type" of fuel is the brand of commercially available gasoline currently being used by the engine E. To judge the fuel type, the neural network of the fuel type determining unit 23 performs the learning process described below.

Figures 40, 41:
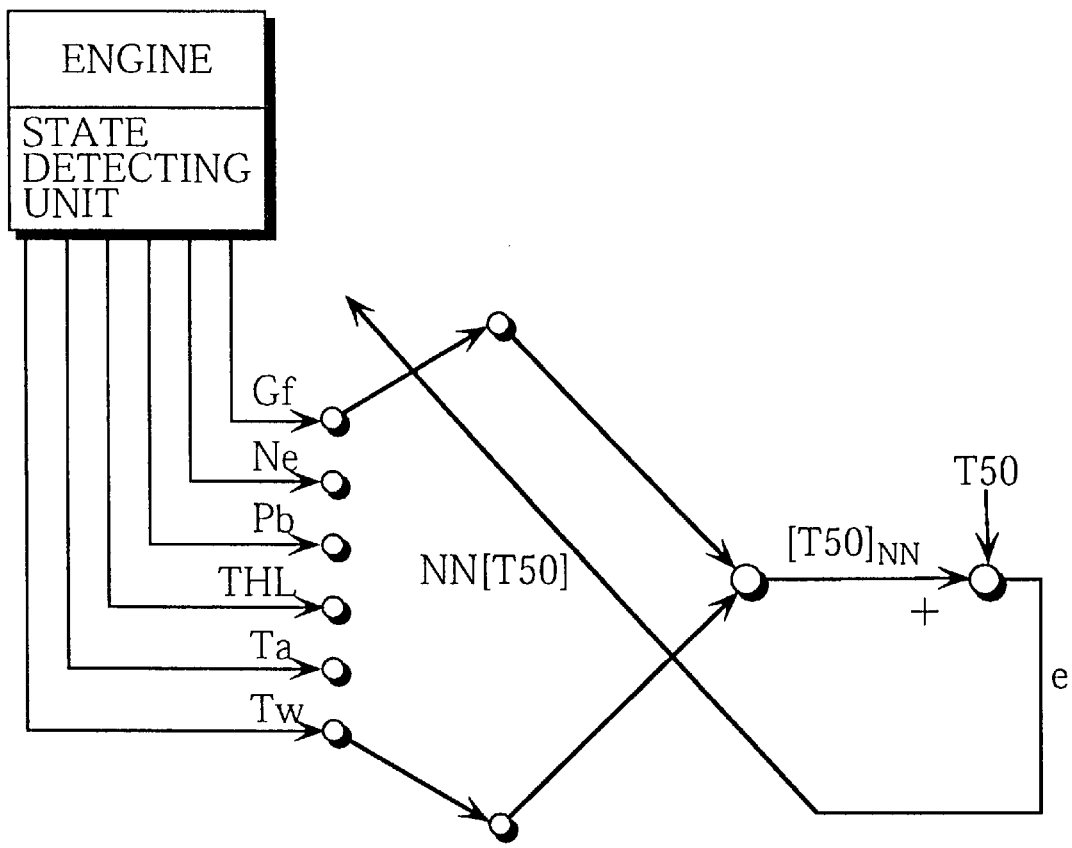
FIG. 40 shows a model example of the learning process of the neural network in the fuel type determining unit.
FIG. 41 shows the map used by the compensatory fuel amount calculating unit in the eleventh embodiment.

FIG. 40 shows the learning process for the neural network which determines the fuel type. This neural network has the physical values (Gf, Ne) detected by the state detecting unit 10 as its input parameters, and is constructed to output a parameter which expresses the properties of the gasoline. As an example of such an output value, a temperature T50 at which 50% of the gasoline evaporates can be used. This value T50 is already known for different types of fuel, so that when using a given type of fuel, the various physical values are inputted into the neural network and the value T50 is used as the teaching data. The neural network then changes its construction so as to reduce the deviation e between the value T50 which is the teaching data and the estimated T50 to a permitted range of error. This is performed for every kind of fuel for which use is intended. By doing so, a neural network which can output an estimated value T50 for any type of fuel from the physical values detected by the state detecting unit 10 can be achieved. By using such a neural network, the type of fuel can be estimated from the estimated value T50.

Figure 42:
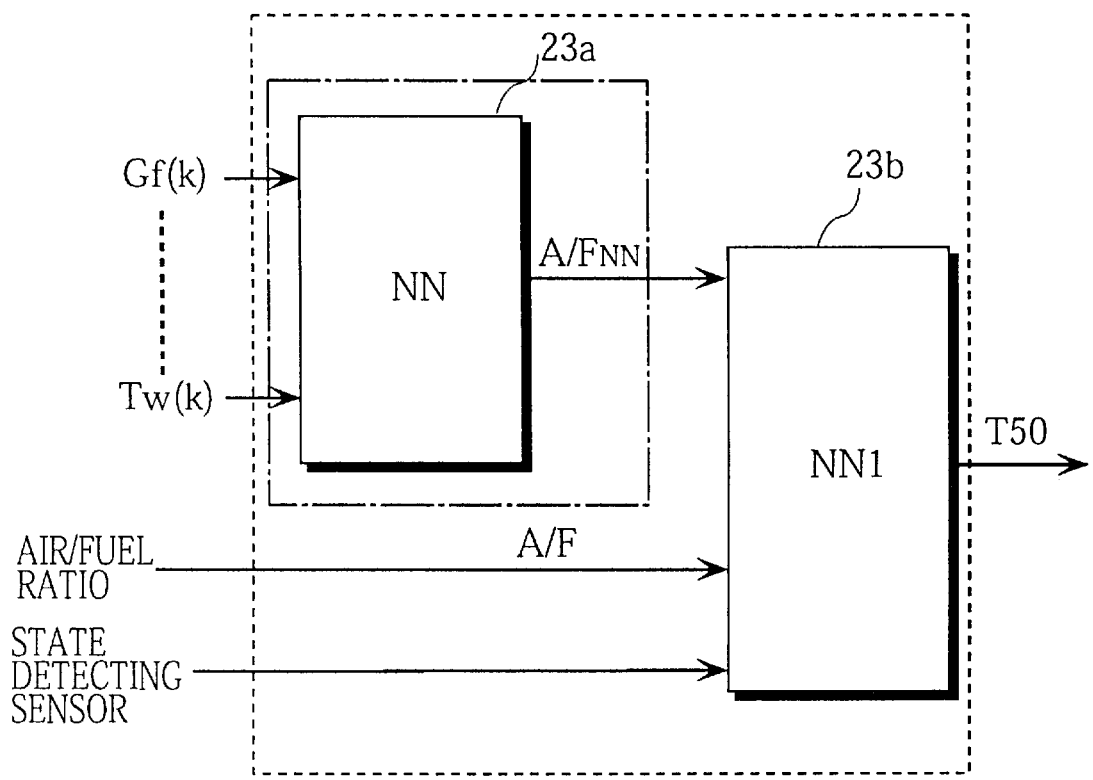
FIG. 42 shows another example construction of the air/fuel ratio control apparatus of the eleventh embodiment.

The construction for determining the fuel type is described below with reference to FIG. 42. When using a standard type of fuel, the physical values detected by the state detecting unit 10 are inputted into the fuel type determining unit 23 which boa a neural network 23a which estimates the air/fuel ratio ($A/F_{NN}$) end a determining unit 23b which determines the properties of the gasoline by comparing the air/fuel ratio ($A/F_{NN}$) estimated by the neural network 23a and the air/fuel ratio (A/F) detected by the air/fuel ratio sensor 80 and then looking at the differences in the behavior of the two values. The determination by the determining unit 23b can be made by neural calculation which outputs the value T50 with the physical values detected by the state detecting unit 10, the air/fuel ratio ($A/F_{NN}$) estimated by the neural network 23a, and the air/fuel ratio (A/F) detected by the air/fuel ratio sensor 80.

The engine temperature detecting unit 110 is a sensor which detects the temperature of the cooling water (Tw) and converts it to an electrical signal to snow the engine temperature. Here, an intake air temperature (Ta) or other temperature sensor may alternatively be used. This temperature sensor output value may also be subjected to one or more functions to allow a judgement to be made from this output value. Here, the engine temperature detecting unit 110 has been described as being provided separately to the state detecting unit 10, although it may instead share a cooling water temperature sensor with the state detecting unit 10.

The fuel type storage unit 100 stores the fuel type which has been estimated by the fuel type determining unit 23 and is updated every time an output in made by the fuel type determining unit 23 to store the newly outputted value.

The compensatory fuel amount calculating unit 33 calculates the compensatory coefficient (Cfg) an the compensatory amount for the injected fuel amount when the engine temperature detected by the engine temperature detecting unit 110 is equal to or below a predetermined first set temperature, based on this detected engine temperature and a mapping table which maps the fuel type estimated by the fuel type determining unit 23 and stored by the fuel type storage unit 100 onto a type or fuel. This first set temperature is set as the threshold temperature for the operation of the air/fuel ratio sensor, such as 50° C., so that below this temperature, the air/fuel ratio sensor will not operate. As a result, feedback control is not possible, no that the system calculates a compensatory coefficient for the injected fuel amount for low temperature control. An example of the mapping table used by the compensatory fuel amount calculating unit 33 is shown in FIG. 41, showing that compensatory coefficients (Cfg) are stored for each fuel type A to E. When the engine is stopped and then driving recommenced, the fuel type stored in the fuel type storage unit 100 is used during starting to calculate the compensatory coefficient for the injected fuel amount.

Figure 43:
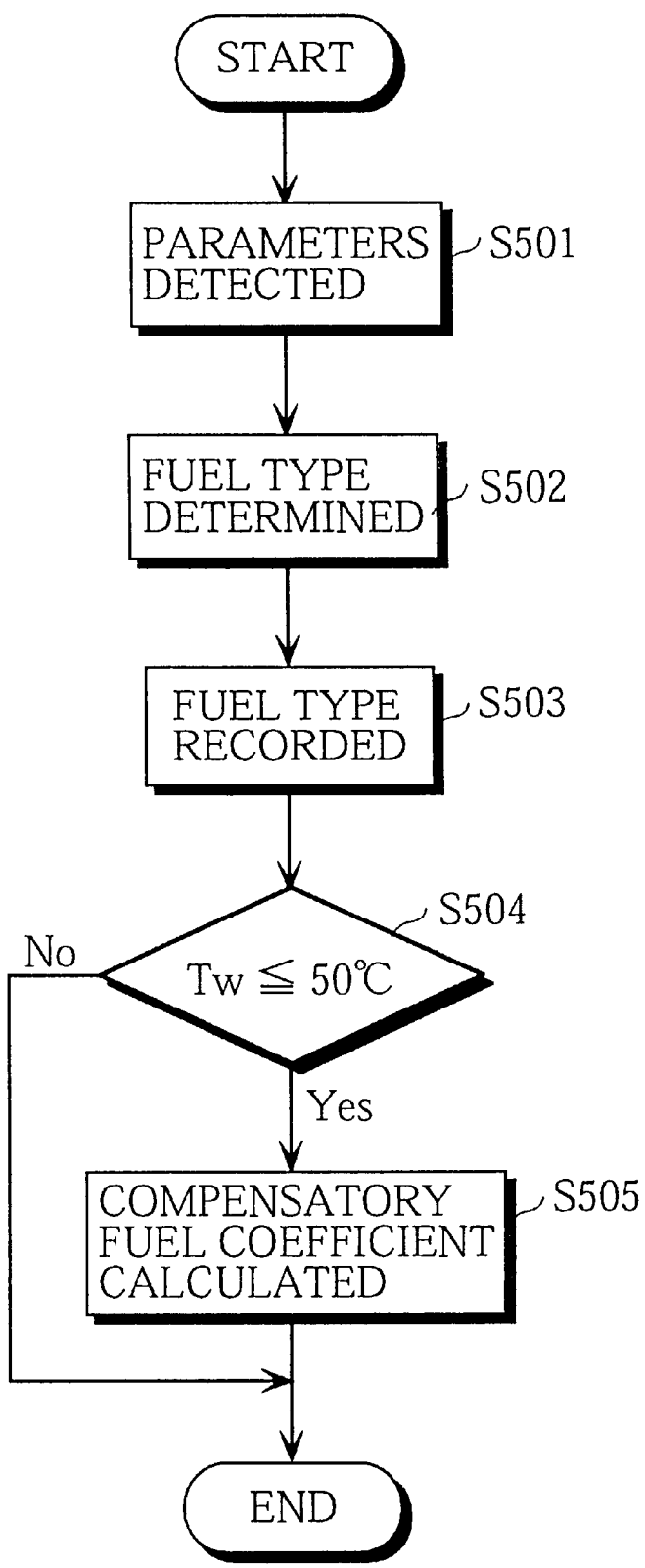
FIG. 43 is a flowchart for the operation of the air/fuel ratio control apparatus of the eleventh embodiment.

The following is an explanation of the operation of the air/fuel ratio control apparatus of the present embodiment, with reference to the flowchart in FIG. 43. Here, a gasoline of a certain type is used to fill the tank. First, when the car is started, the state detecting unit 10 and the engine temperature detecting unit 110 detects the physical values, including cooling water temperature (Tw), showing the state of the engine (S501). Next, the detected values are inputted into the neural network of the fuel type determining unit 23 which estimates the present fuel type (S502). This is then stored in the fuel type storage unit 100 (S503). The compensatory fuel amount calculating unit 33 then judges whether the cooling water temperature detected by the engine temperature detecting unit 110 is equal to or below 50° C. (S504). If so, the compensatory fuel amount calculating unit 33 calculates the compensatory coefficient (Cfg) for the injected fuel amount using the map for the estimated fuel type and this cooling water temperature (Tw) (S505). The base injected fuel amount (Gfb) is then multiplied by this compensatory coefficient (Cfg) to give the actual injected fuel amount (Gf) which is then injected into the engine E by the injector I. If the cooling water temperature exceeds 50° C. in S504, no compensatory coefficient (Cfg) for the injected fuel mount is calculated, so that the compensation of the injected fuel amount (Gf) is performed according to the control of the base injected fuel amount calculating unit 1 which includes standard feedback control.

Here, if the engine is stopped and then restarted, the control may begin with the engine temperature detecting unit 110 detecting the temperature of the cooling water (Tw), but aside from this, steps S501 to S503 are omitted, so that the compensatory fuel amount calculating unit 33 judges in S504 whether the cooling water temperature detected by the engine temperature detecting unit 110 is equal to or below 50° C. Here, when the engine is restarted, the cooling water temperature will always be below 50° C., so that the processing will advance to S505 where the compensatory fuel amount calculating unit 33 calculates the compensatory coefficient (Cfg) for the injected fuel amount using the map for the estimated fuel typo from the previous control cycle and the detected cooling water temperature (Tw). In most cases, the type of fuel in the tank can be assumed to be the same as the previous time the engine was started, so that appropriate control of the injected fuel amount can be performed during starting.

Figure 44:
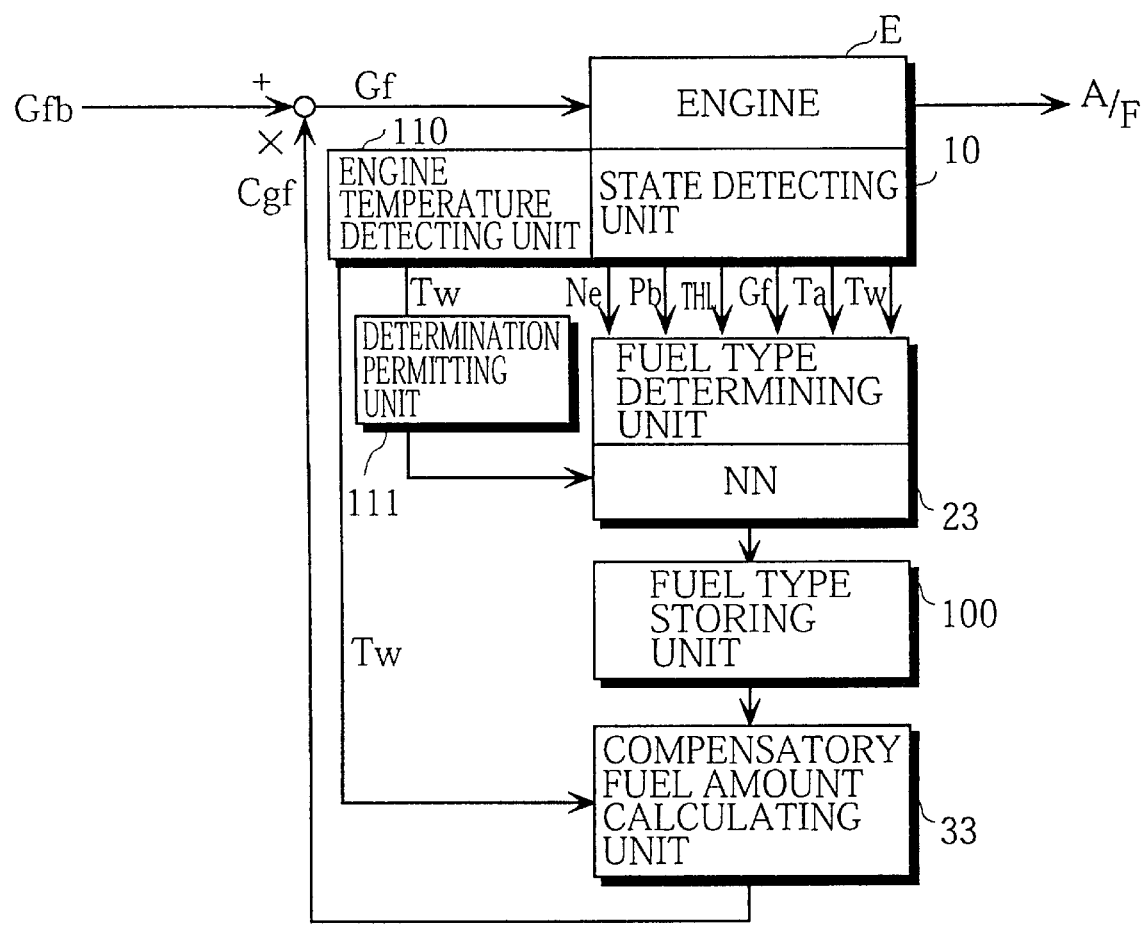
FIG. 44 is a functional block diagram showing the fuel-air ratio control apparatus of the eleventh embodiment which includes a determination permitting unit.

It should be noted here that it is also possible, as shown in FIG. 44, for the air/fuel ratio control apparatus to be provided with a determination permitting unit 111 which permits determination by the fuel type determining unit 23 only when the engine temperature detected by the engine temperature detecting unit 110 is equal to or below a predetermined second set temperature. As one example, a threshold temperature, such as 80° C., at which the properties of different types of gasoline (fuel evaporation rate or adhesion rate) can be clearly observed may be set as this predetermined second set temperature.

Figure 45:
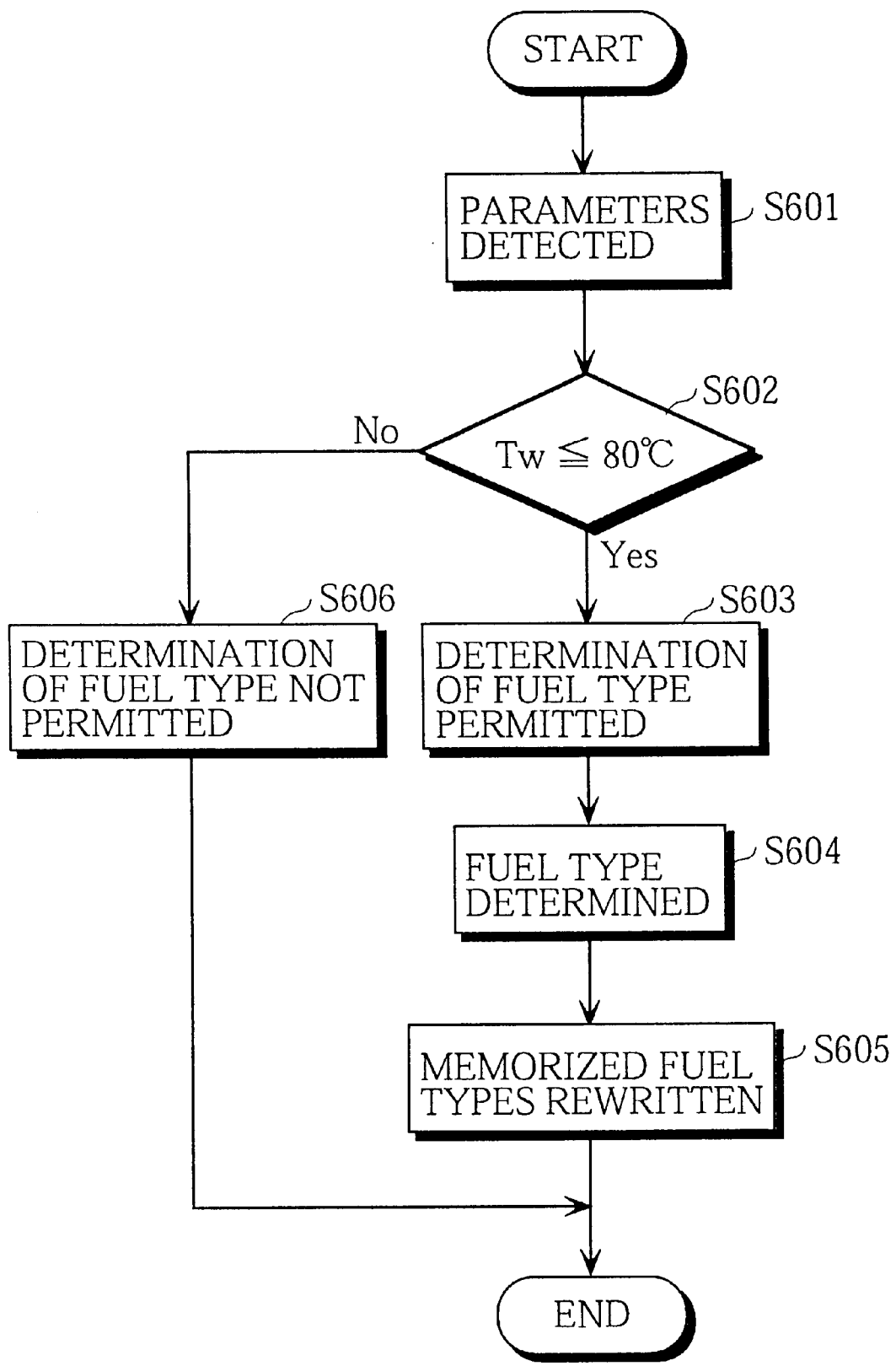
FIG. 45 is a flowchart showing the operation of the fuel-air ratio control apparatus of the eleventh embodiment which includes a determination permitting unit, as far as the storage of the fuel type.

The following is an explanation of the operation of the present air/fuel ratio control apparatus up to the storage of the estimated fuel type in the fuel type storage unit 100 when a determination permitting unit 111 is also provided. This operation is shown by the flowchart in FIG. 45. First, when the car is started, the state detecting unit 10 and the engine temperature detecting unit 110 detects the physical value, including cooling water temperature (Tw), showing the state of the engine (S601). Next, the determination permitting unit 111 judges whether the detected cooling water temperature (Tw) is equal to or below 80° C. (S602). If so, the determination permitting unit 111 permits the fuel type determining unit 23 to determine the fuel type (S603). As described above, the detected values are then inputted into the neural network of the fuel type determining unit 23 which estimates the present fuel type (S604) which is then stored in the fuel type storage unit 100 (S605). On the other hand, when the determination permitting unit 111 judges that the detected cooling water temperature (Tw) is above 80° C. (S602), it does not permit the fuel type determining unit 23 to determine the fuel type (S606), so that no determination of fuel type is made.

With the above operation, the neural network will only perform determination of fuel type for a temperature range where the properties of the fuel can be detected, thereby improving the accuracy of the determination. By also limiting the range or determination (such as to the temperature range of 50° C. to 80° C. described here), the learning process of the neural network can be performed using reduced teaching data, thereby reducing the required development tine.

Figure 46:
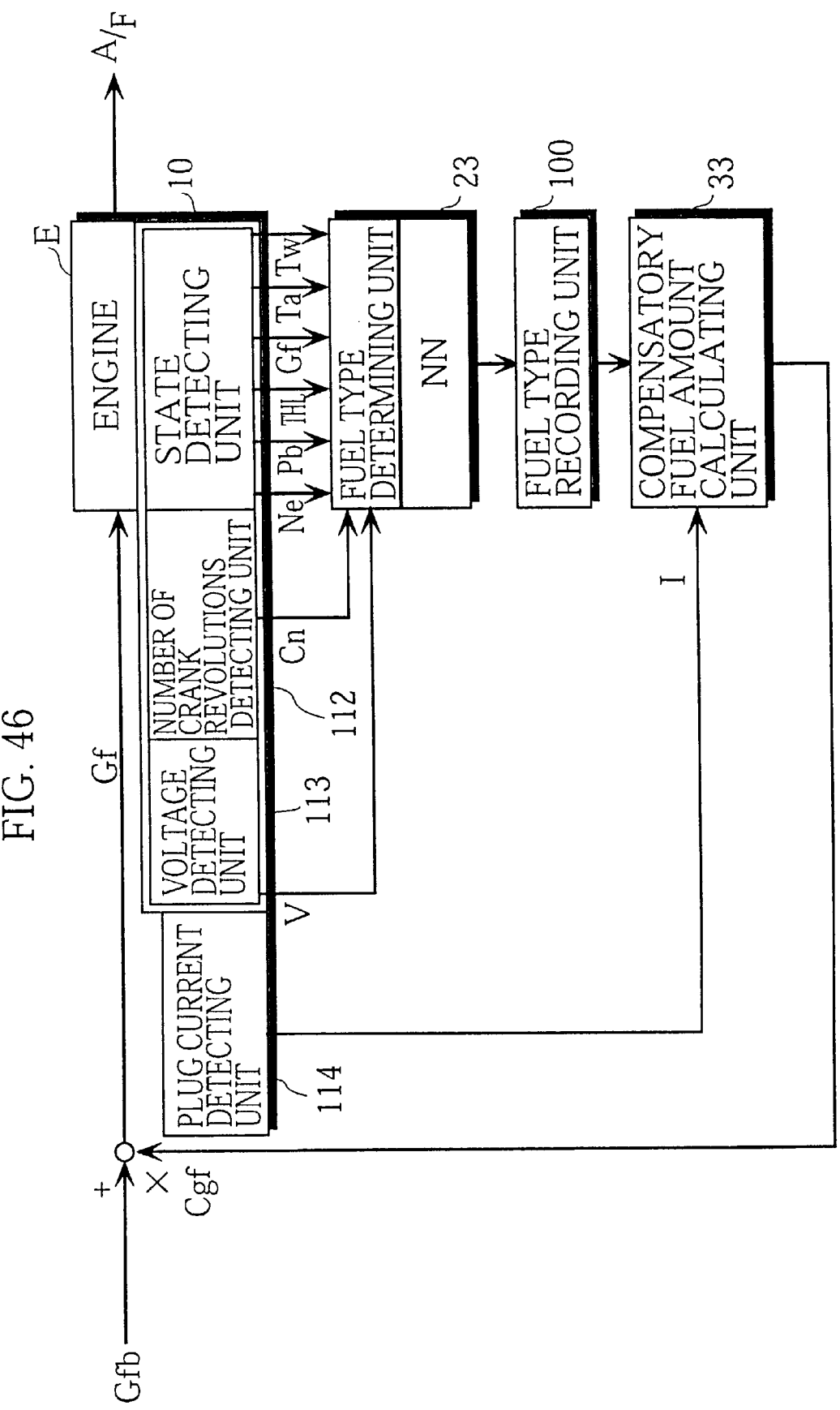
FIG. 46 is a functional block diagram showing the fuel-air ratio control apparatus of the eleventh embodiment which includes a crank RPM detecting unit.

It should be noted here that it is desirable to have a number of crank revolutions from the application of the voltage to the spark plug to the complete ignition of the air/fuel mixture and the battery voltage as the parameters for estimating the fuel type in the present air/fuel ratio control apparatus. This is to say, this number of crank revolutions is a physical value which clearly varies with the type of gasoline used, with battery voltage also having a direct effect on the number of crank revolutions, so that the accuracy of fuel type determination will most probably be improved by using these parameters. FIG. 46 is a functional block diagram or an air/fuel ratio control apparatus which has the above type of construction. In comparison with the air/fuel ratio control apparatus shown in FIG. 39, the present air/fuel ratio control apparatus has a state detecting unit 10 which includes a crank revolution number detecting unit 112 and a voltage detecting unit 113, and a plug current detecting unit 114 in place of the engine temperature detecting unit 110.

The crank revolution number detecting unit 112 detects the number of crank revolutions from the application of the voltage to the spark plug to the complete ignition of the air/fuel mixture as a physical value showing the state of the engine. The voltage detecting unit 113 detects the voltage of the battery as a physical value showing the state of the engine. The plug current detecting unit 114 detects that the current supplied to the spark plug is ON from the change in position of the ignition key when the engine is started.

The operation of the above air/fuel ratio control apparatus is mainly the same as that of the air/fuel ratio control apparatus shown in FIG. 39, except that the fuel type is only estimated using the number of crank revolutions and battery voltage when the plug current detecting unit 114 detects from the application of the current to the spark plug that engine is being started, so that the injected fuel amount can be appropriately compensated and control performed during starting in accordance with the fuel type, thereby avoiding ignition failures.

It should be noted here that the fuel type storage unit 100 in the present air/fuel ratio control apparatus is constructed not to update the determination result when the number of crank revolutions detected during starting by the crank revolution number detecting unit 112 is below a set value. This is to say, the air/fuel ratio control apparatus is constructed so as to only reflect the detection result when a number of crank revolutions which exceeds the set value is necessary during starting, so that when the number of crank revolutions is within the set value, the starting injected fuel amount will be calculated using a present value. This is because when the injected fuel amount is adjusted in accordance with fuel which reduces the number of crank revolutions during starting, which is to say highly volatile fuel, and the driver then places a different type or gasoline which is less volatile into the tank, there will be a high probability that ignition failures will occur. Here, when an ignition failure occurs, far worse exhaust pollution is caused than when the air/fuel ratio gradually deviates from the desired value, so that avoidance of ignition failures is given preference.

In the above explanation the fuel type determining unit 23 is described as using a neural network to determine the fuel type, although, as described below, it may use a neural network to estimate the cylinder intake air amount $Qa_{NN}$, and then use this to calculate the fuel adhesion rate (a) and the fuel evaporation rate (b), before looking up the calculated values (a) and (b) in a table to give the corresponding fuel type. Here, the fuel adhesion rate (a) and the fuel evaporation rate (b) may be calculated according to the following method.

Figure 47:
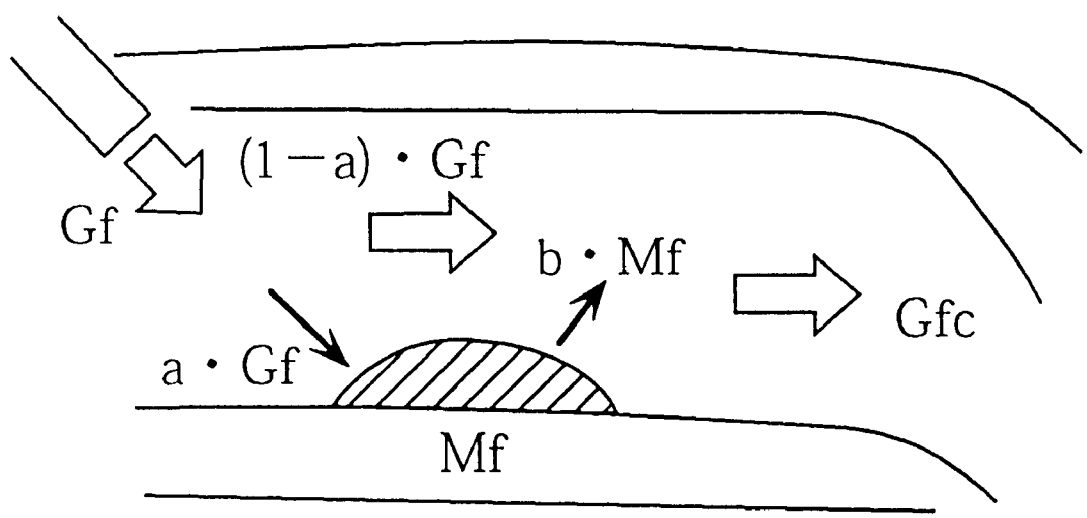
FIG. 47 shows an example of the adhesive behavior model for the injected fuel.

When fuel is injected by the injector as described above, not all of the fuel flows into the cylinders, with a part of the fuel sticking to the inner wall of the intake pipe, and part of this fuel coating also evaporating to flow Into the cylinders. Here, the amount of fuel which will adhere to the intake pipe is dependent on a variety of factors such as the driving state (such as engine RPM) and load (such as intake air pressure) of the angina and external factors (such as intake air temperature, cooling water temperature, and atmospheric pressure). Here, the amount of fuel coating which evaporates is also dependent on a variety of such factors as engine condition and external environment. Here, the fuel adhesion rate (a) and the fuel evaporation rate (b) are calculated. A simplified model for the behavior of the fuel coating is shown in FIG. 47. In FIG. 47, the sampling time is set as k, and of the injected fuel amount (Gf), that fuel amount which sticks to the intake pipe, intake pipe wall adhesion fuel amount (Mf), is given as a*Gf, with the remainder of the fuel (1−a)*Gf flowing into the cylinders. The amount of fuel coating which evaporates and flows into the cylinders is given as b*Mf. As a result, the cylinder Intake fuel amount (Gfc) is given as the sum of (1−a)*Gf and b*Mf.

Here, at a sampling time k, the intake pipe wall adhesion fuel amount is net as Mf(k), the injected fuel amount is set as Gf(k), and the cylinder intake fuel amount is set as Gfc(k), the relations given below are valid.

$$Mf(k+1) - Mf(k) = aGf(k) - bMf(k)$$

$$Gfc(k+1) = (1-a)Gf(k) + bmf(k)$$

The following equation is then given by rearranging these.

$$Gfc(z) = \frac{(1-a)z - (1-a) + b}{z - 1 + b} \quad [4]$$

where z: extension showing progression of time z−1; extension showing time delay The relation between the air/fuel ratio (A/F), the cylinder intake air amount Qa, and the cylinder intake fuel amount Gfc is then given by the following equation, when the detection delay for A/F is assumed to be one control cycle.

$$z * A/F = \frac{Qa(z)}{Gfc(z)} \quad [5]$$

These two equations [4] and [5] can be combined to the following equation $$z * A/F(z) = \frac{z - 1 + b}{(1-a)z - (1-a) + b} + \frac{Qa(z)}{Gfc(z)}$$

Here, if (A/F)*Gf=W, then $$(1-a)\{W(k)-W(k-1)\}+bW(k-1)=Qa(k-1)-(1-b)Qa(k-2)$$

This equation calculates N from the injected fuel amount (Gf) detected by the state detecting unit 50 and the air/fuel ratio, and by substituting the cylinder intake air amount $Qa_{NN}$ estimated by the intake air amount estimating unit 22 and performing sampling four or more times, two or more equations are given. These equations are then used to calculate the fuel adhesion rate (a) and the fuel evaporation rate (b).

When the fuel adhesion rate (a) and the fuel evaporation rate (b) are obtained as described above, the construction of the air/fuel ratio control apparatus including the fuel type determining unit 24 is shown in FIG. 48. This fuel type determining unit 24 is composed of an air intake amount estimating unit 24a, a fuel intake amount estimating unit 24b, and a type determining unit 24c. This air intake amount estimating unit 24a is the same as the air intake amount estimating unit 22 shown in Pig, 21. The fuel intake amount estimating unit 24b uses the above equations to calculate the fuel adhesion rate (a) and the fuel evaporation rate (b) from the injected fuel amount (Gf) detected by the state detecting unit 10, the air/fuel ratio (A/F), and the cylinder air intake amount ($Qa_{NN}$) estimated by the air intake amount estimating unit 24a.

As shown in FIGS. 49A and 49B, the type determining unit 24c uses tables which show the relationship between the fuel adhesion rate (a) and the fuel evaporation rate (b) and the fuel type to determine the fuel type from the fuel adhesion rate (a) and the fuel evaporation rate (b) estimated by the fuel intake amount estimating unit 24b. The tables shown in FIGS. 49A and 49B are such that one of the tables in FIG. 49A is selected for use by looking up the cooling water temperature (Tw) in the table shown in FIG. 49A. As one example, if the cooling water temperature (Tw) is 5° C., table ② is selected. The present fuel type is then read from the selected table based on the fuel adhesion rate (a) and the fuel evaporation rate (b).

It should be noted here that while the above description states that the fuel type is determined from the fuel adhesion rate (a) and the fuel evaporation rate (b), it is also possible for the fuel type to be determined from only one of the fuel adhesion rate (a) and the fuel evaporation rate (b). In such a case, the fuel intake amount estimating unit 24b only needs to calculate one of the fuel adhesion rate (a) and the fuel evaporation rate (b). Here, the neural network which has the fuel adhesion rate (a) and the fuel evaporation rate (b) obtained by the above equations as teaching data may directly estimate (a) and (b), before calculating a compensatory coefficient from for the injected fuel amount from these values (a) and (b).

In order to improve the accuracy of fuel type determination, it is also possible for the fuel type determining unit 24 to be further provided with a storage unit for progressively storing the fuel adhesion rate (a) and the fuel evaporation rate (b) calculated by the fuel intake amount estimating unit 24b, so that the type determining unit 24c can determine the fuel type using the plurality of fuel adhesion rates (a) and fuel evaporation rates (b) which are progressively stored in the storage unit.

It is also possible for an air/fuel ratio control apparatus which includes a fuel type determining unit 24 to also be equipped with a determination permitting unit 111, such as that shown in FIG. 44. When doing so, since the air/fuel sensor cannot operate below a certain temperature, the determination by the fuel type determining unit 23, which requires the output of the air/fuel sensor, can be prevented when the engine temperature is below a first set temperature. As a result, the compensatory fuel amount calculating amount 100 will use the fuel type calculated in the previous control cycle to calculate the compensatory coefficient (Cfg) for the injected fuel amount.

Twelfth Embodiment

Figure 50:
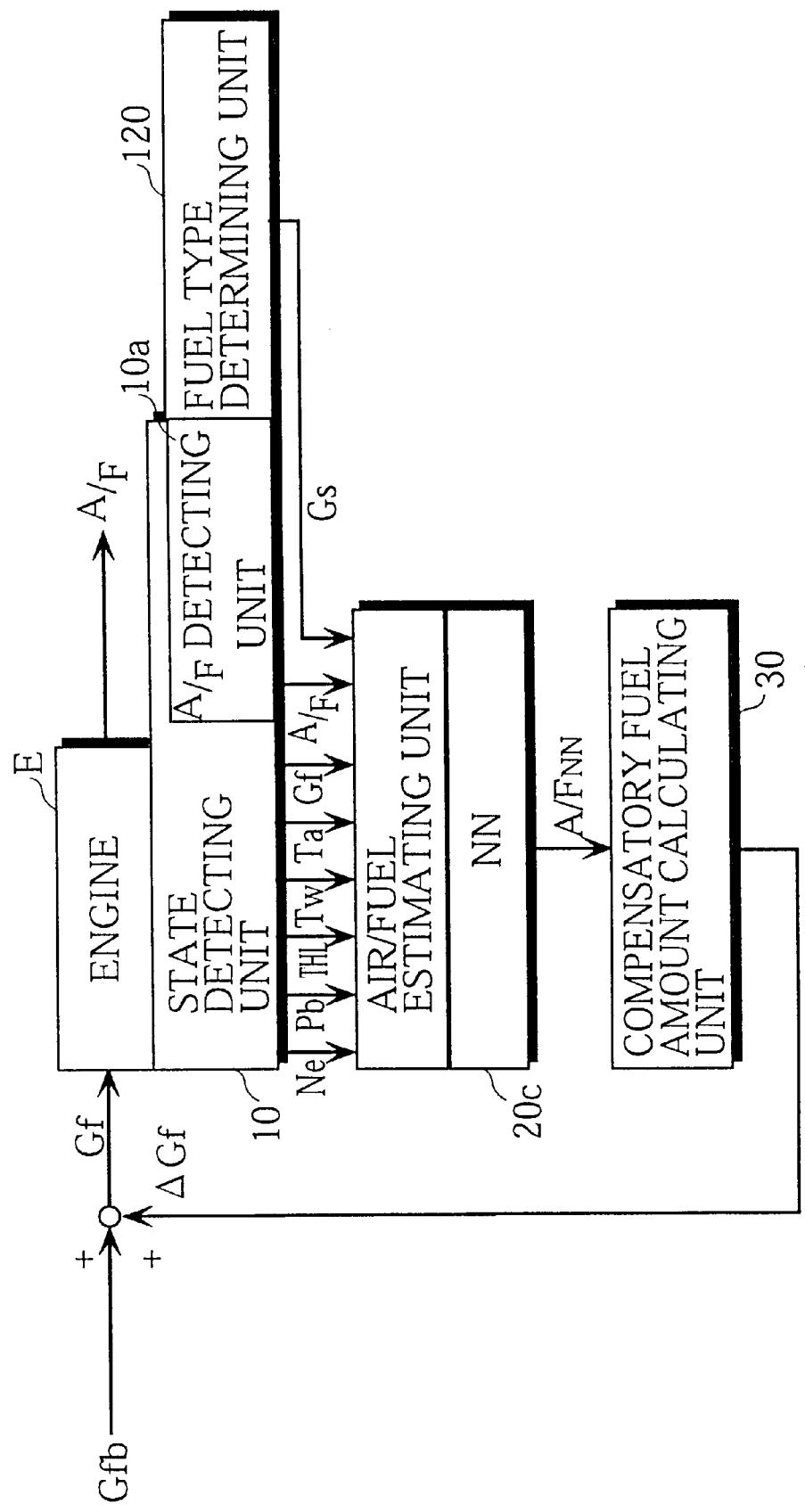
FIG. 50 is a functional block diagram for the air/fuel ratio control apparatus of the twelfth embodiment.

While the eleventh embodiment teaches an air/fuel ratio control apparatus which controls the injected fuel amount during starting in accordance with the fuel type, the air/fuel ratio control apparatus of the present embodiment controls the injected fuel amount in accordance with the fuel type, regardless of whether the engine La being started. FIG. 50 is a functional block diagram showing the air/fuel ratio control apparatus of the present embodiment. As shown in the figure, this air/fuel ratio control apparatus is composed of a state detecting unit 10, an air/fuel ratio estimating unit 20c, a compensatory fuel amount calculating unit 30, and a fuel type determining unit 120. In comparison with the air/fuel ratio control apparatus of the first embodiment, this air/fuel ratio control apparatus is equipped with a fuel type determining unit 120, with a state detecting unit 10 which also detects air/fuel ratio, and with an air/fuel ratio estimating unit 20c which has the output of the fuel type determining unit 120 and the air/fuel ratio (A/F) as input parameters.

The fuel type determining unit 120 determines the type of fuel used by the engine E. This determination of fuel type is performed by estimating according to neural calculation in the same way as the fuel type determining unit 23 in the air/fuel ratio control apparatus shown in FIG. 39, or directly, by subjecting the fuel to ultrasonic waves and measuring the density of the fuel from the transmission speed of the waves. The fuel type determining unit 120 outputs a value (Gs) in accordance with the detected fuel type. More specifically, the fuel type determining unit 120 classifies the gasoline into one of three groups based on volatility, with the largest value of Gs representing the moat volatile group.

Figure 51:
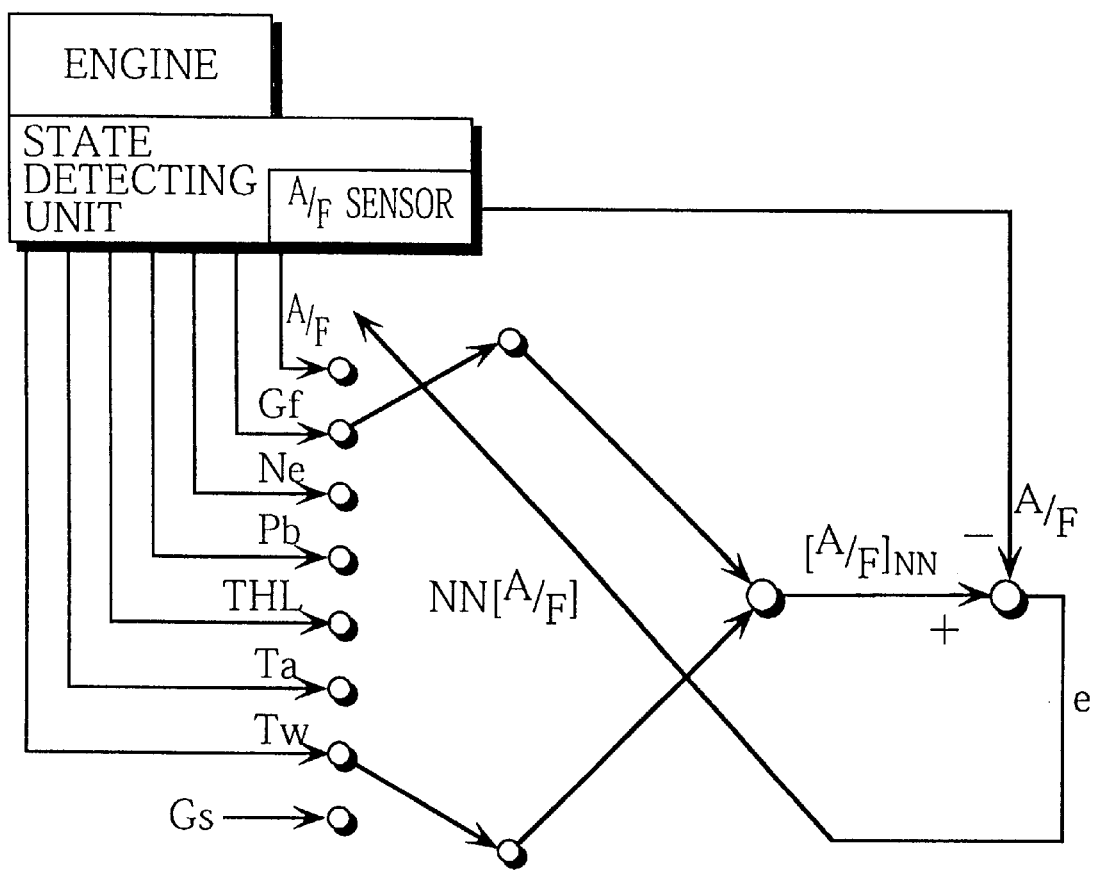
FIG. 51 is a model example or the learning process or the neural network of the air/fuel ratio estimating unit.

The air/fuel ratio estimating unit 20c uses a neural network to estimate the air/fuel ratio, with the physical values (Ne, Pb, A/F ...) detected by the state detecting unit 10 and the fuel type detected by the fuel type determining unit 120 as its input parameters. The learning process of this neural network is shown in FIG. 51. As shown in the figure, the neural network uses the physical values (Ne, Pb, A/F ...) detected by the state detecting unit 10 and the fuel type which is actually detected as its input parameters, with the air/fuel ratio (A/F) detected by an air/fuel ratio sensor as its teaching signal, so that it can change its construction so as to minimize the deviation between the estimated value and the teaching data according to a back propagation method. It should be noted here that T50 or other value may alternatively be used as the value which represents fuel type. By performing the stated process, a neural network can be achieved which estimates air/fuel ratio taking fuel type into account.

The following is a brief description of the operation of the present air/fuel ratio control apparatus. First, the state detecting unit 10 detects the physical values showing the state of the engine, such as engine RPM (Ne), intake air pressure (Pb), and air/fuel ratio (A/F) in the previous control cycle. At the same time, the fuel type determining unit 120 detects the fuel type and outputs the value Gs. The air/fuel ratio estimating unit 20c then uses a neural network to estimate the air/fuel ratio (A/F), with the physical values (Ne; Pb, A/F ...) detected by the state detecting unit 10 and the fuel type detected by the fuel type determining unit 120 as its input parameters. The compensatory fuel amount calculating unit 30 then uses this estimated air/fuel ratio (A/F) to calculate the compensatory amount (ΔGf) for the injected fuel amount. This compensatory amount (ΔGf) is then added to the base injected fuel amount (Gfb) calculated by the base injected fuel amount calculating unit 1 to give the actual injected fuel amount (Gf) which is injected into the engine E by the injector I. As a result, air/fuel ratio control can be performed in accordance with the fuel type currently in use.

Thirteenth Embodiment

Figure 52A:
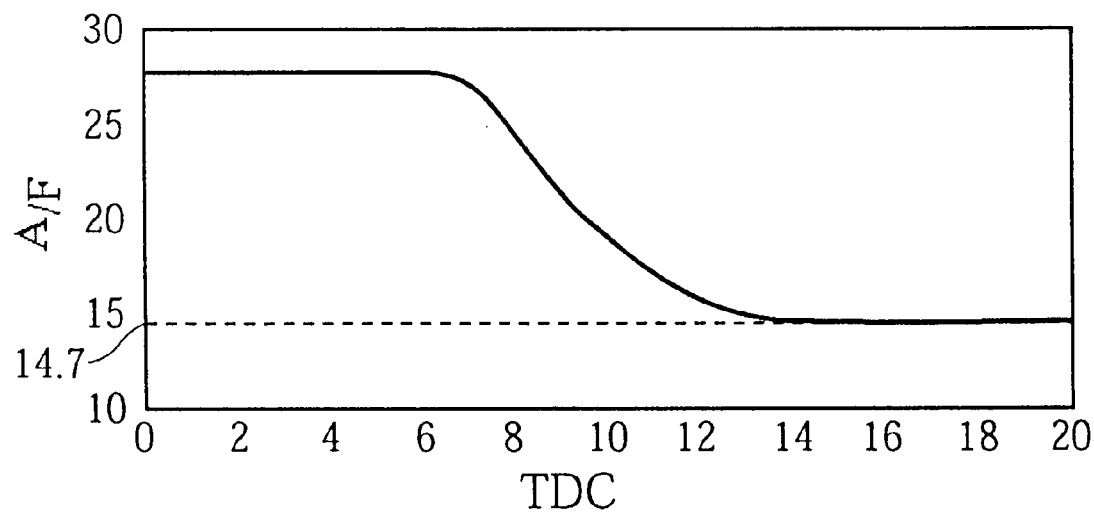
FIG. 52A shows the changes in the air/fuel ratio when there are no ignition failures.
Figure 52B:
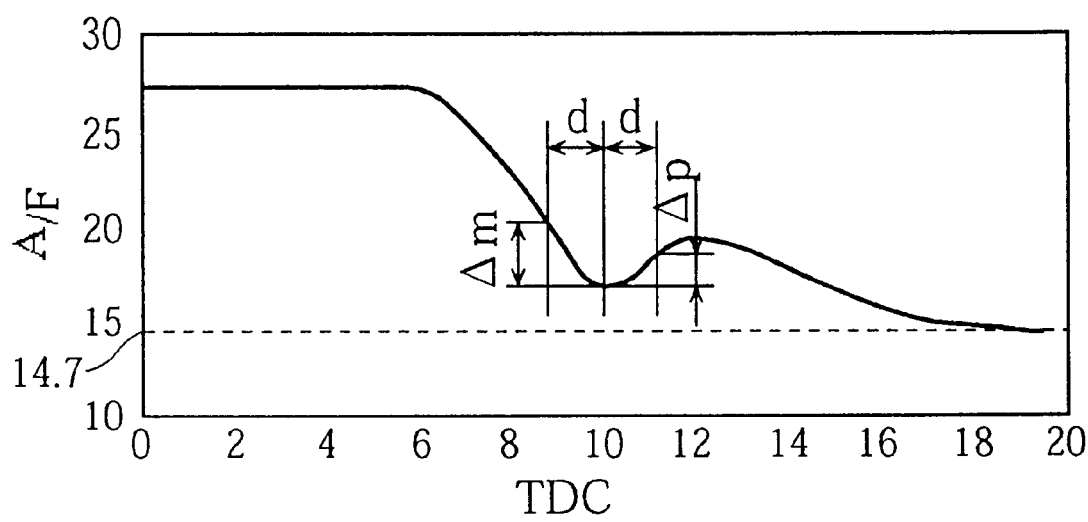
FIG. 52B shows the changes in the air/fuel ratio when there are ignition failures.

When the injected fuel amount is compensated by a compensatory amount by control of the air/fuel ratio, there can be cases when too much fuel is injected, causing ignition failures. When this occurs, the output of an air/fuel ratio sensor will register that the air/fuel ratio is too lean, so that control will be executed to inject yet more fuel into the engine E. As one example, when the engine is being started, if the air/fuel ratio sensor does not register an ignition failure, the air/fuel ratio will steadily approach the desired value, as shown in FIG. 52A. However, should an ignition failure occur, the output of the air/fuel ratio sensor will fluctuate and will resemble that shown in FIG. 52B. Here, it is possible to conceive an improvement for a control system which experiences fluctuations in its parameters in this way so as to improve the speed with which convergence to the desired value is obtained.

Figure 53:
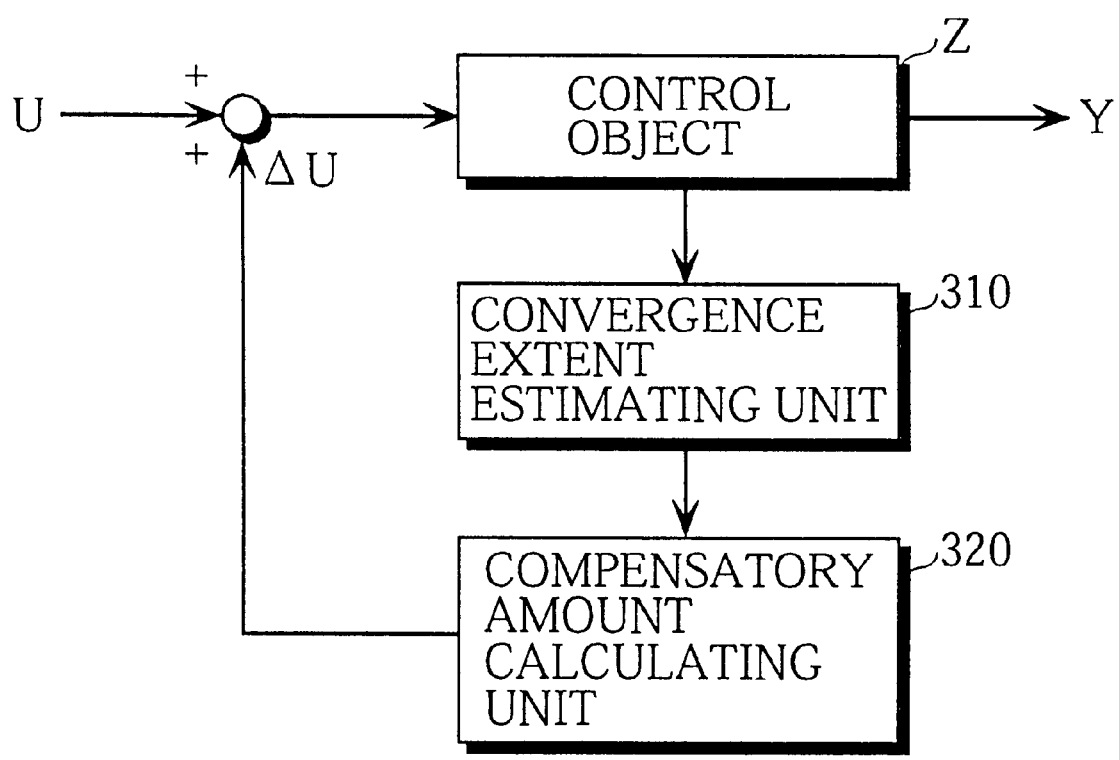
FIG. 53 is a block diagram showing the vibration compensation control apparatus or the thirteenth embodiment.

A standard construction for a fluctuation compensation control apparatus for achieving rapid convergence for a fluctuation caused by a fluctuation in an input parameter is shown in FIG. 53. Here, the extent of convergence for the control object of the fluctuation compensation control apparatus is estimated by the convergence extent estimating unit 310 which uses a neural network with parameters relating to the control object Z, with a compensatory amount for the input parameter to achieve the rapid convergence of the control object then being calculated by the compensatory amount calculating unit 320 using this estimated extent of convergence.

Figure 54:
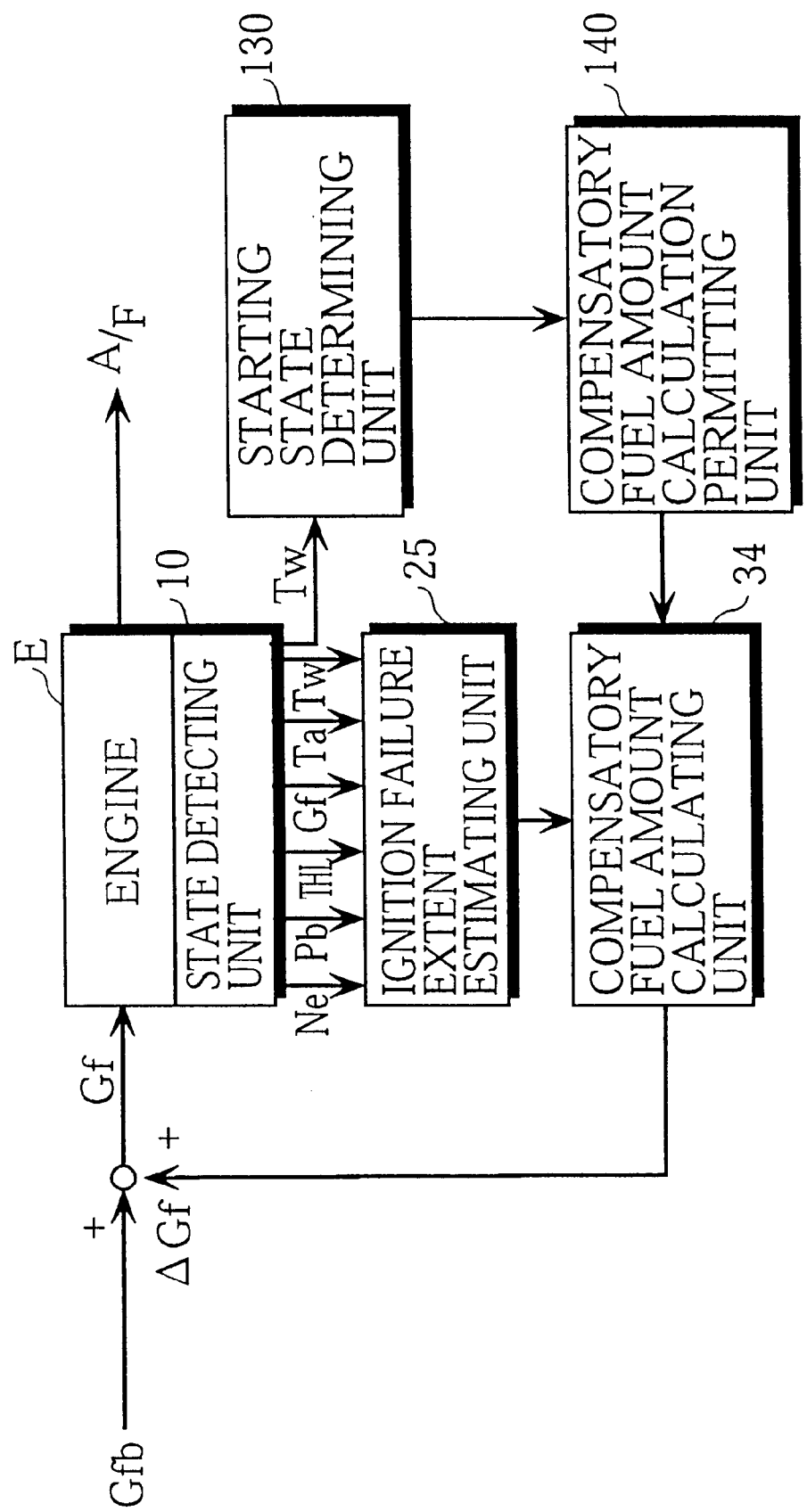
FIG. 54 is a block diagram showing the air/fuel ratio control apparatus of the thirteenth embodiment.

As a specific example, an air/fuel ratio control apparatus can be used. The construction of this air/fuel ratio control apparatus is shown in FIG. 54. The present air/fuel ratio control apparatus is composed of a state detecting unit 10, an ignition failure extent estimating unit 25, a compensatory fuel amount calculating unit 34, a starting state determining unit 130, and a compensatory fuel amount calculation permitting unit 140. Here, the ignition failure extent estimating unit 25 and the compensatory fuel amount calculating unit 34 respectively correspond to the convergence extent estimating unit 310 and the compensatory amount calculating unit 320 described above.

The state detecting unit 10 detects the input parameters of the control object which are related to the control object, and so detects a plurality of parameters which show the state of the engine E, in the same way as in the first embodiment.

The ignition failure extent estimating unit 25 uses a neural network to estimate the ignition failure extent of the engine E, with the plurality of physical values detected by the state detecting unit 10 as input parameters. Note that in the present example, the convergence extent relates to the output of an air/fuel ratio sensor provided in the exhaust gathering unit or directly after the exhaust valves of the engine E.

The ignition failure extent (R) can be measured according to several methods. As one example, in FIG. 52B, the point at which the rate of change of the air/fuel ratio sensor output changes from negative to positive may be set as the boundary, with an absolute value of the total of the negative change Amount Δm and the positive change amount Δp during a predetermined period d being set as this ignition failure extent (R). Here, it is also possible for the gradient of the tangent of during the sampling time of the part when the rate of change is positive to be Bet as the ignition failure extent (R).

Figure 55:
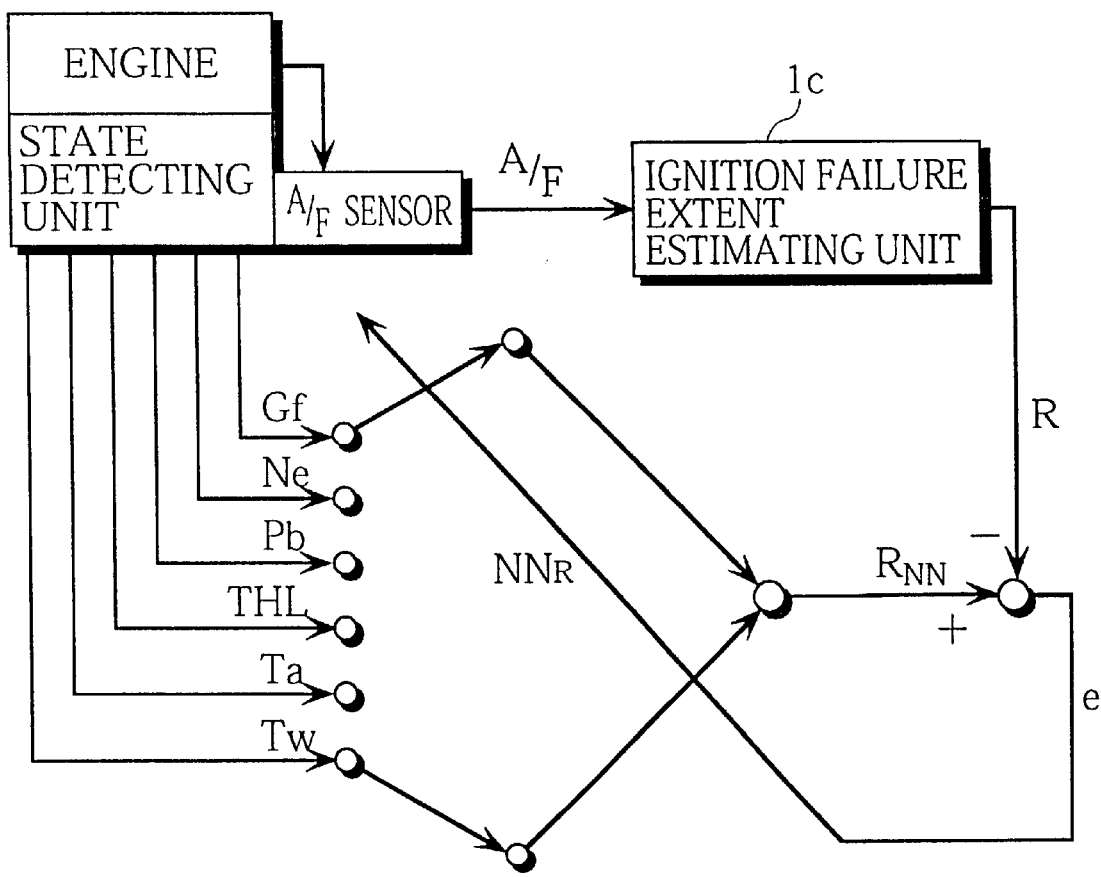
FIG. 55 shows a model example of the learning process of the neural network in the ignition failure extent estimating unit.

The learning process of the neural network which estimates this ignition failure extent (R) is shown in FIG. 55. This learning process is largely the same as that shown in FIG. 6 for the first embodiment, with the difference being that the ignition failure extent calculating unit 1c converts the output of the air/fuel ratio sensor into an ignition failure extent (R) which it outputs as teaching data. This ignition failure extent calculating unit 1c outputs "0" as the ignition failure extent when the output of the air/fuel ratio sensor is decreasing uniformly, and, when this output of the air/fuel ratio sensor increases, calculates the increase rate ΔA/F in the output of the air/fuel ratio sensor which it then outputs as the ignition failure extent. Here, ΔA/F is found by differentiating A/F. It should be noted here that when the point at which the rate of change of the air/fuel ratio sensor output changes from negative to positive is set as the boundary and an absolute value of the total of the negative change amount Δm and the positive change amount Δp during a predetermined period d is used as this ignition failure extent (R), the total of Δm and Δp is calculated in place of ΔA/F and is outputted as the ignition failure extent for the rate change part which is positive.

When the neural network is performs the learning process shown in FIG. 55, the engine is operated from a stationary state to a normal operational state and the ignition failure extent (R) is calculated by the ignition failure extent calculating unit 1c having obtained the learning data during starting. Here, the plurality of parameters are inputted into the neural network and are used to estimate the ignition failure extent ($R_{NN}$), before the deviation e between this value ($R_{NN}$) and the ignition failure extent (R) is found. The neural network then proceeds to change its construction according to a back propagation method to minimize the value of this deviation e.

The compensatory fuel amount calculating unit 34 calculates the compensatory amount (ΔGf) for the injected fuel amount from the ignition failure extent ($R_{NN}$) estimated by the ignition failure extent estimating unit 25 with the gradient of a tangent at the sampling time being set as the ignition failure extent (R), and the compensatory amount (ΔGf) for the injected fuel amount being calculated according to the following equation.

$$-GF = -K5 * R$$

where K5 is a constant whose value is set according to the results of experimentation.

When the point at which the rate of change of the air/fuel ratio sensor output changes from negative to positive is set as the boundary and an absolute value of the total of the negative change amount Δm and the positive change amount Δp during a predetermined period d is used as this ignition failure extent (R), the compensatory amount (ΔGf) for the injected fuel amount can be found according to the following equation $$(\Delta Gf) - = -K6 * (|\Delta m| + |\Delta d|)$$

where K6 is also a constant whose value is set according to the results of experimentation.

The starting state determining unit 130 refers to at least one of the parameters detected by the state detecting unit 10 to determine whether the engine E is being started, with the cooling water temperature (Tw) being used in the present example as this parameter. As a result, when the cooling water temperature (Tw) is equal to or below a predetermined temperature, such as 50° C., the ignition failure extent estimating unit 25 judges that the engine E is being started.

Figure 56:
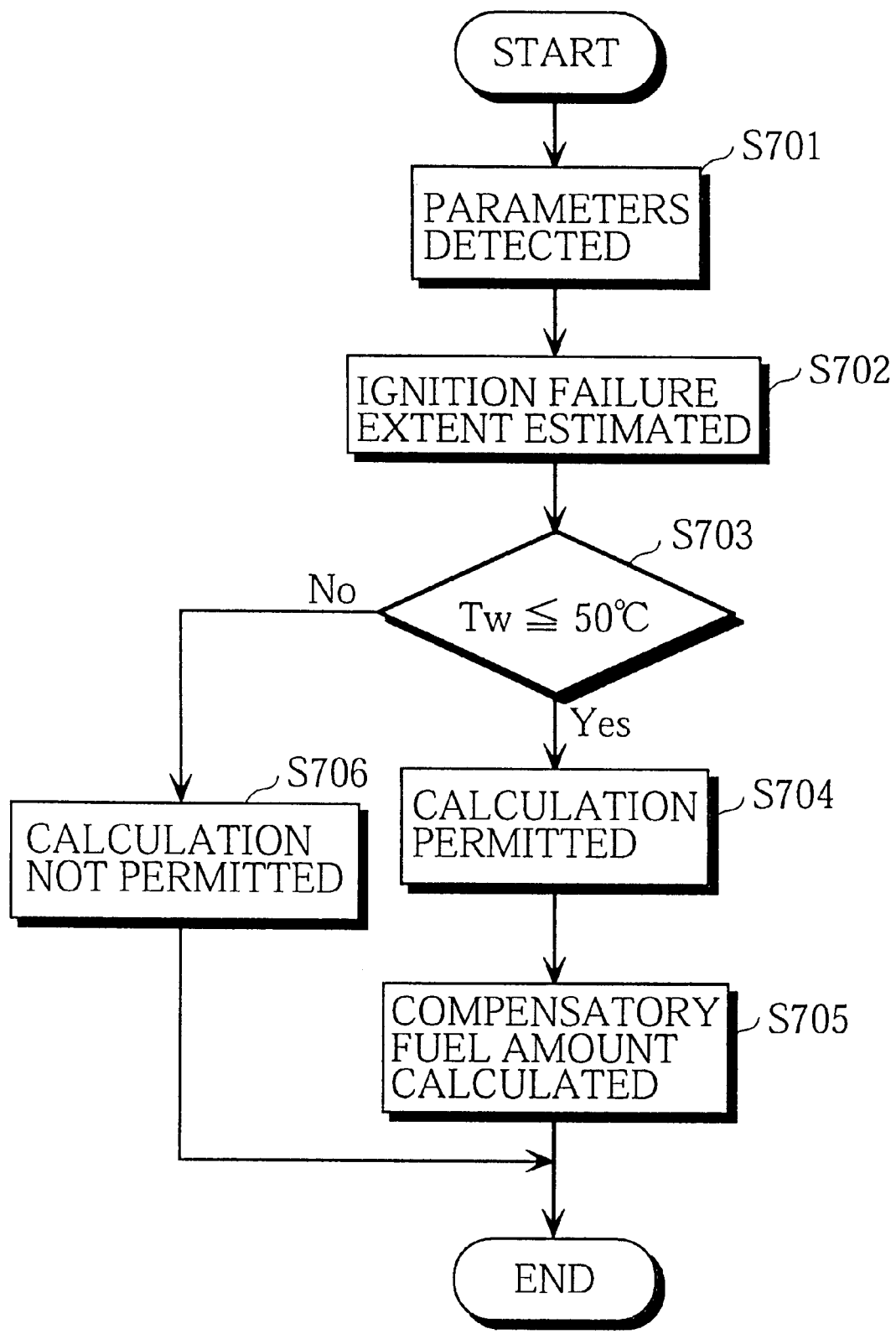
FIG. 56 is a flowchart showing the operation of the air/fuel ratio control apparatus of the thirteenth embodiment.

The following is an explanation of the operation of the air/fuel ratio control apparatus of the construction described above. FIG. 56 is a flowchart showing the operation of this air/fuel ratio control apparatus in one control cycle. First, when the engine is being driven, the state detecting unit 10 detects the physical values which show the state of the engine (S701). The ignition failure extent estimating unit 25 then uses the neural network to estimate the ignition failure extent with the plurality of detected physical values as input parameters (S702). Meanwhile, the starting state determining unit 130 determines whether the engine E is in a starting state using at least one of the physical values detected by the state detecting unit 10 as input parameters. In the present example, the starting state determining unit 130 determines that the engine is in a starting state by judging whether the cooling water temperature is equal to or below 50° C. (S703).

Here, if the cooling water temperature in equal to or below 50° C., the starting state determining unit 130 outputs a signal indicating such to the compensatory fuel amount calculation permitting unit 140, and on receiving this signal, the compensatory fuel amount calculation permitting unit 140 allows the compensatory fuel amount calculating unit 34 to perform its calculation (S704). On being permitted to perform its calculation, the compensatory fuel amount calculating unit 34 calculates the compensatory amount ($\Delta Gf$) for the injected fuel amount using the ignition failure extent estimated by the ignition failure extent estimating unit 25 (S705). This calculated compensatory amount ($\Delta Gf$) for the injected fuel amount is then added to the base injected fuel amount (Gfb) to give the actual injected fuel amount (Gf) which is injected into the engine E by the injector I.

When the cooling water temperature is exceeds 50° C., the starting state determining unit 130 determines that the engine is not in a starting state and outputs a signal showing this to the compensatory fuel amount calculation permitting unit 140. On receiving this, the compensatory fuel amount calculation permitting unit 140 does not permit the compensatory fuel amount calculating unit 34 to perform its calculation (S706), so that the compensatory amount ($\Delta Gf$) for the injected fuel amount is not calculated.

It should be noted here that while the air/fuel ratio control apparatus described here has a starting state determining unit 130 and a compensatory fuel amount calculating unit 34 which are only used when the engine is being started, the air/fuel ratio control apparatus may alternatively be constructed without these components. By doing so, the neural network of the ignition failure extent estimating unit 25 may study the ignition failure extent under a variety of driving patterns, not just during starting.

Although the present invention has been fully described by way of examples with reference to accompanying drawings, it is to be noted that various changes and modifications will be apparent to those skilled in the art. Therefore, unless such changes and modifications depart from the scope of the present invention, they should be construed as being included therein.

What is claimed is:

1. An air/fuel ratio control apparatus for executing auxiliary control of an air/fuel ratio by compensating an injected fuel amount set by a control system for maintaining the air/fuel ratio at a preset value, the air/fuel ratio control apparatus comprising:

state detecting means for detecting a plurality of physical values which can be measured at low temperature and which show a state of an engine, the low temperature being a temperature at which an air/fuel ratio sensor cannot operate;

air/fuel ratio estimating means for receiving the plurality of physical values detected by the state detecting means as input parameters and for estimating the air/fuel ratio using a neural network; and compensatory fuel amount calculating means for calculating a compensatory fuel amount for the injected fuel amount from the estimated air/fuel ratio.

2. The air/fuel ratio control apparatus of claim 1, further comprising:

fuel time series data storing means for storing time series data for the injected fuel amount, wherein the air/fuel ratio estimating means has the time series data of the injected fuel amount as an input parameter.

3. The air/fuel ratio control apparatus of claim 1, further comprising:

parameter range judging means for judging whether at least one of the input parameters of the air/fuel ratio estimating means is outside a predetermined range corresponding to the input parameter; and parameter converting means for converting an input parameter judged to be outside the corresponding range to a predetermined value.

4. The air/fuel ratio control apparatus of claim 3, wherein the range corresponding to an input parameter is inputted into the neural network during a learning process and wherein the range sets a maximum value and a minimum value for a value of the input parameter.

5. The air/fuel ratio control apparatus of claim 1, further comprising:

transition amount detecting means for detecting a transition amount for the engine, wherein the compensatory fuel amount calculating means adjusts the compensatory amount for the injected fuel amount based on the detected transition amount.

6. The air/fuel ratio control apparatus of claim 5, wherein the transition amount detecting means detects the transition amount based on an amount of change in at least one of the physical values detected by the state detecting means.

7. The air/fuel ratio control apparatus of claim 5, wherein the transition amount detecting means detects the transition amount based on an amount of change in air/fuel ratio estimated by the air/fuel ratio estimating means.

8. The air/fuel ratio control apparatus of claim 5, further comprising:

an air/fuel ratio sensor for detecting the air/fuel ratio, wherein the transition amount detecting means detects the transition amount based on an amount of change in the air/fuel ratio detected by the air/fuel ratio sensor.

9. The air/fuel ratio control apparatus of claim 1, wherein the neural network used by the air/fuel ratio estimating means performs a learning process using teaching data which includes information showing that if an output of the air/fuel ratio sensor is an air/fuel ratio which is not compatible with the injected fuel amount, then the air/fuel ratio is not too lean but too rich.

10. The air/fuel ratio control apparatus of claim 1, further comprising:
fuel type determining means for determining a fuel type used by the engine,
wherein the air/fuel ratio estimating means includes a numeric value which corresponds to properties of the determined fuel type as an input parameter.

11. The air/fuel ration control apparatus of claim 1,
wherein the air/fuel ratio estimating means estimates an amount of change in a physical value that relates to the air/fuel ratio, and
wherein the compensatory fuel amount calculating means calculates the compensatory fuel amount for the injected fuel amount from the estimated physical value that relates to the air/fuel ratio.

12. The air/fuel ratio control apparatus of claim 11,
wherein the air/fuel ratio estimating means has a plurality of detected physical values as input parameters, uses a neural network to estimate a physical value related to the air/fuel ratio, and estimates an amount of change in input parameters related to the air/fuel ratio by calculating a change amount in the physical value.

13. The air/fuel ratio control apparatus of claim 11,
wherein the neural network used by the air/fuel ratio estimating means performs a learning process using teaching data which includes information showing that if an output of the air/fuel ratio sensor is an air/fuel ratio which is not compatible with the injected fuel amount, then the air/fuel ratio is not too lean but too rich.

\* \* \* \* \*

UNITED STATES PATENT AND TRADEMARK OFFICE
CERTIFICATE OF CORRECTION

PATENT NO. : 5,915,368
DATED : June 29, 1999
INVENTOR(S) : Akira Ishida et al.

It is certified that error appears in the above-identified patent and that said Letters Patent is hereby corrected as shown below:

On the cover [73] Assignee, after "Matsushita Electric Industrial Co., Ltd., Osaka, Japan" insert:

--and Honda Giken Kogyo Kabushiki Kaisha, Tokyo, Japan--.

Signed and Sealed this

First Day of August, 2000

Attest:

Q. TODD DICKINSON

*Attesting Officer*  *Director of Patents and Trademarks*